US011810032B2

(12) United States Patent
Morgenthau

(10) Patent No.: US 11,810,032 B2
(45) Date of Patent: Nov. 7, 2023

(54) SYSTEMS AND METHODS FOR LOW-ENERGY WIRELESS APPLICATIONS USING NETWORKED WEARABLE SENSORS

(71) Applicant: Triax Technologies, Inc., Norwalk, CT (US)

(72) Inventor: Justin J. Morgenthau, South Windsor, CT (US)

(73) Assignee: Triax Technologies, Inc., Norwalk, CT (US)

( * ) Notice: Subject to any disclaimer, the term of this patent is extended or adjusted under 35 U.S.C. 154(b) by 0 days.

(21) Appl. No.: 17/221,583

(22) Filed: Apr. 2, 2021

(65) Prior Publication Data

US 2021/0224721 A1    Jul. 22, 2021

Related U.S. Application Data

(63) Continuation-in-part of application No. 17/146,169, filed on Jan. 11, 2021, now abandoned, which is a
(Continued)

(51) Int. Cl.
*G06Q 10/06* (2012.01)
*G06Q 10/0631* (2023.01)
(Continued)

(52) U.S. Cl.
CPC ... *G06Q 10/063114* (2013.01); *G06Q 10/103* (2013.01); *G08B 21/04* (2013.01);
(Continued)

(58) Field of Classification Search
CPC ......... G06Q 10/063114; G06Q 10/103; G08B 21/04; G08B 21/043; G08B 21/0446;
(Continued)

(56) References Cited

U.S. PATENT DOCUMENTS

| 4,912,457 A | 3/1990 | Ladd |
| 5,045,839 A | 9/1991 | Ellis et al. |

(Continued)

FOREIGN PATENT DOCUMENTS

GB    2462590 A    2/2010

OTHER PUBLICATIONS

Invitation to Pay Additional Fees dated Apr. 27, 2017 in connection with International Application No. PCT/US2017/02270.
(Continued)

*Primary Examiner* — Curtis J King
(74) *Attorney, Agent, or Firm* — Wolf, Greenfield & Sacks, P.C.

(57) ABSTRACT

In some aspects, a system is provided that includes a plurality of communication nodes configured in a wireless mesh network or a low-power wireless network and a sensor assigned to a monitored subject. The sensor includes a first wireless network interface, for a first wireless network, adapted to communicate with the wireless mesh network or the low-power wireless network and a second wireless network interface, for a second wireless network, adapted to communicate with a mobile device. The sensor includes one or more processors adapted to receive, via the first wireless network, an indicator to transmit an identification message to the mobile device and, based on receiving the indicator, transmit, via the second wireless network, the identification message to the mobile device.

20 Claims, 38 Drawing Sheets

Related U.S. Application Data continuation of application No. 16/696,823, filed on Nov. 26, 2019, now Pat. No. 10,891,567, which is a continuation of application No. 15/419,759, filed on Jan. 30, 2017, now Pat. No. 10,528,902.

(60) Provisional application No. 62/309,206, filed on Mar. 16, 2016, provisional application No. 63/005,087, filed on Apr. 3, 2020.

(51) Int. Cl.

| | | |
|---|---|---|
| *H04W 4/02* | (2018.01) | |
| *G08B 21/04* | (2006.01) | |
| *H04Q 9/00* | (2006.01) | |
| *H04W 4/029* | (2018.01) | |
| *H04W 4/80* | (2018.01) | |
| *G06Q 10/10* | (2023.01) | |
| *H04W 52/02* | (2009.01) | |
| *H04W 72/0453* | (2023.01) | |
| *H04W 84/18* | (2009.01) | |
| *G08B 25/01* | (2006.01) | |
| *G08B 29/18* | (2006.01) | |
| *H04W 4/08* | (2009.01) | |
| *H04L 67/10* | (2022.01) | |
| *H04L 67/12* | (2022.01) | |

(52) U.S. Cl.
CPC ............ *G08B 21/043* (2013.01); *H04Q 9/00* (2013.01); *H04W 4/023* (2013.01); *H04W 4/025* (2013.01); *H04W 4/026* (2013.01); *H04W 4/029* (2018.02); *H04W 4/80* (2018.02); *H04W 52/0216* (2013.01); *H04W 72/0453* (2013.01); *G08B 21/0446* (2013.01); *G08B 25/016* (2013.01); *G08B 29/188* (2013.01); *H04L 67/10* (2013.01); *H04L 67/12* (2013.01); *H04W 4/08* (2013.01); *H04W 84/18* (2013.01); *Y02D 30/70* (2020.08)

(58) Field of Classification Search
CPC .... G08B 25/016; G08B 29/188; G08B 21/02; H04Q 9/00; H04Q 2209/25; H04Q 2209/43; H04W 4/023; H04W 4/025; H04W 4/026; H04W 4/029; H04W 4/80; H04W 52/0216; H04W 72/0453; H04W 4/08; H04W 84/18; H04W 84/12; H04L 67/10; H04L 67/12; H04L 67/125; Y02D 30/70

See application file for complete search history.

(56) References Cited

U.S. PATENT DOCUMENTS

| | | | |
|---|---|---|---|
| 5,212,621 | A | 5/1993 | Panter |
| 5,335,186 | A | 8/1994 | Tarrant |
| 5,745,037 | A | 4/1998 | Guthrie et al. |
| 5,812,064 | A | 9/1998 | Barbour |
| 5,969,627 | A | 10/1999 | Tarlton et al. |
| 6,075,755 | A | 6/2000 | Zarchan |
| 6,201,476 | B1 | 3/2001 | Depeursinge et al. |
| 6,208,247 | B1 | 3/2001 | Agre et al. |
| 6,323,773 | B1 | 11/2001 | Runyon et al. |
| 6,418,004 | B1 | 7/2002 | Mather et al. |
| 6,433,690 | B2 | 8/2002 | Petelenz et al. |
| 6,611,783 | B2 | 8/2003 | Kelly, Jr. et al. |
| 6,735,630 | B1 | 5/2004 | Gelvin et al. |
| 6,747,675 | B1 | 6/2004 | Abbott et al. |
| 6,807,165 | B2 | 10/2004 | Belcea |
| 6,850,502 | B1 | 2/2005 | Kagan et al. |
| 6,859,831 | B1 | 2/2005 | Gelvin et al. |
| 7,185,047 | B1 | 2/2007 | Bate et al. |
| 7,248,172 | B2 | 7/2007 | Clifford et al. |
| 7,263,379 | B1 | 8/2007 | Parkulo et al. |
| 7,298,258 | B1 | 11/2007 | Hudgens et al. |
| 7,398,153 | B2 | 7/2008 | Workman et al. |
| 7,423,537 | B2 | 9/2008 | Bonnet et al. |
| 7,558,622 | B2 | 7/2009 | Tran |
| 7,589,637 | B2 | 9/2009 | Bischoff et al. |
| 7,605,696 | B2 | 10/2009 | Quatro |
| 7,690,051 | B2 | 4/2010 | Uchida et al. |
| 7,733,224 | B2 | 6/2010 | Tran |
| 7,741,952 | B2 | 6/2010 | Denison et al. |
| 7,797,367 | B1 | 9/2010 | Gelvin et al. |
| 7,812,712 | B2 | 10/2010 | White et al. |
| 7,880,620 | B2 | 2/2011 | Hatori et al. |
| 7,898,403 | B2 | 3/2011 | Ritter et al. |
| 7,911,379 | B2 | 3/2011 | Cameron |
| 7,936,878 | B2 | 5/2011 | Kune et al. |
| 7,961,109 | B2 | 6/2011 | Jang et al. |
| 8,009,013 | B1 | 8/2011 | Hirschfeld et al. |
| 8,108,036 | B2 | 1/2012 | Tran |
| 8,217,756 | B2 | 7/2012 | Kumar et al. |
| 8,217,795 | B2 | 7/2012 | Carlton-Foss |
| 8,255,358 | B2 | 8/2012 | Ballew et al. |
| 8,260,570 | B2 | 9/2012 | Nyan et al. |
| 8,355,031 | B2 | 1/2013 | Hinterberger et al. |
| 8,381,603 | B2 | 2/2013 | Peng et al. |
| 8,408,041 | B2 | 4/2013 | Ten Kate et al. |
| 8,456,180 | B2 | 6/2013 | Sitarski |
| 8,525,673 | B2 | 9/2013 | Tran |
| 8,549,318 | B2 | 10/2013 | White et al. |
| 8,638,228 | B2 | 1/2014 | Amigo et al. |
| 8,639,543 | B2 | 1/2014 | Boss et al. |
| 8,669,845 | B1 | 3/2014 | Chakraborty et al. |
| 8,749,391 | B2 | 6/2014 | Flinsenberg et al. |
| 8,756,032 | B2 | 6/2014 | Chen |
| 8,773,269 | B2 | 7/2014 | Richardson et al. |
| 8,811,951 | B1 * | 8/2014 | Faaborg .................. H04L 51/12 455/411 |
| 8,824,445 | B1 | 9/2014 | Berenberg et al. |
| 8,841,987 | B1 | 9/2014 | Stanfield et al. |
| 8,860,570 | B2 | 10/2014 | Thomas et al. |
| 8,868,036 | B1 | 10/2014 | Nasserbakht et al. |
| 8,880,240 | B2 | 11/2014 | Grimm et al. |
| 8,885,548 | B2 | 11/2014 | Pandey et al. |
| 8,909,497 | B1 | 12/2014 | Shkolnikov |
| 8,933,808 | B2 | 1/2015 | Chakraborty et al. |
| 8,965,841 | B2 | 2/2015 | Wallace |
| 8,977,423 | B2 | 3/2015 | Merg et al. |
| 9,060,683 | B2 | 6/2015 | Tran |
| 9,138,174 | B2 | 9/2015 | Jin et al. |
| 9,159,213 | B1 | 10/2015 | Chun et al. |
| 9,176,932 | B2 | 11/2015 | Baggen et al. |
| 9,253,635 | B2 | 2/2016 | Berenberg et al. |
| 9,378,532 | B2 * | 6/2016 | Herickhoff ............. H04H 20/71 |
| 9,400,902 | B2 | 7/2016 | Schoner et al. |
| 9,402,568 | B2 | 8/2016 | Barfield |
| 9,427,177 | B2 | 8/2016 | Ganyi |
| 9,442,888 | B2 | 9/2016 | Stanfield et al. |
| 9,462,839 | B1 | 10/2016 | Eppler, Jr. et al. |
| 9,499,128 | B2 | 11/2016 | Reh et al. |
| 9,519,876 | B2 | 12/2016 | Wallace |
| 9,554,274 | B1 | 1/2017 | Castinado et al. |
| 9,563,919 | B2 | 2/2017 | Brown et al. |
| 9,588,135 | B1 | 3/2017 | Narasimhan |
| 9,741,225 | B1 | 8/2017 | Kanan |
| 9,762,581 | B1 * | 9/2017 | Wang .................. H04L 63/0853 |
| 9,781,243 | B1 * | 10/2017 | Huang ................... G06F 1/163 |
| 9,811,949 | B2 | 11/2017 | Ballew et al. |
| 9,858,794 | B2 | 1/2018 | McCleary et al. |
| 9,898,923 | B1 | 2/2018 | Petrucci |
| 9,959,733 | B2 | 5/2018 | Gu et al. |
| 9,980,092 | B1 | 5/2018 | Wirola et al. |
| 9,988,055 | B1 | 6/2018 | O'Flaherty et al. |
| 10,026,292 | B2 | 7/2018 | Baker et al. |
| 10,108,783 | B2 | 10/2018 | Horseman |
| 10,205,631 | B1 | 2/2019 | Miller |
| 10,210,741 | B2 | 2/2019 | Chen et al. |
| 10,325,229 | B2 | 6/2019 | Morgenthau et al. |
| 10,366,552 | B2 | 7/2019 | Dackefjord et al. |

(56) References Cited

U.S. PATENT DOCUMENTS

| | | |
|---|---|---|
| 10,384,646 B2 | 8/2019 | Kim et al. |
| 10,515,489 B2 | 12/2019 | Jefferies et al. |
| 10,528,902 B2 | 1/2020 | Morgenthau et al. |
| 10,595,726 B2* | 3/2020 | Cronin .................... A61B 5/01 |
| 10,692,024 B2 | 6/2020 | Morgenthau et al. |
| 10,769,562 B2 | 9/2020 | Morgenthau et al. |
| 10,778,675 B1* | 9/2020 | Makarskyy ........... H04W 12/33 |
| 10,878,352 B2 | 12/2020 | Morgenthau et al. |
| 10,891,567 B2 | 1/2021 | Morgenthau et al. |
| 11,570,205 B1 | 1/2023 | Kerr et al. |
| 2001/0022558 A1 | 9/2001 | Karr, Jr. et al. |
| 2002/0022979 A1 | 2/2002 | Whipp et al. |
| 2002/0049054 A1 | 4/2002 | O'Connor et al. |
| 2002/0068984 A1* | 6/2002 | Alexander ............ G05B 15/02 |
| | | 700/83 |
| 2003/0095039 A1 | 5/2003 | Shimomura et al. |
| 2003/0191955 A1 | 10/2003 | Wagner et al. |
| 2004/0073440 A1 | 4/2004 | Garbers et al. |
| 2004/0100375 A1 | 5/2004 | Tanguay |
| 2004/0214594 A1 | 10/2004 | Holman |
| 2004/0217864 A1 | 11/2004 | Nowak |
| 2004/0248556 A1 | 12/2004 | Rickhoff et al. |
| 2005/0068712 A1 | 3/2005 | Schulz et al. |
| 2005/0073415 A1 | 4/2005 | Shafir |
| 2005/0075116 A1 | 4/2005 | Laird et al. |
| 2005/0110636 A1 | 5/2005 | Ghaffari |
| 2005/0146418 A1 | 7/2005 | Caren |
| 2005/0179448 A1 | 8/2005 | Kirchner et al. |
| 2006/0049922 A1 | 3/2006 | Kolpasky et al. |
| 2006/0128349 A1 | 6/2006 | Yoon |
| 2006/0131412 A1 | 6/2006 | O'Brien et al. |
| 2006/0145842 A1 | 7/2006 | Ship |
| 2006/0220837 A1 | 10/2006 | Kozlay |
| 2007/0026869 A1 | 2/2007 | Dunko |
| 2007/0027732 A1 | 2/2007 | Hudgens |
| 2007/0116292 A1* | 5/2007 | Kurita .................... G06F 21/34 |
| | | 380/273 |
| 2007/0121937 A1 | 5/2007 | Kochevar et al. |
| 2007/0188323 A1 | 8/2007 | Sinclair et al. |
| 2007/0213045 A1 | 9/2007 | Hermansson et al. |
| 2007/0258508 A1 | 11/2007 | Werb et al. |
| 2007/0272023 A1 | 11/2007 | Dwyer et al. |
| 2008/0001755 A1 | 1/2008 | Puzio et al. |
| 2008/0049700 A1 | 2/2008 | Shah et al. |
| 2008/0077326 A1 | 3/2008 | Funk et al. |
| 2008/0117067 A1 | 5/2008 | Abel et al. |
| 2008/0154107 A1 | 6/2008 | Jina |
| 2008/0189142 A1 | 8/2008 | Brown et al. |
| 2008/0284587 A1 | 11/2008 | Saigh et al. |
| 2009/0040878 A1 | 2/2009 | Domes et al. |
| 2009/0054737 A1* | 2/2009 | Magar .................... H04L 67/125 |
| | | 600/300 |
| 2009/0069642 A1 | 3/2009 | Gao et al. |
| 2009/0135009 A1 | 5/2009 | Little et al. |
| 2009/0154437 A1 | 6/2009 | Kim et al. |
| 2009/0161637 A1 | 6/2009 | Ruy et al. |
| 2010/0007502 A1 | 1/2010 | Noury et al. |
| 2010/0054307 A1 | 3/2010 | Strohm |
| 2010/0069115 A1 | 3/2010 | Liu |
| 2010/0081377 A1 | 4/2010 | Chatterjee et al. |
| 2010/0081473 A1 | 4/2010 | Chatterjee et al. |
| 2010/0083012 A1 | 4/2010 | Corbridge et al. |
| 2010/0121603 A1 | 5/2010 | Nyan et al. |
| 2010/0142510 A1 | 6/2010 | Park et al. |
| 2010/0146308 A1 | 6/2010 | Gioscia et al. |
| 2010/0167646 A1 | 7/2010 | Alameh et al. |
| 2010/0241464 A1 | 9/2010 | Amigo et al. |
| 2010/0241465 A1 | 9/2010 | Amigo et al. |
| 2011/0004072 A1* | 1/2011 | Fletcher ............... A61B 5/0002 |
| | | 600/300 |
| 2011/0022350 A1 | 1/2011 | Chatterjee |
| 2011/0069611 A1 | 3/2011 | Chung et al. |
| 2011/0093913 A1 | 4/2011 | Wohlert et al. |
| 2011/0095873 A1 | 4/2011 | Pratt et al. |
| 2011/0111728 A1 | 5/2011 | Ferguson et al. |
| 2011/0116414 A1 | 5/2011 | Lee et al. |
| 2011/0128118 A1 | 6/2011 | Gilleland et al. |
| 2011/0140913 A1 | 6/2011 | Montenero |
| 2012/0012415 A1 | 1/2012 | Oettinger |
| 2012/0062366 A1 | 3/2012 | Pappu et al. |
| 2012/0075072 A1 | 3/2012 | Pappu |
| 2012/0078388 A1 | 3/2012 | Collins et al. |
| 2012/0081289 A1 | 4/2012 | Sirpal et al. |
| 2012/0098654 A1 | 4/2012 | Ebert |
| 2012/0106397 A1 | 5/2012 | Abedi |
| 2012/0130751 A1 | 5/2012 | McHugh et al. |
| 2012/0155039 A1 | 6/2012 | Jeftic-Stojanovski et al. |
| 2012/0200393 A1 | 8/2012 | Veni, III |
| 2012/0218080 A1 | 8/2012 | Gu et al. |
| 2012/0314901 A1 | 12/2012 | Hanson et al. |
| 2013/0012786 A1 | 1/2013 | Horseman |
| 2013/0039230 A1 | 2/2013 | Lee et al. |
| 2013/0053652 A1 | 2/2013 | Cooner |
| 2013/0067544 A1 | 3/2013 | Kwark et al. |
| 2013/0072223 A1 | 3/2013 | Berenberg et al. |
| 2013/0076515 A1 | 3/2013 | Flynt et al. |
| 2013/0094430 A1 | 4/2013 | Mills et al. |
| 2013/0110415 A1 | 5/2013 | Davis et al. |
| 2013/0120147 A1 | 5/2013 | Narasimhan et al. |
| 2013/0122849 A1 | 5/2013 | Doezema et al. |
| 2013/0137079 A1 | 5/2013 | Kahle et al. |
| 2013/0137468 A1 | 5/2013 | Kahle et al. |
| 2013/0138464 A1 | 5/2013 | Kahle et al. |
| 2013/0138465 A1 | 5/2013 | Kahle et al. |
| 2013/0138466 A1 | 5/2013 | Kahle et al. |
| 2013/0138606 A1 | 5/2013 | Kahle et al. |
| 2013/0176107 A1 | 7/2013 | Dumas et al. |
| 2013/0217352 A1 | 8/2013 | Pan et al. |
| 2013/0225116 A1* | 8/2013 | Kim .................... H04W 4/029 |
| | | 455/404.2 |
| 2013/0262233 A1* | 10/2013 | Bradley ................ H04W 4/12 |
| | | 705/14.64 |
| 2013/0271274 A1 | 10/2013 | Ebert |
| 2013/0285813 A1 | 10/2013 | Kasama |
| 2013/0293349 A1 | 11/2013 | Templ et al. |
| 2014/0004910 A1 | 1/2014 | Goldman |
| 2014/0035726 A1 | 2/2014 | Schoner et al. |
| 2014/0091934 A1 | 4/2014 | Vallance et al. |
| 2014/0111339 A1 | 4/2014 | Beckett |
| 2014/0118159 A1* | 5/2014 | Fish .................... A61B 5/0022 |
| | | 340/870.01 |
| 2014/0118498 A1 | 5/2014 | Lee et al. |
| 2014/0132183 A1 | 5/2014 | Van Herpen |
| 2014/0159866 A1 | 6/2014 | Hwang |
| 2014/0208829 A1 | 7/2014 | Lechner et al. |
| 2014/0218169 A1 | 8/2014 | Chih et al. |
| 2014/0247151 A1 | 9/2014 | Proud et al. |
| 2014/0266699 A1* | 9/2014 | Poder .................. G08B 25/008 |
| | | 340/539.13 |
| 2014/0313032 A1 | 10/2014 | Sager et al. |
| 2014/0317631 A1 | 10/2014 | Ryshakov et al. |
| 2014/0336850 A1 | 11/2014 | Kim et al. |
| 2015/0015401 A1 | 1/2015 | Wedig et al. |
| 2015/0039880 A1* | 2/2015 | Aminzade ............ H04W 4/023 |
| | | 713/100 |
| 2015/0054654 A1* | 2/2015 | Albinali .................. H04W 4/80 |
| | | 340/870.01 |
| 2015/0059204 A1 | 3/2015 | Alexander et al. |
| 2015/0073741 A1 | 3/2015 | Wüest et al. |
| 2015/0074797 A1 | 3/2015 | Choi et al. |
| 2015/0123787 A1 | 5/2015 | Watson et al. |
| 2015/0161553 A1 | 6/2015 | Eggleston |
| 2015/0161834 A1 | 6/2015 | Spahl et al. |
| 2015/0173021 A1 | 6/2015 | Lim |
| 2015/0173614 A1* | 6/2015 | Takano .................. G16H 40/67 |
| | | 600/301 |
| 2015/0173674 A1* | 6/2015 | Hayes .................. A61B 5/0024 |
| | | 600/301 |
| 2015/0187194 A1 | 7/2015 | Hypolite et al. |
| 2015/0200738 A1 | 7/2015 | Wetterwald et al. |
| 2015/0223057 A1* | 8/2015 | Dellaciprete ......... G06F 21/6245 |
| | | 455/410 |
| 2015/0276521 A1 | 10/2015 | Moore, Jr. et al. |

(56) References Cited

U.S. PATENT DOCUMENTS

| | | | |
|---|---|---|---|
| 2015/0281364 A1* | 10/2015 | Connolly | G06Q 10/06 709/217 |
| 2015/0302719 A1 | 10/2015 | Mroszczak et al. | |
| 2015/0310565 A1 | 10/2015 | Fairbanks et al. | |
| 2015/0326053 A1 | 11/2015 | Amano et al. | |
| 2015/0334676 A1* | 11/2015 | Hart | H04W 64/003 455/456.1 |
| 2015/0338852 A1 | 11/2015 | Ramanujam | |
| 2015/0351084 A1 | 12/2015 | Werb | |
| 2015/0356853 A1* | 12/2015 | Cronin | G08B 21/182 340/669 |
| 2015/0366518 A1 | 12/2015 | Sampson | |
| 2016/0004314 A1 | 1/2016 | Burckard | |
| 2016/0014266 A1* | 1/2016 | Bhatt | H04M 1/72484 455/556.1 |
| 2016/0038088 A1* | 2/2016 | Lari | A61B 5/6807 600/595 |
| 2016/0078061 A1* | 3/2016 | Hilsdale | G16H 40/20 707/687 |
| 2016/0094936 A1* | 3/2016 | Yang | G06F 1/3206 455/456.1 |
| 2016/0128619 A1 | 5/2016 | Geller et al. | |
| 2016/0163137 A1* | 6/2016 | Strulovitch | G07C 9/28 340/5.61 |
| 2016/0171633 A1 | 6/2016 | DeWalt et al. | |
| 2016/0189039 A1* | 6/2016 | Leppanen | H04W 4/80 706/11 |
| 2016/0191511 A1 | 6/2016 | Tijerina et al. | |
| 2016/0212615 A1* | 7/2016 | Bengtsson | G07C 9/00309 |
| 2016/0232774 A1 | 8/2016 | Noland et al. | |
| 2016/0246935 A1 | 8/2016 | Cerny et al. | |
| 2016/0318445 A1* | 11/2016 | Sugimoto | B60W 60/0027 |
| 2016/0330573 A1* | 11/2016 | Masoud | H04W 12/0431 |
| 2016/0344808 A1* | 11/2016 | Smith | H04L 67/12 |
| 2016/0345317 A1 | 11/2016 | Leevesque et al. | |
| 2016/0350274 A1* | 12/2016 | Deng | H04L 67/535 |
| 2017/0017815 A1 | 1/2017 | Caso | |
| 2017/0032302 A1 | 2/2017 | Lete et al. | |
| 2017/0048707 A1 | 2/2017 | Ortiz et al. | |
| 2017/0055104 A1 | 2/2017 | Wegelin et al. | |
| 2017/0068925 A1 | 3/2017 | Sudo et al. | |
| 2017/0078899 A1 | 3/2017 | Li et al. | |
| 2017/0107090 A1 | 4/2017 | Mondal et al. | |
| 2017/0109829 A1 | 4/2017 | Amigo et al. | |
| 2017/0140617 A1 | 5/2017 | Klein et al. | |
| 2017/0142501 A1 | 5/2017 | Jakobsson | |
| 2017/0162020 A1 | 6/2017 | Pham et al. | |
| 2017/0163785 A1 | 6/2017 | Kim et al. | |
| 2017/0169533 A1 | 6/2017 | O'Brien | |
| 2017/0177091 A1* | 6/2017 | Shah | G10H 1/0066 |
| 2017/0185994 A1* | 6/2017 | Hartl | G06Q 20/18 |
| 2017/0205784 A1 | 7/2017 | Huseth et al. | |
| 2017/0206534 A1 | 7/2017 | O'Brien | |
| 2017/0208054 A1 | 7/2017 | Hanay et al. | |
| 2017/0222676 A1 | 8/2017 | Piccioni | |
| 2017/0263105 A1 | 9/2017 | Shoari et al. | |
| 2017/0263113 A1 | 9/2017 | Tiberi et al. | |
| 2017/0270461 A1 | 9/2017 | Morgenthau et al. | |
| 2017/0270462 A1 | 9/2017 | Morgenthau et al. | |
| 2017/0270463 A1 | 9/2017 | Morgenthau et al. | |
| 2017/0270464 A1 | 9/2017 | Morgenthau et al. | |
| 2017/0270481 A1 | 9/2017 | Morgenthau et al. | |
| 2017/0281056 A1 | 10/2017 | Raanan et al. | |
| 2017/0296092 A1 | 10/2017 | Jones et al. | |
| 2017/0303187 A1 | 10/2017 | Crouthamel et al. | |
| 2017/0339255 A1* | 11/2017 | Cronin | A61B 5/00 |
| 2017/0353829 A1 | 12/2017 | Kumar et al. | |
| 2017/0366655 A1* | 12/2017 | Thompson | H04W 12/02 |
| 2017/0372184 A1 | 12/2017 | Manci et al. | |
| 2017/0372188 A1 | 12/2017 | Simon et al. | |
| 2018/0000385 A1* | 1/2018 | Heaton | G08B 21/0446 |
| 2018/0025656 A1* | 1/2018 | Cronin | G06Q 10/1093 434/236 |
| 2018/0053200 A1* | 2/2018 | Cronin | G06Q 30/0239 |
| 2018/0059716 A1* | 3/2018 | Cronin | A61B 5/0002 |
| 2018/0060495 A1* | 3/2018 | Mahapatra | G16H 40/67 |
| 2018/0113006 A1 | 4/2018 | Tyrer | |
| 2018/0121861 A1 | 5/2018 | Morgenthau et al. | |
| 2018/0122219 A1* | 5/2018 | Caterino | G07C 9/28 |
| 2018/0132285 A1 | 5/2018 | Jackson et al. | |
| 2018/0151037 A1 | 5/2018 | Morgenthau et al. | |
| 2019/0014996 A1* | 1/2019 | Qian | A61B 5/0013 |
| 2019/0054347 A1* | 2/2019 | Saigh | A61B 5/02055 |
| 2019/0175016 A1* | 6/2019 | Coden | A61B 5/486 |
| 2019/0220635 A1* | 7/2019 | Yeh | G06K 7/10158 |
| 2020/0196151 A1* | 6/2020 | Maragoudakis | H04L 63/0853 |
| 2020/0242539 A1 | 7/2020 | Morgenthau et al. | |
| 2021/0011544 A1* | 1/2021 | Robertson | G16H 15/00 |
| 2021/0052221 A1 | 2/2021 | Panneer Selvam et al. | |
| 2021/0217516 A1* | 7/2021 | Nash | G06F 16/245 |
| 2021/0248890 A1 | 8/2021 | Shaw et al. | |
| 2021/0313074 A1 | 10/2021 | Mesirow et al. | |
| 2021/0327549 A1* | 10/2021 | Temkin | H04W 4/80 |
| 2021/0327575 A1* | 10/2021 | Temkin | G06F 1/1656 |
| 2022/0165146 A1 | 5/2022 | Daoura et al. | |

OTHER PUBLICATIONS

International Search Report and Written Opinion dated Jul. 12, 2017 in connection with International Application No. PCT/US2017/022270.

International Preliminary Report on Patentability dated Sep. 27, 2018 in connection with International Application No. PCT/US2017/022270.

[No Author Listed], Application of Tracking Technology to Access-control System. Hitachi Review. 2004;53(2):83-87.

[No Author Listed], Facts About Smart Access System. Toyota. 2016. 2 pages.

[No Author Listed], Smartboots—SolePower. Apr. 21, 2017. 4 pages. URL:https://web.archive.org/web/20170421163611/http://www.solepowertech.com:80/smartboots [retrieved on Oct. 3, 2018].

[No Author Listed], Spot-R by Triax. ECT Fact Sheets. Emerging Construction Technologies. Purdue University. Jan. 30, 2018. 11 pages. doi:10.5703/1288284316632.

[No Author Listed], Welcome to Triax. Redefining Safety with Smart Technology. Oct. 11, 2016. 2 pages. URL:https://web.archive.org/web/20161011193408/https://www.triaxtec.com [Retrieved on Jan. 9, 2019].

Ahamed, Review and Implications of Time Division Multiple Access Techniques For Wireless Environment Services and Applications. Journal of Theoretical and Applied Information Technology. 2008; 807-812.

Akyildiz et al., Wireless mesh networks: a survey. Computer Networks. 2005; 1-43.

Azhari et al., On the Performance of Off-Body Links for a Wireless Body Area Network in an Underground Mining Environment, International Journal of Computer Science and Innovation. 2015;2015(2):53-67.

Bagala et al., Evaluation of Accelerometer Based Fall Detection Algorithms on Real-World Falls. PLoS One. May 2012; 7(5):e37062. 9 pages.

Bandyopadhyay et al., Wireless Tracking and Sensing Systems for Mine Safety, Security and Productivity Management. Management Information Systems Group of Indian Institute of Management. 2014. 10 pages.

Borcoci, Wireless Mesh Networks Technologies: Architectures, Protocols, Resource Management and Applications. University Politehnica Bucharest, Infoware Conference Aug. 2009; 212 pages.

Bourke et al., A threshold based fall detection algorithm using a bi-axial gyroscope sensor. Medical Engineering & Physics. 2008; 30:84-90.

Bourke et al., Evaluation of a threshold based tri-axial accelerometer fall detection algorithm. Gait & Posture. 2007;26:194-199.

Bourke et al., Evaluation of waist mounted tri-axial accelerometer based fall detection algorithms during scripted and continuous unscripted activities. Journal of Biomechanics. 2010;43:3051-7.

Burri et al., Dozer: Ultra-Low Power Data Gathering in Sensor Networks. ACM. IPSN'07. Apr. 2007. 10 pages.

(56) References Cited

OTHER PUBLICATIONS

Chen et al., Wearable Sensors for Reliable Fall Detection. Proceedings of the 2005 IEEE Engineering in Medicine and Biology 27th Annual Conference. Sep. 1-4, 2005; 4 pages.
Ciabattoni et al., An open and modular hardware node for wireless sensor and body area networks. Journal of Sensors. Jan. 2016;2016:1-16.
Costin et al., RFID and BIM-enabled worker location tracking to support real-time building protocol and data visualization. Journal of Information Technology in Construction (ITcon). Dec. 2015;20(29):495-517.
Dai et al., Mobile phone based pervasive fall detection. Personal and ubiquitous computing. Oct. 1, 2010;14(7):633-43.
Das, Wireless Mesh Networking. Stony Brook University. Dec. 2012; 53 pages.
Delahoz et al., Survey on fall detection and fall prevention using wearable and external sensors. Sensors. Oct. 2014;14(10):19806-42.
Djukic, Scheduling Algorithms for TDMA Wireless Multihop Networks. University of Toronto, 2008; 219 pages.
El-Hoiydi et al., WiseMAC: An Ultra Low Power MAC Protocol for Multi-hop Wireless Sensor Networks. ALGOSENSORS 2004, LNCS. 2004; 3121:18-32.
Ernst, Scheduling Techniques in Wireless Mesh Networks. Thesis, The University of Guelph. Apr. 2009; 85 pages.
Fang et al., A smartphone-based detection of fall portents for construction workers. Procedia Engineering. Jan. 2014;85:147-56.
Ge et al., Detecting Falls Using Accelerometers by Adaptive Thresholds in Mobile Devices. Journal of Computers. Jul. 2014;9(7):1553-9.
Giang, Companies are putting sensors on employees to track their every move. Business Insider. Mar. 14, 2013. 4 pages. URL:http://www.businessinsider.com/tracking-employees-with-productivity-sensors-2013-3 [retrieved Apr. 18, 2016].
Giretti et al., Design and first development of an automated real-time safety management system for construction sites. Journal of Civil Engineering and Management. 2009;15(4):325-36.
Gonga, Mobility and Multi-channel Communications in Low-power Wireless Networks. KTH Royal Institute of Technology. Doctoral Thesis, Nov. 2015; 161 pages.
He et al., Fall detection by built-in tri-accelerometer of smartphone. Proceedings of 2012 IEEE-EMBS International Conference on Biomedical and Health Informatics Jan. 5, 2012:184-7.
Hegde et al., Technical Advances in Fall Detection System—A Review International Journal of Computer Science and Mobile Computing. Jul. 2013;2(7):152-60.
Huynh et al., Optimization of an Accelerometer and Gyroscope Based Fall Detection Algorithm. Journal of Sensors. 2015; 2015: 8 pages.
Kanzaki et al., Dynamic TDMA Slot Assignment in Ad Hoc Networks. IEEE Computer Society, Proceedings of the 17th International Conference on Advanced Information Network and Applications. 2003; 6 pages.
Ko et al., Distributed Channel Assignment in Multi-Radio 802.11 Mesh Networks. 2007 Wireless Communications and Networking. IEEE Conference. 2007; 6 pages.
Kulkarni et al., TDMA Service for Sensor Networks. International Workshop on Assurance in Distribute Systems and Networks. 2004; 6 pages.
Larranaga et al., An Environment Adaptive ZigBee-based Indoor Positioning Algorithm. 2010 International Conference on Indoor Positioning and Indoor Navigation. Sep. 2010; 8 pages.
Li et al., Accurate, Fast Fall Detection Using Gyroscopes and Accelerometer Derived Posture Information. 2009 Sixth International Workshop on Wearable and Implantable Body Sensor Networks. 2009; 6 pages.
Lin et al., An Open-Source Wireless Mesh Networking Module for Environmental Monitoring. IEEE. 2015. 6 pages.
Lo et al., Enhancing Worker Onsite Safety Management Using RFID Technology in Construction. The Thirteenth East Asia-Pacific Conference on Structural Engineering and Construction (EASEC-13). Sep. 11-13, 2013. 9 pages.
Luque et al., Comparison and Characterization of Android Based Fall Detection Systems. Sensors. 2014; 14:18543-74.
Mardeni et al., Efficient Mobile Asset Tracking and Localization in ZigBee Wireless Network. Journal of Advances in Computer Networks. Mar. 2015; 3(1):1-6.
Mathie et al., A System for Monitoring Posture and Physical Activity Using Accelerometers. 2001 Proceedings of the 23rd Annual EMBS International Conference. Oct. 25-28, 2001:3654-7.
Mayton et al., TRUSS: Tracking Risk with Ubiquitous Smart Sensing. Institute of Electrical and Electronics Engineers. IEEE Sensors. 2012. 5 pages. doi: 10.1109/ICSENS.2012.6411393.
Mubashir et al., A survey on fall detection: Principles and approaches. Neurocomputing. 2013; 100:144-152.
Musaloiu-Elefteri, Practical Wireless Mesh Networks and Their Applications. John Hopkins University. Jan. 2010; 123 pages.
Park et al., Framework of automated construction-safety monitoring using cloud-enabled BIM and BLE mobile tracking sensors. Journal of Construction Engineering and Management. 2017;143(2):05016019. 12 pages.
Rezaei et al., Energy Saving in Wireless Sensor Networks. International Journal of Computer Science & Engineering Survey (IJCSES). Feb. 2012;3(1): 23-37.
Saxena et al., Efficient Power Utilization Techniques for Wireless Sensor Networks—A Survey. International Journal on Computer Science and Engineering. (IJCSE). Feb. 2011;3(2):905-925.
Senyurek et al., Monitoring workers through wearable transceivers for improving work safety. IEEE 7th International Symposium on Intelligent Signal Processing. 2011. 3 pages.
Shanesy, New Smart Wearable Protects Workers On The Job. Builder. May 25, 2017. retrieved from Internet [https://www.builderonline.com/building/safety-healthfulness/new-smart-wearable-protects-workers-on-the-job]. Last accessed Feb. 14, 2019.
Suman et al., A Dynamic TDMA Slot Scheduling (DTSS) Scheme for Efficient Channel Application in Tactical Ad Hoc Networks. International Conference on Computing, Communication and Automation. 2015; 502-507.
Thomas et al., SmartHat: A battery-free worker safety device employing passive UHF RFID technology. 2011 IEEE International Conference on RFID. Apr. 12, 2011. pp. 85-90.
Thompson, How to prevent unauthorized use of a forklift: access control. Raymond Handling Concepts Corporation. Apr. 11, 2015. 2 pages. URL:https://web.archive.org/web/20150411054911/raymondhandling.com/forklift-access-control-systems [retrieved on Apr. 4, 2019].
Tolkiehn et al., Direction Sensitive Fall Detection Using Triaxial Accelerometer and a Barometric Pressure Sensor. IEEE International Conference of Engineering in Medicine and Biology Society. Aug. 30, 2011;2011:369-72.
Wu et al., Adaptive TDMA slot Assignment in Mesh Wireless Networks. Proceedings of the 2009 IEEE International Conference on Networking, Sensing and Control. Mar. 2009; 5 pages.
Wu et al., Development of a wearable-sensor-based fall detection system. International journal of telemedicine and applications. 2015. vol. 2015. 11 pages.
Yang et al., Automated detection of near-miss fall incidents in iron workers using inertial measurement units. Construction Research Congress. ASCE. 2014. pp. 935-944.
Zhu et al., Bridging e-health and the internet of things: The SPHERE project. IEEE Intelligent Systems. Jul./Aug. 2015. pp. 39-46. 8 pages.
Zou et al., A Real-Time Monitoring System For Improving Construction Workers' Health and Safety. Proceedings CIB W099 Belfast 2015. Sep. 10-11, 2015. 12 pages.
Canadian Office Action dated Mar. 23, 2023, in connection with Canadian Application No. 3,017,946.

* cited by examiner

Resource Calendar

March 2016

| Sunday | Monday | Tuesday | Wednesday | Thursday | Friday | Saturday |
|---|---|---|---|---|---|---|
|  |  | 1 | 2 | 3 | 4 | 5 |
| 6 | 7 | 8 | 9 | 10   2 Carpenters<br>3 Electricians<br>4 Field Engineers<br>5 Plumbers | 11   5 Carpenters<br>6 Electricians<br>7 Field Engineers<br>8 Plumbers | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

Evacuations

Started At  
    10/19/2017 09:32AM  
Started By  
    User.Admin  
Ended At  
    10/19/2017 09:42AM

| | | 10-19 09:32 AM | > | All Workers |
|---|---|---|---|---|
| | | 10-19 09:32 AM | | |
| | | 10-04 09:25 AM | | |
| | | 10-04 02:51 PM | | |
| | | 10-04 02:19 PM | | |
| | | 10-04 02:17 PM | | |
| | | 08-04 01:27 PM | | |

Workers On Site During Evacuation

| Last Name | First Name | Subcontractor | Trade | JobType | | |
|---|---|---|---|---|---|---|
| | | | | | 08-02 04:36 PM | |
| | | | | | 04-07 12:03 PM | |
| | | | | | 04-06 01:24 PM | Acknowledged |
| Worker | S5 | | | | 01-30 02:19 PM | 9:24 AM |
| Worker | S6 | GoodBuildingCo | Carpenter | Apprentice | 01-30 02:17 PM | |
| Worker | SThree | | | | 01-27 10:28 AM | 9:24 AM |
| | | | | | 01-27 10:13 AM | |

FIG. 34

SYSTEMS AND METHODS FOR LOW-ENERGY WIRELESS APPLICATIONS USING NETWORKED WEARABLE SENSORS

CROSS REFERENCE TO RELATED APPLICATIONS

This application is a Continuation-in-Part of U.S. patent application Ser. No. 17/146,169, filed Jan. 11, 2021, entitled "SYSTEM AND INTERFACES FOR MANAGING WORKPLACE EVENTS," which is a Continuation of U.S. patent application Ser. No. 16/696,823, filed Nov. 26, 2019, entitled "SYSTEM AND INTERFACES FOR MANAGING WORKPLACE EVENTS," which is a Continuation of U.S. patent application Ser. No. 15/419,759, filed Jan. 30, 2017, entitled "SYSTEM AND INTERFACES FOR MANAGING WORKPLACE EVENTS," which is a Non-Provisional of Provisional (35 U.S.C. § 119(e)) of U.S. Provisional patent Application Ser. No. 62/309,206, filed Mar. 16, 2016, entitled "SYSTEM AND INTERFACES FOR MANAGING WORKPLACE EVENTS."

This application is also a Non-Provisional of Provisional (35 U.S.C. § 119(e)) of U.S. Provisional Patent Application Ser. No. 63/005,087, filed Apr. 3, 2020, entitled "SYSTEMS AND METHODS FOR LOW-ENERGY WIRELESS APPLICATIONS USING NETWORKED WEARABLE SENSORS."

The entire contents of these applications are incorporated herein by reference in their entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

A BLUETOOTH device may be used with a mobile phone or another hand-held device with a suitable screen. For example, a heart rate monitoring device may connect to the mobile phone via BLUETOOTH, and the mobile phone's display may be used to monitor the heart rate of a subject wearing the heart rate monitor device.

SUMMARY

The inventors have appreciated that there are some environments (e.g., construction sites) where using a mobile phone is not allowed or discouraged due to safety or security concerns. In some embodiments, as described herein, such BLUETOOTH devices are instead interfaced with a sensor, such as a wearable sensor, thereby eliminating the need for the BLUETOOTH device to connect with a mobile phone for its operation. The sensor may be in communication with a network, such as a mesh network, and may transmit data received from the BLUETOOTH device to the mesh network, which may in turn forward the data to an appropriate recipient, such as a server, a computer, a hand held device, or another recipient. Because some embodiments, as described herein, eliminate the need for the mobile phone's display and associated screen time and/or focused usage in order to utilize the BLUETOOTH device, these embodiments are a suitable way to incorporate BLUETOOTH devices or applications in environments where using the mobile phone is not appropriate or allowed.

In some aspects, a system is provided that includes a plurality of communication nodes configured in a wireless mesh network or a low-power wireless network and a sensor assigned to a monitored subject. The sensor includes a first wireless network interface, for a first wireless network, adapted to communicate with the wireless mesh network or the low-power wireless network and a second wireless network interface, for a second wireless network, adapted to communicate with a mobile device. The sensor includes one or more processors adapted to receive, via the first wireless network, an indicator to transmit an identification message to the mobile device and, based on receiving the indicator, transmit, via the second wireless network, the identification message to the mobile device.

In some embodiments, the mobile device is adapted to receive, via the second wireless network, the identification message from the sensor and, based on receiving the identification message, transmit, via the third wireless network, to a managing computing system, a request based on the identification message.

In some embodiments, the managing computing system is adapted to transmit, to the sensor, via the first wireless network, the indicator to transmit the identification message to the mobile device. The managing computing system is adapted to receive, from the mobile device, via the third wireless network, the request based on the identification message. The managing computing system is adapted to, based on receiving the request, transmit, to the mobile device, via the third wireless network, a response to the request based on the identification message.

In some embodiments, the mobile device is adapted to execute a software application to generate the request based on the identification message and displays a user interface including the response to the request based on the identification message.

In some embodiments, the request based on the identification message includes a request to identify a worker associated with the identification message.

In some embodiments, the response to the request based on the identification message includes an identification of a worker associated with the identification message.

In some embodiments, the second wireless interface includes a BLUETOOTH LOW ENERGY wireless interface.

In some embodiments, the identification message includes a unique identifier.

In some embodiments, the unique identifier includes a manufacturer identifier, a firmware version, and/or a serial number.

In some embodiments, the plurality of communication nodes and the sensor include one or more transmitters that are adapted to transmit information using a plurality of communication channels, wherein each transmitter has specific time slots in which to transmit information.

In some embodiments, the system is adapted to dynamically assign time slots for each of the transmitters.

In some embodiments, the system further comprises a check-in system that assigns the sensor to the monitored subject, the check-in system including a reader that is adapted to scan an identifier associated with the sensor, and to create a record of an association between the scanned sensor and the monitored subject.

In some embodiments, the sensor is adapted to determine the location of the sensor based on detection of one or more of the plurality of communication nodes in the wireless mesh network or the low-power wireless network.

In some embodiments, the determination of the location is determined responsive to detected signal strength of the one or more of the plurality of communication nodes in the wireless mesh network or the low-power wireless network.

In some aspects, a sensor is provided that includes an element that is adapted to attach the sensor to a monitored subject, a first wireless network interface, for a first wireless network, adapted to communicate with the wireless mesh network or a low-power wireless network, and a second wireless network interface, for a second wireless network, adapted to communicate with a mobile device. The sensor includes one or more processors adapted to receive, via the first wireless network, an indicator to transmit an identification message to the mobile device and, based on receiving the indicator, transmit, via the second wireless network, the identification message to the mobile device.

In some aspects, a system is provided that includes a plurality of communication nodes configured in a wireless mesh network or a low-power wireless network and a sensor assigned to a monitored subject. The sensor includes a first wireless network interface, for a first wireless network, adapted to communicate with the wireless mesh network or the low-power wireless network and a second wireless network interface, for a second wireless network, adapted to communicate with a peripheral device. The sensor includes one or more processors adapted to receive, via the second wireless network, an advertisement message from the peripheral device and, based on receiving the advertisement message, transmit, via the first wireless network, a status message or an identity message for the peripheral device to the wireless mesh network or the low-power wireless network.

In some embodiments, the peripheral device comprises a wireless beacon.

In some embodiments, the one or more processors are adapted to, based on the advertisement message, determine the identity message for the wireless beacon.

In some embodiments, a format of the identity message for the wireless beacon conforms to iBeacon™ or Eddystone™ protocol standards.

In some embodiments, the peripheral device is adapted to periodically transmit, to the sensor, via the second wireless network, the advertisement message containing a unique identifier.

In some embodiments, the sensor is configured to request additional data from the peripheral device based on receiving the advertisement message via the second wireless interface.

In some embodiments, the peripheral device is configured to transmit manufacturer identifier, serial number, device name, model number, version number, and/or battery level via the second wireless network based on receiving the additional data request from the sensor.

In some embodiments, the peripheral device is disposed on, near, or inside of a tool, toolbox, piece of equipment, building material, or packaging.

In some embodiments, the peripheral device is disposed on or near a point-of-interest.

In some embodiments, the one or more processors are adapted to, based on the advertisement message, establish a wireless connection between the sensor and the peripheral device via the second wireless network and receive, via the second wireless network, the status message from the peripheral device.

In some embodiments, the peripheral device is adapted to receive, via the second wireless network, a status request from the sensor and, based on receiving the status request, transmit, via the second wireless network, the status message to the sensor.

In some embodiments, the second wireless interface comprises a BLUETOOTH LOW ENERGY wireless interface.

In some embodiments, the peripheral device is disposed on or near a person, and wherein the peripheral device comprises a health-related sensor.

In some embodiments, the health-related sensor comprises a heart rate monitor, a thermometer, a hydration sensor, a hazardous exposure sensor, and/or a smart personal protective equipment (PPE) that detects proper use or repetitive strain.

In some embodiments, the sensor transmits a request for status to the peripheral device when the sensor is within proximity of the peripheral device.

In some embodiments, a location of the peripheral device is determined at least based in part on a location of the sensor when within proximity of the peripheral device.

In some embodiments, the system further comprises a check-in system that assigns the sensor to the monitored subject, the check-in system including a reader that is adapted to scan an identifier associated with the sensor, and to create a record of an association between the scanned sensor and the monitored subject.

In some embodiments, the sensor is adapted to determine the location of the sensor based on detection of one or more of the plurality of communication nodes in the wireless mesh network or the low-power wireless network.

In some embodiments, the determination of the location is determined responsive to detected signal strength of the one or more of the plurality of communication nodes in the wireless mesh network or the low-power wireless network.

In some aspects, a sensor is provided that includes an element that is adapted to attach the sensor to a monitored subject, a first wireless network interface, for a first wireless network, adapted to communicate with a wireless mesh network or a low-power wireless network, and a second wireless network interface, for a second wireless network, adapted to communicate with a peripheral device. The sensor includes one or more processors adapted to receive, via the second wireless network, an advertisement message from the peripheral device and, based on receiving the advertisement message, transmit, via the first wireless network, a status message or an identity message for the peripheral device to the wireless mesh network or the low-power wireless network.

In some aspects, a sensor is provided that includes an element that is adapted to attach the sensor to a monitored subject, a first wireless network interface, for a first wireless network, adapted to communicate with a wireless mesh network or a low-power wireless network, and a second wireless network interface, for a second wireless network, adapted to communicate with a mobile device and a peripheral device. The sensor includes one or more processors adapted to receive, via the first wireless network, an indicator to transmit an identification message to the mobile device, based on receiving the indicator, transmit, via the second wireless network, the identification message to the mobile device, receive, via the second wireless network, an advertisement message from the peripheral device, and based on receiving the advertisement message, transmit, via the first wireless network, a status message for the peripheral device to the wireless mesh network or the low-power wireless network.

Systems exist that alert users to dangerous working conditions, such as radiation, physical, chemical, air quality, and other dangers. However, it is appreciated that it would be useful to have personalized monitors in the workplace that could store and communicate events associated with particular workers. Such monitors would be particularly useful in the construction industry where slips/falls and other workplace accidents are commonplace. Existing systems and software tools used to monitor workplace conditions are not sufficient in identifying what has occurred to a specific worker at a specific location within the workplace.

What is needed is a system and associated interfaces that permits the monitoring of workers within the workplace environment. In one embodiment, a monitor having various sensing capabilities may be assigned to a worker (e.g., referred to herein as a monitored subject) that records various parameters that are personal to the worker. For instance, it is appreciated that there may be sensor that can be attached to the monitored subject (e.g., at the belt line) that is adapted to monitor certain parameters associated with the worker's environment. For instance, a sensor assigned to the monitored subject may be capable of determining the location of the subject, along with motion, impacts, altitude, and other environmental parameters that could affect the health or other condition of the worker. In some embodiments, the sensor is worn at the beltline to accurately measure movement of a wearer's core.

Further, it is appreciated that it may be helpful to be able to detect slips and falls at the worksite and to alert appropriate personnel in real time. A system may be provided that includes personalized sensors that record and detect environmental parameters that could affect a worker, and a distributed computer system infrastructure that is capable of processing events received from sensors, sending alerts to management personnel, reporting, showing location status among other functional capabilities. Such a system may be helpful in decreasing response time to accidents. Another benefit may include providing a record of any accidents for use in managing workers compensation claims.

It is further appreciated that it may be useful to monitor equipment at a worksite. A system may be provided that detects the presence of an operator of a piece of equipment and determines whether the operator is authorized to operate the piece of equipment. The system may determine a location of the piece of equipment, and report various statistics associated with the piece of equipment, such as fuel consumption. Such a system may be helpful, for example, in monitoring the utilization of various pieces of equipment, allowing for a supervisor to equalize the amount of time each piece of equipment is in use.

It is further appreciated that it may be useful to provide an alert of an evacuation event to a worksite. A system may be provided that receives an indication of an evacuation event and alerts the worksite of the evacuation event. For example, the system may receive the indication of the evacuation event from an external system, and may emit light and/or emit sound to alert the worksite of the evacuation event. Such a system may be helpful, for example, in increasing the efficiency of alerting workers of an evacuation event, increasing the speed at which the workers can evacuate the worksite, and thus increasing safety at the worksite. Such evacuation alerts may be provided, for example, by an alerting device that is capable of being placed at a location and can be triggered by a user, a user's sensor, a management system, or other entity. Such a device may be capable of being located and may communicate with other entities via a wireless network.

In another implementation, the system may be capable of tracking the worker as a resource in providing information to other computer systems to facilitate resource management and productivity tracking. For instance, the system may be capable of reporting when workers are on or off site, as well as their approximate locations on-site. For instance, such information may be used by a resource management and planning application to indicate when particular types of workers (e.g., plumbers) are at a construction site for a particular period of time. In one example, it may be useful to know and track in real-time how many plumbers were on a particular jobsite for how many hours for budgeting purposes.

In one implementation, individual sensors are assigned to monitored subjects, and these sensors are capable of communicating over a communication network. In one embodiment, the communication network takes the form of a wireless mesh network comprising a number of nodes that are capable of passing messages received from sensors. The mesh network may also be coupled to a distributed computer system that is capable of receiving and processing event data received from the sensors. Such event data may be received, stored, and processed and may result in alert messages being sent to particular manager users. Further, such data may be analyzed and presented to manager users for the purposes of monitoring individual and groups of users, reporting, determining compliance, budgeting, resource planning, as well as other management operations.

According to one implementation, the sensor may be a wearable portion of the system. In one example, the sensor is a small battery—powered unit worn on the body of the monitored subject. For instance, the sensor may be worn on the belt, although in some cases it may be worn in a pocket of a safety vest or may be integrated into other apparel/equipment. In one example implementation, the sensor is worn on a belt around a subject's waist which allows the sensor to accurately measure movement of a person's core.

In one implementation, the sensor may include one or more controls and/or indications that may be used by a monitored subject. In one example implementation, the sensor may include a button that permits the wearer to indicate to others that an emergency or other situation is occurring, causing a message and/or alert to be sent to a management system (e.g., a manager's device and/or sensor). In another example, the sensor may include one or more indicators, such as lights (e.g., LEDs), audio indicators (e.g., a piezo sound transducer), to indicate a sensor/wearer status, indicate event status, and/or provide feedback to the wearer or other user.

As discussed, the system may be used to perform a number of functions associated with monitoring a subject at the worksite. For instance, the system may be capable of determining certain types of events that may be detrimental to the subject (e.g., slips/falls, fall off of a ladder/building, impacts, throwing of the sensor, dropping of the sensor, running, jumping, etc.). For instance, the system may determine, in association with an event, the location of the event, the time that the event occurred, and any associated parameters that may be necessary to understand the nature of the event. For example, the system made be able to determine how high of a fall the subject experienced, how hard the fall, the type of fall, etc. The system may also be capable of determining whether the sensor was actually worn by the subject at the time of the event (e.g., to prevent fraudulent worker's compensation claims). In another implementation, the system may be configured to determine the subject's altitude at a particular location to determine their location (e.g., in a building).

The system may also perform a number of identification/compliance functions such as determining if the subject is on a jobsite at a particular time, geo-fencing functions such as, for example, determining whether a person is permitted in a particular area, and other monitoring activities and functions. Such information may be capable of being used for resource management, budgeting, safety, compliance and other functions.

Further, it is appreciated that it may be helpful to have a sensor device that improves battery life. Accordingly, certain features including, but not limited to, how the sensor communicates, when the sensor is active, and how the sensor responds to events can contribute towards a longer battery life. In one embodiment, the sensor communicates using a protocol wherein the sensor communicates only during predetermined time slots. For instance, upon assignment to a particular monitored subject, system components may assign a particular sensor a timeslot in which it communicates on the mesh network. Because the sensor communicates only during this period, the amount of time that the sensor needs to be active (e.g., and powering antennas and other interface circuits), is reduced. Further, the detection of particular inputs from the sensor may cause the sensor to become active. Other modes of sensor and/or system operation may be provided that are conducive to preserving power.

Further, specialized communication nodes may be provided that are configurable in a mesh-type communication network. Such nodes may be distributed throughout the workplace and facilitate sensor communication of event and status information. Some nodes repeat information received by sensors to other nodes, and other types (e.g., gateway nodes) are connectable to other types of data networks (e.g., a conventional data network) and communicate the sensor data to computer systems using standard protocols (e.g., TCP/IP).

According to one aspect, a system is provided comprising a plurality of communication nodes configured in a wireless mesh network, a sensor, assigned to a monitored subject, comprising a wireless network interface adapted to communicate with the mesh network, a processor adapted to detect a plurality of workplace events occurring to the monitored subject and wherein the processor is further adapted to communicate an event message over the wireless mesh network to a managing computer system, wherein the event message comprises a location of the event, information indicating that the monitored subject experienced at least one event of a group comprising a fall event, a jump event, and a slip and fall event. According to one embodiment, the sensor further comprises at least one accelerometer, a gyroscopic element, and a pressure sensor.

According to another embodiment, the sensor is further adapted to detect, responsive to a trigger, data for a defined period of time from the at least one accelerometer, gyroscopic element, and pressure sensor, and communicate the data within the event message. According to another embodiment, the system is adapted to analyze at least one of the plurality of workplace events, the analysis of at least one event including a determination of a freefall duration, a detection of a jump, an altimeter analysis, an impact detection, a rotational analysis, a post-fall analysis, and a proximity sensor analysis.

According to another embodiment, the system further comprises a managing computer system having an interface through which a user is capable of viewing information relating to the plurality of workplace events. According to another embodiment, the sensor further comprises a proximity sensor that senses when the sensor is being worn by the assigned subject, and wherein an indication of the proximity sensor is used by the system to determine a validity of at least one of the workplace events. According to another embodiment, the plurality of communication nodes and sensor are adapted to transmit information using a plurality of communication channels, wherein each transmitter has specific time slots in which to transmit the information. According to another embodiment, the system is adapted to dynamically assign time slots for each of the transmitters.

According to another embodiment, the system further comprises a check-in system that assigns the sensor to the monitored subject, the check-in system including a reader that is adapted to scan an identifier associated with the sensor, and to create a record of an association between the scanned sensor and the monitored subject. According to another embodiment, the sensor is adapted to determine the location of the sensor based on detection of one or more of the plurality of communication nodes in the wireless mesh network. According to another embodiment, the determination of the location is determined responsive to detected signal strength of the one or more of the plurality of communication nodes in the wireless mesh network. According to another embodiment, the processor is adapted to determine an altitude of the monitored subject.

According to another embodiment, the managing computer system further comprises at least one user interface control that when selected, causes the interface to display event information relating to at least one workplace event that has occurred with the monitored subject. According to another embodiment, the managing computer system further comprises at least one user interface that displays one or more events associated with the monitored subject. According to another embodiment, the managing computer system further comprises at least one user interface that displays a graphic representation of a workplace site and a representation of one or more monitored subjects located one on the graphic representation responsive to a determination of locations of one or more sensor devices associated with respective ones of the one or more monitored subjects.

According to another embodiment, the sensor comprises an accelerometer adapted to detect a free fall event. According to another embodiment, the sensor is configured to operate in a low power mode wherein the processor operates in a stand-by mode and wherein the gyroscopic element is powered off. According to another embodiment, the sensor is adapted to transition from the low power mode to an active mode responsive to encountering a triggering event. According to another embodiment, the processor, responsive to the triggering event, is adapted to transition to an operating mode, and is adapted to power on the gyroscopic element and record data from the at least one accelerometer, gyroscopic element, and pressure sensor. According to another embodiment, the triggering event occurs responsive to a detection by the at least one accelerometer.

According to another embodiment, the sensor comprises a sensor element that indicates whether the sensor is being worn by the monitored subject. According to another embodiment, the sensor element includes a proximity sensor adapted to detect a presence of a monitored subject. According to another embodiment, the sensor element includes a clip switch adapted to indicate a change in status of a clip that attaches the sensor to the monitored subject. According to another embodiment, the processor is adapted to detect one or more false events. According to another embodiment, the one or more false events includes at least one of a group comprising a sensor drop event and a sensor throw event.

According to another aspect, a non-volatile computer-readable medium is provided encoded with instructions for execution on a computer system, the instructions when executed, provide a system comprising a plurality of communication nodes configured in a wireless mesh network, a sensor, assigned to a monitored subject, comprising, a wireless network interface adapted to communicate with the mesh network, a processor adapted to detect a plurality of workplace events occurring to the monitored subject and wherein the processor is further adapted to communicate an event message over the wireless mesh network to a managing computer system, wherein the event message comprises a location of the event, information indicating that the monitored subject experienced at least one event of a group comprising a fall event, a jump event, and a slip and fall event. According to another embodiment, the sensor further comprises at least one accelerometer, a gyroscopic element, and a pressure sensor.

According to another embodiment, the sensor is further adapted to detect, responsive to a trigger, data for a defined period of time from the at least one accelerometer, gyroscopic element; and pressure sensor, and communicate the data within the event message. According to another embodiment, the system is adapted to analyze at least one of the plurality of workplace events, the analysis of at least one event including a determination of a freefall duration, a detection of a jump, an altimeter analysis, an impact detection, a rotational analysis, a post-fall analysis, and a proximity sensor analysis.

According to another embodiment, the system further comprises a managing computer system having an interface through which a user is capable of viewing information relating to the plurality of workplace events. According to another embodiment, the sensor further comprises a proximity sensor that senses when the sensor is being worn by the assigned subject, and wherein an indication of the proximity sensor is used by the system to determine a validity of at least one of the workplace events. According to another embodiment, a plurality of communication nodes and sensor are adapted to transmit information using a plurality of communication channels, wherein each transmitter has specific time slots in which to transmit the information.

According to another embodiment, the system is adapted to dynamically assign time slots for each of the transmitters. According to another embodiment, the system further comprises a check-in system that assigns the sensor to the monitored subject, the check-in system including a reader that is adapted to scan an identifier associated with the sensor, and to create a record of an association between the scanned sensor and the monitored subject. According to another embodiment, the sensor is adapted to determine the location of the sensor based on detection of one or more of the plurality of communication nodes in the wireless mesh network.

According to another embodiment, the determination of the location is determined responsive to detected signal strength of the one or more of the plurality of communication nodes in the wireless mesh network. According to another embodiment, the processor is adapted to determine an altitude of the monitored subject.

According to another embodiment, the managing computer system further comprises at least one user interface control that when selected, causes the interface to display event information relating to at least one workplace event that has occurred with the monitored subject. According to another embodiment, the managing computer system further comprises at least one user interface that displays one or more events associated with the monitored subject. According to another embodiment, the managing computer system further comprises at least one user interface that displays a graphic representation of a workplace site and a representation of one or more monitored subjects located one on the graphic representation responsive to a determination of locations of one or more sensor devices associated with respective ones of the one or more monitored subjects. According to another embodiment, the sensor comprises an accelerometer adapted to detect a free fall event.

According to another embodiment, the sensor is configured to operate in a low power mode wherein the processor operates in a stand-by mode and wherein the gyroscopic element is powered off. According to another embodiment, the sensor is adapted to transition from the low power mode to an active mode responsive to encountering a triggering event. According to another embodiment, the processor, responsive to the triggering event, is adapted to transition to an operating mode, and is adapted to power on the gyroscopic element and record data from the at least one accelerometer, gyroscopic element, and pressure sensor. According to another embodiment, the triggering event occurs responsive to a detection by the at least one accelerometer.

According to another aspect, a device is provided comprising a memory element, a processor coupled to the memory element; and an accelerometer, wherein the processor is adapted to determine, based on an output signal of the accelerometer, whether the device should be placed in a programming mode. According to one embodiment, the processor is activated responsive to a signal produced by the accelerometer. According to another embodiment, the processor is adapted to determine whether the device is placed in a particular orientation, and if so determined, the processor places the device in the programming mode.

According to another embodiment, the device is a sensor capable of being programmed for a particular application. According to another embodiment, the processor is further adapted to, after placing the device in the programming mode, search for a signal from a programming device. According to another embodiment, the device is a part of a group of one or more similar devices packaged together.

According to another embodiment, the group of one or more similar devices can be programmed simultaneously if the group of one or more similar devices are placed in the particular orientation. According to another embodiment, the processor is adapted to place the device in the programming mode responsive to the device being placed in the particular orientation during a predetermined time period. According to another embodiment, the processor is adapted to place the device in the programming mode responsive to the device being placed in a sequence of two or more orientations.

According to another embodiment, the device is assigned to a monitored subject. According to another embodiment, the device is designed to detect a plurality of workplace events experienced by the monitored subject. According to another embodiment, the device, when placed in the programming mode, receives a set of predetermined parameters from a programming device. According to another embodiment, at least one of the set of predetermined parameters includes an operating parameter associated with a specific worksite.

According to another aspect, a sensor is provided comprising an element that is adapted to attach the sensor to a monitored subject, a wireless network interface adapted to communicate with a network of communication nodes, a processor adapted to detect a plurality of workplace events occurring to the monitored subject and wherein the processor is further adapted to communicate an event message over the network to a managing computer system, wherein the event message comprises a location of the event, and information indicating that the monitored subject experienced at least one event of a group comprising a fall event, a jump event, and a slip and fall event. In one embodiment, the sensor further comprises at least one of a group of elements comprising at least one accelerometer, a gyroscopic element, and a pressure sensor.

According to another embodiment, the sensor is further adapted to detect, responsive to a trigger, data for a defined period of time from the at least one accelerometer, gyroscopic element, and pressure sensor, and communicate the data within the event message to a management system. According to another embodiment, the sensor is adaptively coupled to the management system, and wherein the management system is adapted to analyze at least one of the plurality of workplace events, the analysis of the at least one event including a determination of a freefall duration, a detection of a jump, an altimeter analysis, an impact detection, a rotational analysis, a post-fall analysis, and a proximity sensor analysis. According to another embodiment, the sensor further comprises a proximity sensor that senses when the sensor is being worn by the monitored subject, and wherein an indication of the proximity sensor is used by the system to determine a validity of at least one of the workplace events.

According to another embodiment, the sensor and the network of communication nodes are adapted to transmit information using a plurality of communication channels, wherein each transmitter has specific time slots in which to transmit the information. According to another embodiment, the sensor, when not in the sensor's specific time slot in which to transmit the information, operates in a low power mode. According to another embodiment, the sensor further includes a check-in capability, wherein the check-in capability associates the sensor with the monitored subject and communicates the association over the network to the managing computer system. According to another embodiment, the check-in capability is performed using RFID.

According to another embodiment, the sensor is adapted to determine the location of the sensor based on detection of one or more communication nodes in the network of communication nodes. According to another embodiment, the determination of the location is determined responsive to detected signal strength of the one or more communication nodes in the network of communication nodes. According to another embodiment, the sensor is adapted to determine an altitude of the monitored subject.

According to another embodiment, the sensor comprises an accelerometer adapted to detect a free fall event. According to another embodiment, the sensor is configured to operate in a low power mode wherein the processor operates in a stand-by mode and wherein the gyroscopic element is powered off. According to another embodiment, the sensor is adapted to transition from the low power mode to an active mode responsive to detecting a triggering event. According to another embodiment, the processor, responsive to the triggering event, is adapted to transition to an operating mode, and is adapted to power on the gyroscopic element and record data from the at least one accelerometer, gyroscopic element, and pressure sensor.

According to another embodiment, the triggering event occurs responsive to a detection by the at least one accelerometer. According to another embodiment, the sensor comprises a sensor element that indicates whether the sensor is being worn by the monitored subject. According to another embodiment, the sensor element includes a proximity sensor adapted to detect a presence of the monitored subject.

According to another embodiment, the sensor element includes a clip switch adapted to indicate a change in status of a clip that attaches the sensor to the monitored subject.

According to another aspect, a communication system is provided comprising a plurality of communication nodes configured in a wireless mesh network, the plurality of communication nodes including a plurality of router nodes, and a plurality of sensor nodes in communication with one or more of the plurality of router nodes, wherein the plurality of router nodes are capable of routing event data generated by the plurality of sensor nodes to a management system, and wherein at least one router system is configured to provide location data to the management system.

According to one embodiment, the at least one router system is configured to provide location data to the management system via a gateway node. According to another embodiment, the plurality of router nodes are positioned at fixed locations within a workplace, and wherein the plurality of router nodes are used to determine a location of at least one of the plurality of sensor nodes. According to another embodiment, at least one of the plurality of sensor nodes is adapted to detect at least one event experienced by a monitored subject, the at least one event being determined from a group comprising a fall event, a jump event, and a slip and fall event.

According to another embodiment, the at least one of the plurality of sensor nodes is adapted to detect at least one event experienced by a monitored subject, the at least one event being a false event including at least one of a sensor drop event and a sensor throw event. According to another embodiment, the plurality of communication nodes and the plurality of sensor nodes are adapted to transmit information using a plurality of communication channels, wherein each transmitter has specific time slots in which to transmit the information.

According to another embodiment, the communication system is adapted to dynamically assign time slots for each of the transmitters. According to another embodiment, the plurality of sensor nodes and the plurality of communication nodes communicate by utilizing a time division multiple access scheme wherein each transmitter has an assigned time slot in which the respective transmitter is allowed to transmit.

According to another embodiment, each sensor node in the plurality of sensor nodes, when not communicating in the sensor node's assigned time slot, operates in a low power mode. According to another embodiment, each sensor node in the plurality of sensor nodes communicates to the plurality of communication nodes on a predetermined frequency. According to another embodiment, no two adjacent router nodes in the plurality of router nodes transmit on the same communication channel.

According to another embodiment, the plurality of router nodes determine the location of at least one of the plurality of sensor nodes by detecting signal strength. According to another embodiment, the plurality of router nodes and the plurality of sensor nodes are adapted to transmit information using a plurality of communication channels, wherein each transmitter has specific time slots in which to transmit information. According to another embodiment, the system is adapted to dynamically assign time slots for each of the transmitters.

According to another embodiment, the system further comprises a check-in system that assigns at least one of the plurality of sensor nodes to the monitored subject, the check-in system including a reader that is adapted to scan an identifier associated with the at least one sensor node, and to create a record of an association between the at least one sensor node and the monitored subject. According to another embodiment, the sensor is adapted to determine the location of at least one of the plurality of sensor nodes based on detection of one or more of the plurality of communication nodes in the wireless mesh network. According to another embodiment, the determination of the location is determined responsive to detected signal strength of the one or more of the plurality of communication nodes in the wireless mesh network.

According to another embodiment, the management system is adapted to determine an altitude of at least one of the plurality of sensor nodes. According to another embodiment, the management system is adapted to determine a location within a worksite of a monitored subject associated with the at least one sensor node based on a detected altitude of the at least one sensor node and a geographic location of the at least one sensor node. According to another embodiment, the management system stores for a worksite, a map of signal strengths and altitudes to particular worksite locations.

According to another aspect, a sensor is provided comprising an element that is adapted to attach the sensor to a monitored subject; and an element that is adapted to sense if the sensor is removed from the monitored subject. According to another embodiment, the element adapted to sense includes a proximity sensor. According to another embodiment, the element adapted to sense includes a switch integrated into the element adapted to attach the sensor to the monitored subject.

According to another embodiment, the sensor includes a processor adapted to detect a plurality of workplace events occurring to the monitored subject within a workplace. According to another embodiment, the sensor further comprises at least one of a plurality of elements comprising at least one accelerometer, a gyroscopic element, and a pressure sensor. According to another embodiment, the sensor further comprises a processor adapted to store event data relating to the sensed removal of the sensor from the monitored subject.

According to another embodiment, the processor is further adapted to send an event message including the event data to an event monitoring entity. According to another embodiment, the event monitoring entity is adapted to send an alert responsive to receipt of the event message. According to another embodiment, the sensor is adapted to detect one or more false events. According to another embodiment, the one or more false events includes at least one of a group comprising a sensor drop event and a sensor throw event.

According to another embodiment, the sensor further determines whether it is attached to an animate or inanimate object. According to another embodiment, the sensor further comprises an altimeter and a proximity sensor. According to another embodiment, the sensor, in determining if the sensor is removed from the monitored subject, employs one or more of a group comprising, jump detection, motion integration, altimeter analysis, impact detection, rotation analysis, post-fall analysis, and proximity sensor analysis. According to another embodiment, the sensor is further adapted to detect if the monitored subject is wearing more than one sensor.

According to another embodiment, the sensor is assigned to a specific monitored subject, and the sensor is adapted to detect if the sensor is attached to a subject other than the specific monitored subject.

According to another embodiment, an equipment sensor is provided, comprising: a mechanical interface configured to attach the equipment sensor to a piece of equipment; a proximity sensor configured to detect a presence of an operator within a range of the piece of equipment; at least one altimeter adapted to detect an altitude of the piece of equipment; at least one accelerometer adapted to detect motion of the piece of equipment; and a wireless network interface adapted to communicate data to an external system, the data comprising at least one of a group of information including: the altitude of the piece of equipment; the presence of the operator of the piece of equipment; and the motion of the piece of equipment.

According to another embodiment, an evacuation alert device is provided, comprising: a mechanical interface adapted to affix the evacuation alert device; a wireless network interface adapted to communicate with an external system, wherein the external system indicates an evacuation event to the evacuation alert device; at least one speaker adapted to emit a sound when the evacuation event is indicated; and a plurality of light emitting units adapted to emit light when the evacuation event is indicated.

According to another embodiment, the evacuation alert device may comprise a button, wherein the evacuation alert device, when the button is pressed, may be adapted to pair the evacuation alert device to the external system. According to another embodiment, the evacuation alert device may be adapted to pair the evacuation alert device to the external system when the button is pressed for a predetermined amount of time. According to another embodiment, the evacuation alert device may comprise at least one second light emitting unit adapted to emit light when the evacuation alert device is paired to the external system.

According to another embodiment, the evacuation alert device, when the button is pressed, may be further adapted to test the functionality of the evacuation alert device. According to another embodiment, testing the functionality of the evacuation alert device may comprise emitting sound from the at least one speaker and emitting light from the plurality of light emitting units.

According to another embodiment, the plurality of light emitting units may be adapted to emit light in a plurality of different patterns. According to another embodiment, the plurality of light emitting units may be adapted to emit light in a pattern, of the plurality of different patterns, depending on a type of the evacuation event. According to another embodiment, the plurality of light emitting units may be disposed on at least two sides of the evacuation alert device. According to another embodiment, the plurality of light emitting units may be LEDs.

According to another embodiment, the at least one speaker may be adapted to emit a plurality of different sounds. According to another embodiment, the at least one speaker may be adapted to emit a sound, of the plurality of different sounds, depending on a type of the evacuation event. According to another embodiment, the evacuation alert device may comprise a battery, wherein, when the battery drops below a threshold of charge, the at least one speaker may be adapted to make a noise indicating the battery dropped below the threshold of charge.

According to another embodiment, the evacuation alert device may comprise at least one third light emitting unit adapted to emit light of a higher intensity than the light emitted by the plurality of light emitting units. According to another embodiment, the at least one third light emitting unit may be adapted to provide emergency light during the evacuation event. According to another embodiment, the at least one third light emitting unit may be adapted to emit light of a different color than the light emitted by the plurality of light emitting units. According to another embodiment, the at least one third light emitted unit may be adapted to emit white light and the plurality of light emitting units may be adapted to emit red light.

According to another embodiment, the mechanical interface may be adapted to affix the evacuation alert device to a wall or to a ceiling. According to another embodiment, the mechanical interface may comprise at least one of the group consisting of: at least one screw; an adhesive; and at least one magnet.

According to another embodiment, the evacuation alert device may comprise a cover, wherein the wireless network interface, the at least one speaker, and the plurality of light emitting units are disposed inside the cover. According to another embodiment, the cover may be weatherproof. According to another embodiment, the cover may include a speaker grill that may allow for sound emitted from the at least one speaker to pass through the cover. According to another embodiment, the cover may allow for light emitted by the plurality of light emitting units to pass through the cover. According to another embodiment, the button of the evacuation alert device may be pressed through the cover.

According to another embodiment, the evacuation event may be indicated by an authorized person, at least by causing the external system to indicate the evacuation event to the evacuation alert device. According to another embodiment, the wireless network interface may be adapted to communicate on a wireless mesh network. According to another embodiment, the wireless network interface may be adapted to communicate, on the wireless mesh network, with one or more entities selected from the group consisting of: at least one sensor device; at least one supervisor device; and at least one management system. According to another embodiment, the evacuation alert device may be adapted to receive messages from the one or more entities.

According to another embodiment, the one or more entities may be at least one management system, and the evacuation alert device may be adapted to send at least one message to the at least one management system. According to another embodiment, the wireless network interface may be adapted to communicate on the wireless mesh network to determine a location of the evacuation alert device. According to another embodiment, the wireless network interface may be adapted to send at least one signal to at least one node on the wireless mesh network, and the location of the evacuation alert device may be determined by a strength of the at least one signal received by the at least one node on the mesh network.

According to another embodiment, the management system may store a history of the evacuation event. According to another embodiment, the management system may be adapted to display the history of the evacuation event to a user.

According to another embodiment, the one or more entities may include at least one sensor device and a management system, wherein the at least one sensor device is assigned to a worker, and may be adapted to send a signal to the management system indicating that the worker has acknowledged the evacuation event indicated by the evacuation alert device. According to another embodiment, the management system may be adapted to allow a user to track workers who have acknowledged the evacuation event indicated by the evacuation alert device and workers who have not acknowledged the evacuation event indicated by the evacuation alert device. According to another embodiment, the management system may be adapted to allow the user to view locations of the workers who have acknowledged the evacuation event indicated by the evacuation alert device and locations of the workers who have not acknowledged the evacuation event indicated by the evacuation alert device.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIGS. 13-24 show several management interfaces according to various aspects of the embodiments described herein;

FIGS. 30-34 show several management interfaces according to various aspects of the embodiments described herein;

DETAILED DESCRIPTION

Figure 1:
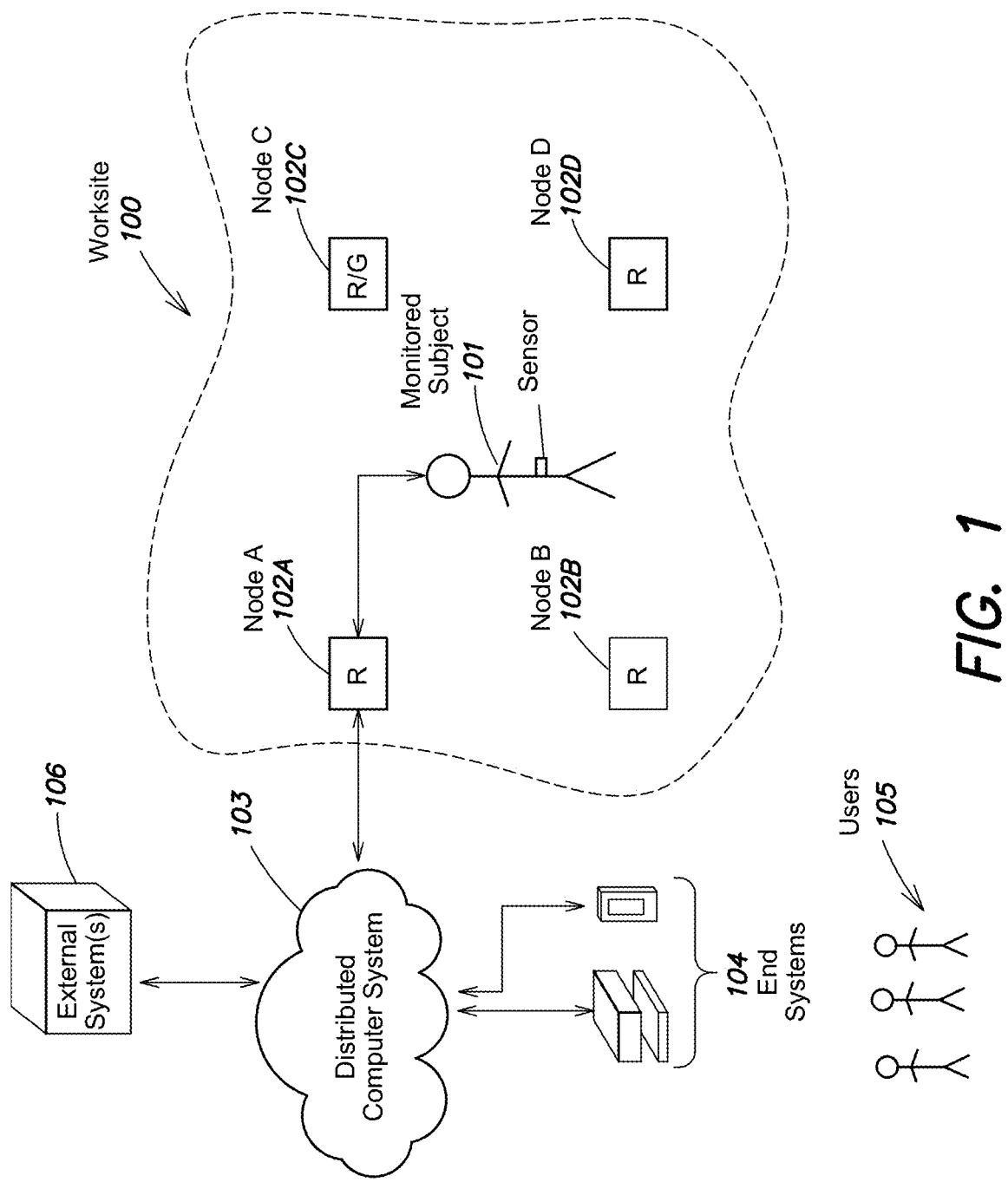
FIG. 1 shows a block diagram of a distributed computer system capable of implementing various aspects of the embodiments described herein.

According to one implementation, a system is provided that is capable of monitoring subjects and equipment throughout the workplace. For instance, the system may include a monitor having various sensing capabilities that may be assigned to a monitored subject, the monitor being capable of recording various parameters that are personal to the worker. For instance, it is appreciated that there may be a sensor that can be attached to the monitored subject (e.g., at the belt line) that is adapted to monitor certain parameters associated with the worker's environment. As discussed, according to one embodiment, the belt line of a worker (or other center of mass location) may be beneficial for monitoring the location of the worker, detecting accurately slip, fall, and other events, and avoiding false events. For instance, a sensor assigned to the monitored subject may be capable of determining the location of the subject, along with motion, impacts, altitude, and other environmental parameters that could affect the health or other condition of the worker. Further, it is appreciated that it may be helpful to record and visualize various information from individual or a collection of workers that are obtained through the monitoring function.

According to some embodiments, an alerting system is provided to permit workers to be warned regarding workplace issues in a timely manner. As discussed, it may be beneficial to have the capability of warning others in a work area using an alert device that is capable of receiving alert messages from various entities and providing warnings in the form of light and sound to a surrounding area. Such devices may be capable of communicating on a wireless mesh network, and may be operable to receive alert messages from different entities, such as sensors, management systems, communication devices (e.g., a supervisor mobile device), or other entities. Further, systems may be provided that allow alert events that are translated to evacuation alerts to be tracked, acknowledged by users (e.g., sensor wearers), and cleared.

In another instance, the system may include an equipment monitor having various sensing capabilities that may be assigned to a piece of equipment, the equipment monitor being capable of recording various parameters associated with the piece of equipment. For instance, the equipment monitor may be attached to the piece of equipment and may monitor certain parameters associated with the piece of equipment's environment. The equipment monitor may be capable of determining the location of the piece of equipment, along with motion, altitude, and other parameters that may affect the state or condition of the piece of equipment. Further, the equipment monitor may be capable of analyzing these parameters using a set of programmable coefficients and thresholds to determine the operating mode or state of a particular type of equipment. The equipment monitor may be located on the piece of equipment in a location such that the equipment monitor may determine if an operator is present at the piece of equipment. The equipment monitor may emit a Radio Frequency signal which may be receiver by a sensor worn by a worker such that the worker's sensor can determine relative proximity to the equipment sensor. Further, it is appreciated that it may be helpful to record and visualize various information from individual or a collection of pieces of equipment that are obtained through the monitoring function.

FIG. 1 shows a block diagram of a distributed computer system 103 capable of implementing various aspects of the embodiments described herein. In particular, distributed system 103 includes one or more end systems 104, one or more nodes (e.g., nodes 102A-102D) configured in a wireless network, and one or more sensors assigned to monitored subjects (e.g., monitored subject 101). Some or all of these entities may be coupled through a one or more communication networks, such as by a wireless network, the Internet, and the like.

Generally, users such as a managing user at a particular worksite (e.g., users 105 at worksite 100) may access a management program through a client application that is executed on one or more of end systems (e.g., end systems 104). End systems 104 may include, for example, a desktop computer system, mobile device, tablet or any other computer system having a display.

As discussed, various aspects of the embodiments described herein relate to interfaces through which the user can interact with a management system (e.g., management system 101) to monitor subjects and equipment and perform management functions using their monitored data. To this end, a client application may be provided that may include one or more interfaces through which management users access the distributed computer system 103. Other applications may be provided that permit management users to assign sensors to monitored subjects and equipment at the worksite, and to retrieve and reassign sensors after a particular monitored subject has left the worksite or a piece of equipment is no longer in use. Some system aspects relate to monitoring workers and equipment that travel from one site to another as well.

Further, sensor data including events, indications of the location of an event, evacuation alerts associated with an event, the time at which an event occurred, and any parameters associated with that event may be communicated through a communication network to the distributed computer system (e.g. computer system 103). In one embodiment, a logical location (e.g., a specific room on a specific floor of a building) may be inferred by the system, responsive to an altitude of the sensor, and determined location of the user or the piece of equipment (e.g., based on relative position of the sensor to one or more fixed locations). As discussed, the communication network may be a wireless network that is configured and arranged on a particular worksite (e.g., worksite 100). In one implementation, the wireless network may be constructed of a number of wireless nodes (e.g., nodes 102A-102D) that communicate together to form a mesh-type network.

According to one embodiment, a sensor associated with a monitored subject or piece of equipment may experience certain environmental parameters within the workplace, and may store events within a memory of the sensor device. In one embodiment, the sensor periodically communicates with a computer system (e.g., distributed computer system 103) to transfer event messages. Such event messages may be received and stored within one or more storage elements of the distributed computer system. Information associated with those events may be presented, for example, within a management interface, within an event message sent to management users, and/or sent to one or more external systems (e.g., a resource planning system).

Figure 2:
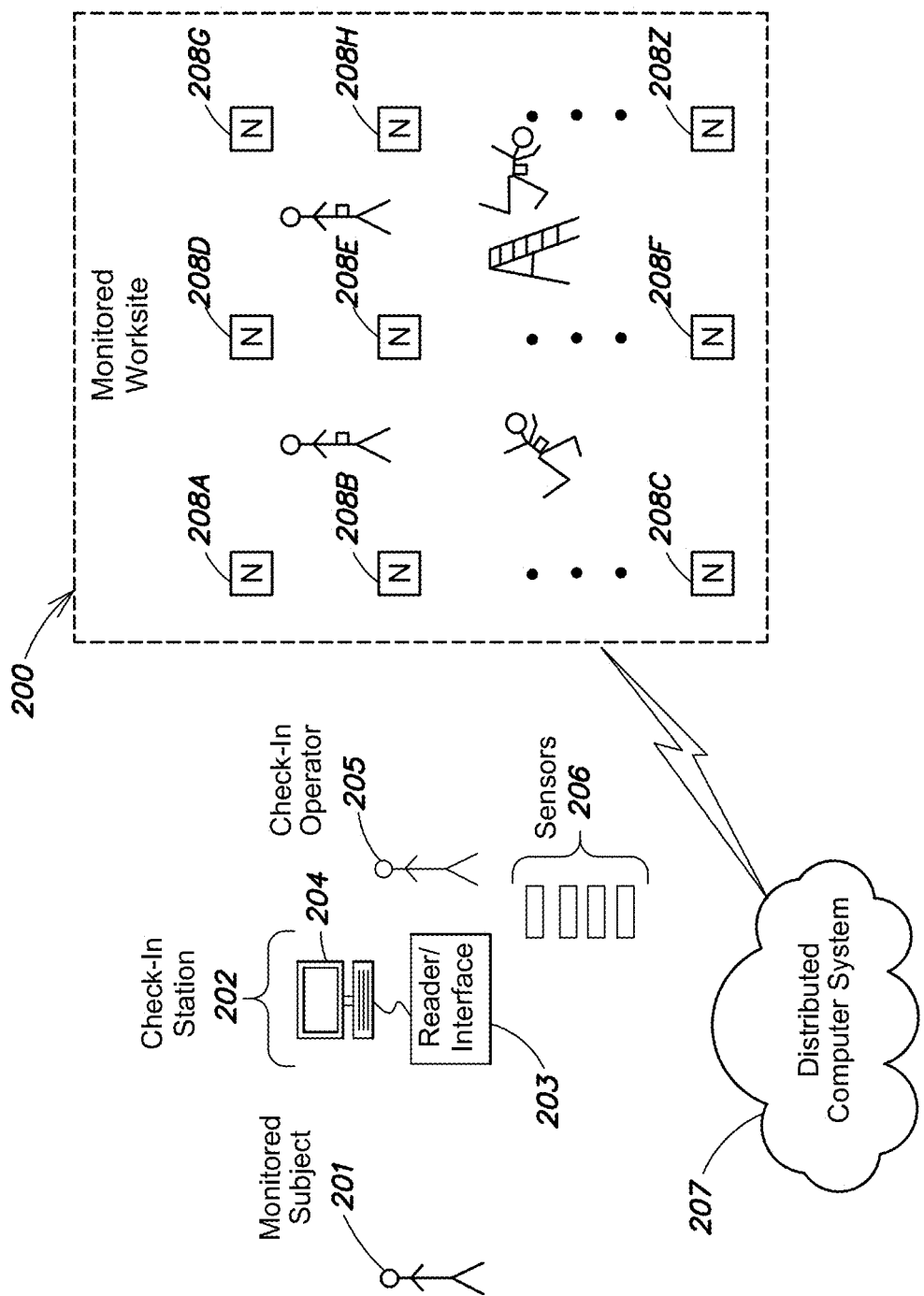
FIG. 2 shows an exemplary check-in station according to one embodiment of the embodiments described herein.

FIG. 2 shows an exemplary check-in station (e.g. check-in station 202) according to one embodiment. In one embodiment, a check-in station may be provided that permits one or more check-in operators (e.g., operator 205) to associate monitored subjects (e.g., monitored subject 201) with respective sensors (e.g., sensors 206). To this end, check in station 202 may include one or more computer systems (e.g., system 204) having one or more management interfaces that allow the check-in operator to associate a sensor with a monitored subject. In one implementation, system 204 includes a reader/interface 203 that has the capability of identifying sensors individually during the check-in process. For instance, reader/interface 203 may identify a sensor using RFID.

System 204 may also be capable of identifying a monitored subject 201 at the worksite (e.g., worksite 200). For instance, the monitored subject may have one or more user identifications that can be read by one or more systems (e.g., system 204). Thus, an operator user may scan an ID of a subject or perform any other method for identifying the subject (e.g., receive biometric data, view a picture of the subject and visually identify him/her, or the like) and by scanning a sensor using a computer system at the checkpoint, the computer system associates the monitored subject with a particular sensor. A record identifying that particular monitored subject to be stored within the memory of the distributed computer system (e.g., distributed computer system 207). Thereafter, the system may monitor events and other parameters associated with the assigned sensor as the monitored subject operates within the monitored worksite.

As discussed earlier, a wireless communication network may be configured on the worksite including one or more nodes (e.g., nodes 208A-208ZZ) that are interconnected within a mesh network. Monitored subjects (e.g., monitored subject 101) operating within the monitored worksite (e.g., worksite 200) encounter various conditions within the worksite, and their assigned sensor devices track and record events associated with those particular conditions. Further, the sensors communicate over the mesh network by communicating with one or more nodes which relay the messages to the distributed computer system (e.g., computer system 207). Distributed computer system 207 may include one or more management interfaces used for the purpose of monitoring users, events, and their associated data.

In one embodiment, the system is capable of supporting a worker or piece of equipment traveling between sites. For instance, the sensor may, according to one implementation, be capable of identifying and joining a mesh network at any one of multiple geographically distinct locations. Upon joining any network, all of the features of the sensor will be available, along with identification of the site's network to which the sensor is connected. The system may be associated (e.g., using a management system) to associate the sensor with multiple mesh networks, and when the sensor comes within a communication range of the network, the sensor automatically joins the network. This may be useful, for example, for a supervisory worker or other role that requires visits to multiple locations.

In another embodiment, the system is capable of supporting a worker or piece of equipment traveling between sites wherein events may be locally stored within the sensor along with location data. For instance, the sensor may, according to one implementation, be capable of storing alerts detected when not connected to the mesh network, or alternatively, transmitting them through an alternate network (e.g., cell phone network, BLUETOOTH, or other communication capability). The sensor may also be configured to transition to an unconnected mode when not in range of the mesh network (or any other network).

Figure 3:
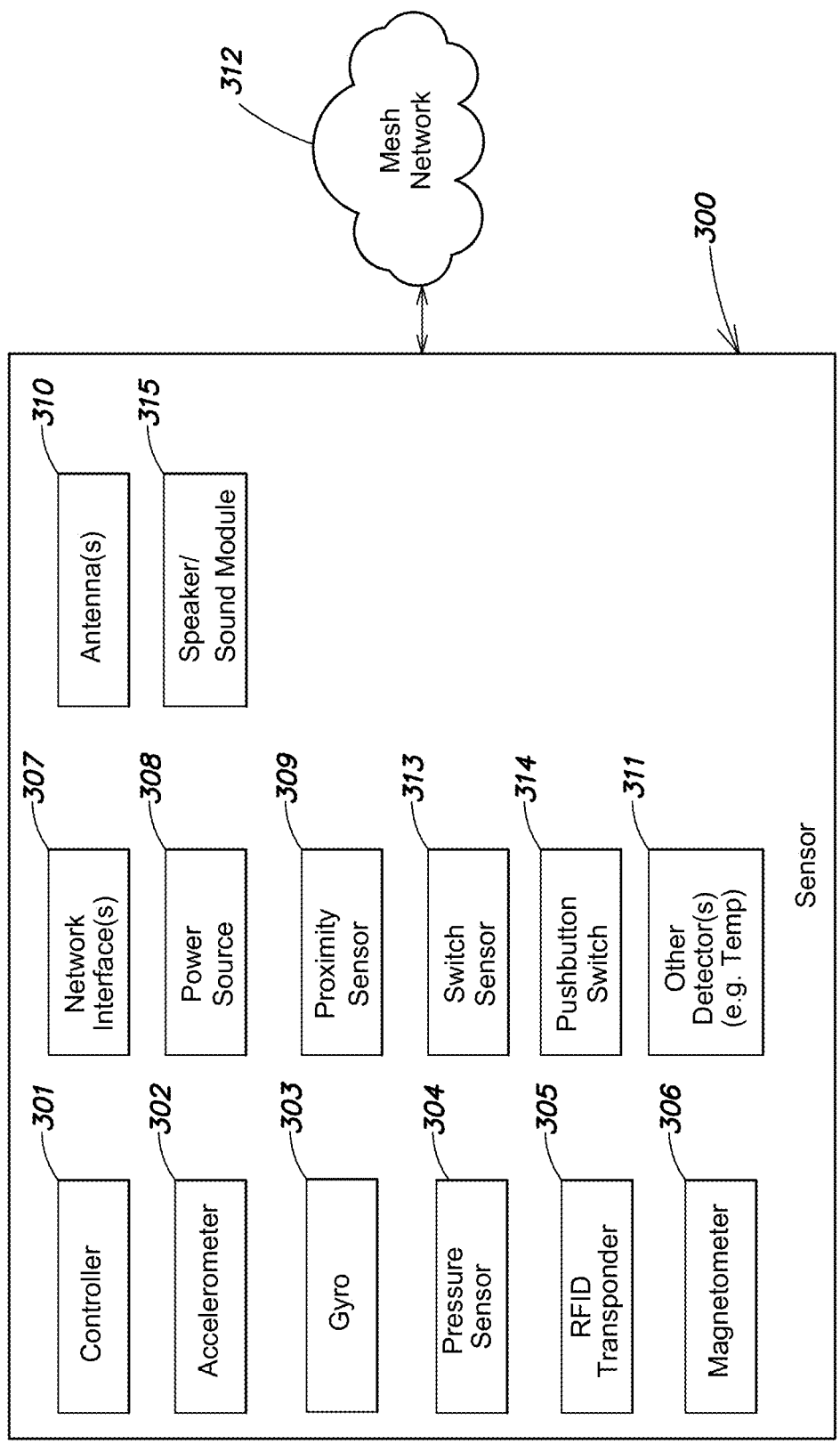
FIG. 3 shows an exemplary sensor architecture according to one embodiment of the embodiments described herein.

FIG. 3 shows one embodiment of a sensor device according to various aspects of the embodiments described herein. For instance, sensor 300 may include one or more components including a processing component that includes, but is not limited to, a controller 301 that is capable of processing data. Controller 301 may be, for example, a microprocessor, microcontroller or other processing entity that is capable of receiving event data, performing analyses of the data, and communicating information over one or more communication interfaces. Components may be coupled to the controller internal to the sensor using one or more connections, circuits, busses or other connection elements.

Device 300 may also include one or more sensing elements, such as accelerometers (e.g., accelerometer 302), gyros (e.g. Gyro 303), pressure sensors (e.g., pressure sensor 304), magnetometers (e.g., magnetometer 306), or any other detector type (e.g., other detectors 311 (e.g., temperature)). As discussed, device 300 may be RFID capable, and to this end, device 300 may include an RFID transponder (e.g. transponder 305). When scanned, the RFID transponder may provide an identifier of the particular sensor device (e.g., device 300). The RFID transponder or tag may be an active tag, a passive tag, battery-assisted passive tag, or other implementation. The RFID function can be implemented in conjunction with or separate from other sensor functions. In an alternative embodiment, RFID capability may be built in to one or more of the mesh network nodes, and a control on the node may be provided that permits a sensor to be admitted to the network without a separate computer system (e.g., at a check-in location). In such a case, the network node, after scanning the RFID of the sensor, sends a message over an administration channel to admit the sensor to the network.

Device 300 may also include one or more network interfaces (e.g., network interface 307) through which the sensor device communicates information to other systems. To this end, sensor device 300 may also include one or more antennas 310 that permit the sensor to communicate wirelessly to one or more mesh nodes within the mesh network (e.g., mesh network 312). System 300 may also include a power source 308, such as a battery. In one model implementation, the system is architected to minimize the amount of power drawn on the battery such that the sensors need not be recharged at the worksite.

According to another embodiment, sensor 300 includes a proximity sensor 309 that is used to determine whether or not the sensor is being worn by an actual human subject. For instance, in a situation involving fraud, a sensor may be purposefully dropped, thrown, or tied to some other object that experiences certain environmental conditions. To avoid false alarms, workplace fraud, and other indications not involving the assigned monitored subject, system 300 may have a proximity sensor that is capable of nullifying an alert, or otherwise qualifying information that may be provided by the sensor. Such a proximity sensor may include, for example, one or more detection elements such as an IR or capacitive proximity sensing element as known in the art. In certain cases, it may be beneficial to place the sensor device in a low power mode until the sensor is actually attached to a user in the prescribed manner and to eliminate false indications and reporting.

In addition to or in substitute for the proximity sensor, sensor 300 may include a switch integrated into the sensor that detects when the sensor is attached to the user. In one implementation, the switch is incorporated within a clip of the sensor (e.g., switch sensor 313) that attaches the sensor to the user. The switch is configured to provide an indication when the clip is attached to something. Such a switch can be used for power saving, as the sensor may be transformed to a low-power mode when the clip is not attached. Further the use of the switch may be recorded, and can be used for fraud prevention, such as the case when a fall is detected. For instance, if the device is unclipped immediately before an event, it raises questions about the authenticity of that event. In one implementation, the sensor is capable of detecting and recording detachments of 100 milliseconds or more, so that when the device is moved from one person (e.g., to another person or object), the removal is detected and recorded. For instance, even if the sensor is quickly removed for one person to another, or from a person to an object, the device may store an event in the sensor and/or communicate that event to the system (e.g., a supervisor, management system, etc.) via a message sent on the mesh network.

According to another embodiment, the sensor may include a switch (e.g., pushbutton switch 314) that permit the user/wearer to perform a manual alert. In particular, the user may push a button on the sensor to alert others of a safety issue. For instance, depending on the settings associated with the button, an activation of the button could indicate a witnessed safety violation, an emergency condition, or other workplace situation. According to various embodiments, certain button selection patterns may be used by the user to create different types of manual alerts. For instance, a single press may be a safety alert, a triple press may be an emergency situation, among others.

Also, according to another embodiment, the sensor may include a speaker, sound module, transducer, or other type of sound generating component to generate audio alerts. For instance, in one embodiment, the sound-generating component may be configured to generate sounds upon certain conditions (e.g., pressing of a pushbutton, making a chirp sound, etc.). Other capabilities may be provided by similar sound-generating component, such as providing a centralized evacuation alert, where an action taken by a supervisor or computer system can cause all sensors on a site or sublocation to start alarming. In another implementation, the system may be configured to allow for a supervisor's sensor to make an audible alert when any worker experiences an event. In such a case, the supervisor may check their sensor or other computer system (e.g., a mobile device) for details regarding the event. Further, responsive to a visual (e.g., LED) and/or audio alert, the wearer may use a feedback component such as a push button to acknowledge an event and communicate information to the system. For instance, the sensor may include an LED indicator when a push button is pressed. In the case of an emergency alert, the LED may be configured to indicate a different color/pattern when the alert has been acknowledged. For example, a message may be sent to the sensor if acknowledged, indicating to the wearer that help is on the way. The sensor may be configured to provide an alert acknowledgement that is audible as well. It should be appreciated that one or more statuses of an alert may correspond to one or more indicators, or indicator combinations.

Also, as discussed, the sensor may include a pressure sensor (e.g., pressure sensor 304) used to assist in determining the altitude of the sensor. In particular, the wearer's altitude may be determined by comparing the barometric pressure as measured by the wearer's sensor with pressure measured by one or more nearby mesh network nodes. According to one implementation, the altitude of particular network nodes is a known entity (e.g., they can be determined a priori and may be stored in memory of the node devices). Such information may be determined a priori during installation, or may be determined using a pressure detection element located within a network node (e.g., within a router).

These known heights may be used to determine what floor of a structure the user is located using a table (or other date structure) including heights for each floor, the data being stored in a database accessible through a communication network. An absolute altitude may be determined by comparing the sensor's pressure measurement to the values stored in the database. Once an altitude is determined, a floor of a particular structure may be determined based on a comparison with the pressure values of the known node devices. Once a floor is determined, possible regions/zones may be determined on that floor using relative signal strengths to mesh nodes. By using both altitude and relative signal strengths, a more accurate location within the worksite may be determined.

In a more detailed embodiment, the sensor (e.g., sensor 300) may include a low-power microcontroller. Such a microcontroller may include one or more radios (e.g., a radio operating in the 900 MHz band or the 2.4 GHz band). The sensor may include a 6-axis MEMS accelerometer and gyroscope to perform detection of events. The sensor may include other components, such as, for example, rechargeable batteries, barometric sensor, a capacitive proximity sensor, RFID transponder, among others.

Figure 4:
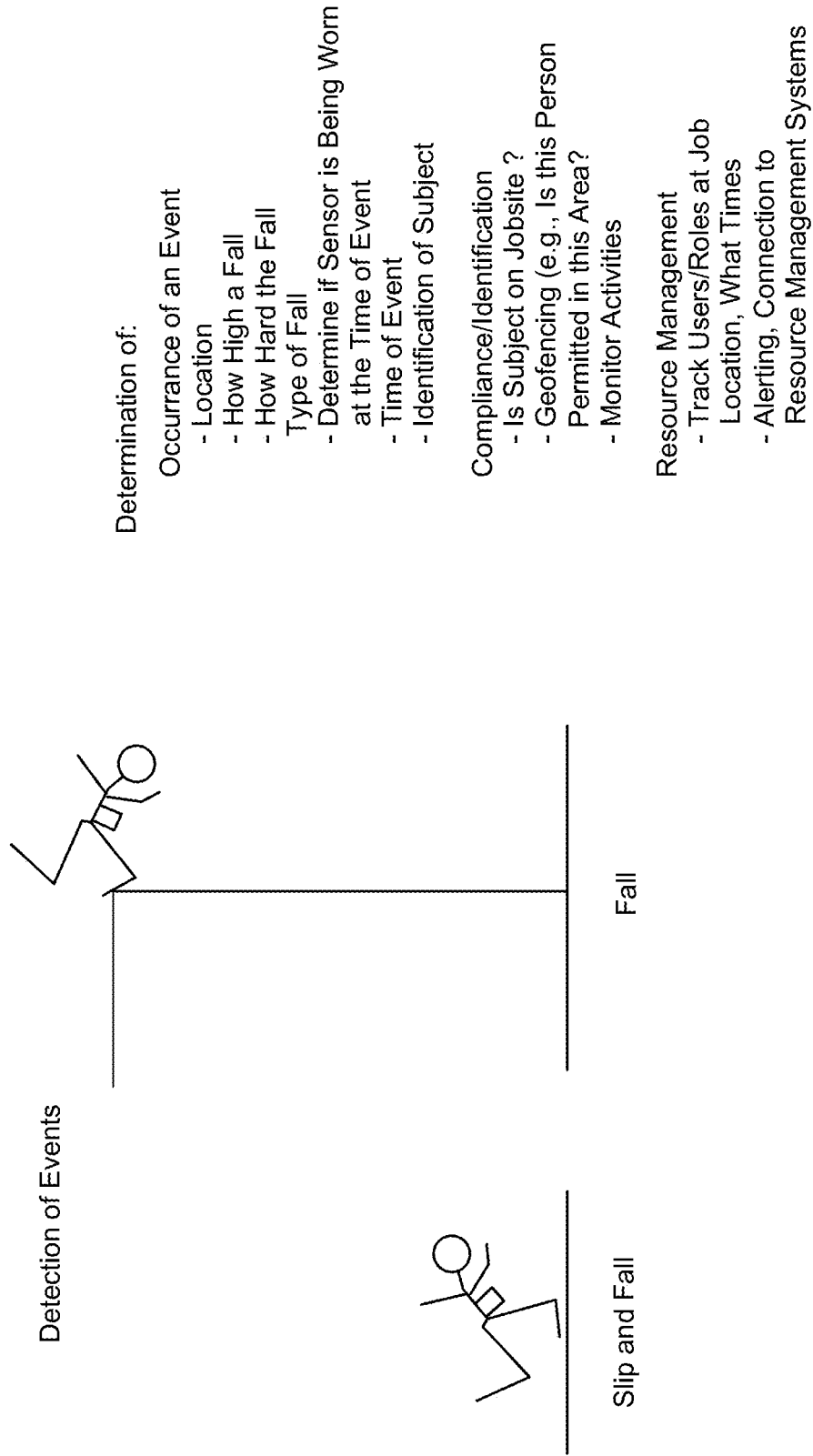
FIG. 4 shows exemplary event management functions that the system according to various embodiments described herein may perform.

FIG. 4 shows exemplary event management functions that the system according to various aspects of the embodiments described herein may perform. For example, it would be beneficial to have a system that can determine whether a worker or other subject being monitored experienced a workplace accident or other condition. For instance, it would be highly advantageous to be able to detect, record, and alert for workplace accidents such as slips and falls, falls from ladders or other height conditions, among other types of events.

With each event, the sensor may determine whether an event occurred, along with parameters associated with that event. For instance, the sensor may indicate the location of the event. This may be determined, for example, by determination that a particular sensor is within range of a particular router node. Location may also be interpolated based on relative signal strength received from one or more router nodes. Location may also be determined through triangulation or some other method. It may be useful to have real-time alerts for certain accident types that includes location information, as emergency personnel may be dispatched to the identified location in less time. To this end, the system may also be configured to communicate with emergency systems (e.g., a 911 system) for the purpose of receiving emergency service in a more expedited manner.

The sensor may also be capable of determining how high and how hard a particular fall was associated with an event. The sensor may be capable of determining the type of fall (e.g., forward, backward, number of rotations or altitude during the fall, etc.) based on parameters detected by the accelerometers and/or gyroscopic devices within the sensor.

The sensor may also be capable of determining whether the sensor is being worn properly or at all at the time an event occurred. Such an indication may be used to eliminate false signals and/or alerting, or may be used to qualify (or disqualify) a particular reading or event.

The sensor may include a memory element that stores event data, along with a time at which the event occurred. Time information may be generated, for example, by a controller, and the controller may receive time indications from a centralized system (such that all sensors have the same or similar absolute time setting). Time settings may periodically be sent by system elements to synchronize time settings among the components and sensors. Sensors may also receive a centralized time setting upon admission to the network.

Also as discussed, each sensor is associated with a particular monitored subject, and this association may be used to identify the subject that experiences the workplace condition and/or generally monitor the subject. As indicated earlier, a secondary function of the system may include performing compliance and identification functions. For instance, it may be helpful to have a system that can verify whether the subject being monitored is actually at the jobsite, during the time that the subject is expected there. The system may also be helpful in performing a geofence function with certain areas of the jobsite. For example, there may be locations that have a certain level of security, have a dangerous condition, need a certain level of training, etc. and having a system that can track the location of users and alert on entry of the monitored subject to such locations would be advantageous. In one implementation, the system may include a management interface through which one or more geofence areas may be defined and/or monitored. Further, there may be a need to simply monitor locations of subjects at the workplace, and the system may be capable of providing this function. Further, because the system is capable of determining what workers are (or are not) on a particular jobsite, the system may also be used in the case of a sitewide emergency response where workers need to be accounted for, along with their locations.

Yet another set of functions the system could perform relates to resource management and tracking. For instance, it would be beneficial to be able to track and identify certain resources (e.g., roles such as a plumber) at particular job locations and to automatically record their presence there. In one exemplary implementation, the system could send updated reports and/or alerts when particular parameters are triggered (e.g., exceeding the amount of allocated hours for plumbers for a particular job and/or job location in a defined period). Such information may be communicated to other systems, such as resource management systems, that provide tracking and budgeting functions for a particular job. For instance, a resource management system can measure the number of hours plumbers are located on a particular job, and can compare this measurement to a budgeted amount for a particular task. The resource management system may be configured to provide alerts and/or reports based on such information.

Figure 5:
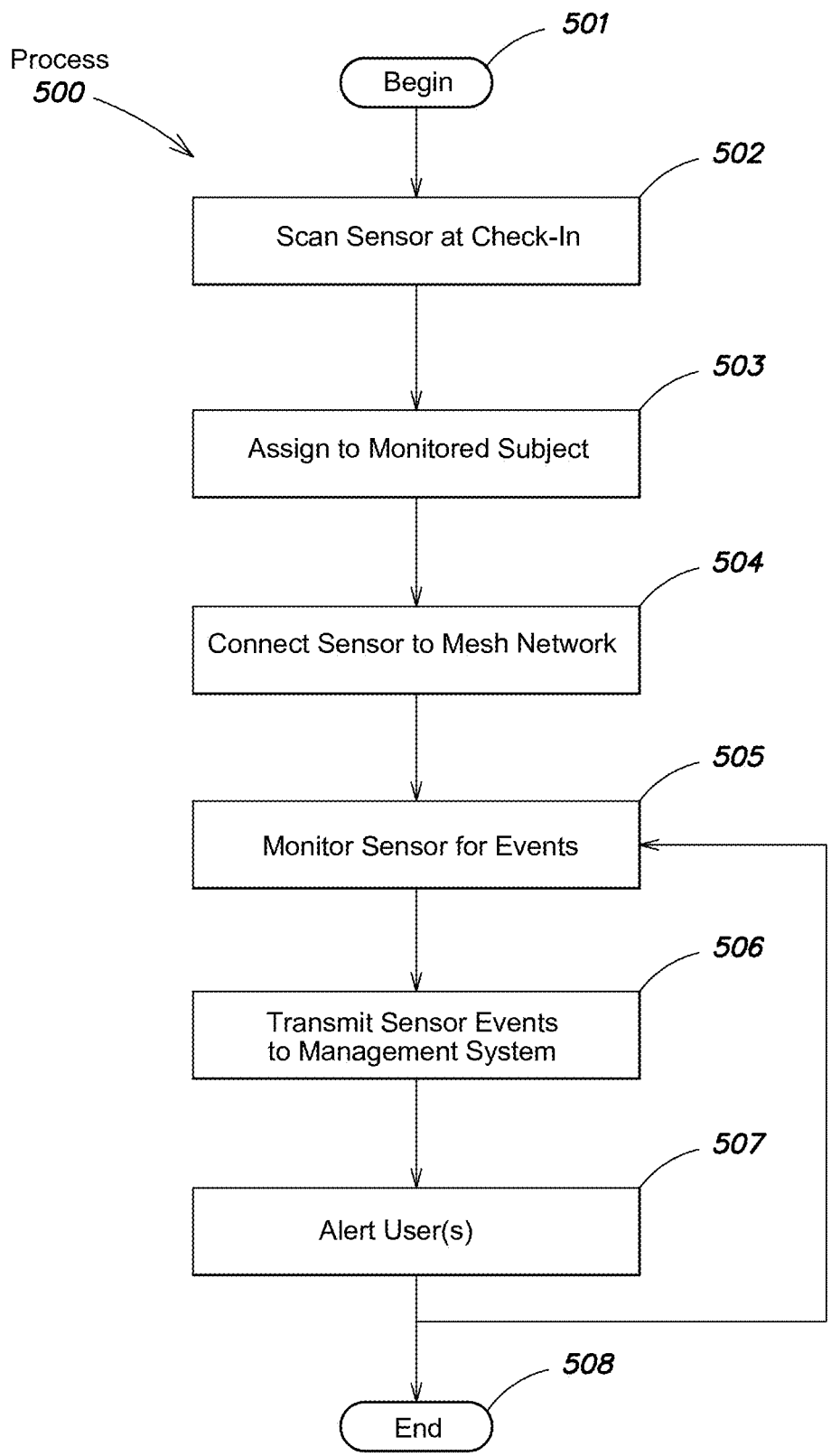
FIG. 5 shows an exemplary process for managing sensor devices and workplace events according to one embodiment.

FIG. 5 shows an exemplary process 500 for managing sensor devices and workplace events according to one embodiment. At block 501, process 500 begins. At block 502, the sensor is scanned at a check-in station as discussed above. For instance, a computer system assigned to a check-in station having a reader device can be used to identify a particular sensor (e.g., using an RFID reader). At block 503, the system assigns the sensor to a monitored subject. The worker may have some identification information (e.g., an ID badge) that can be scanned at the check-in site, and that can be associated with an assigned sensor.

At block 504, the sensor may be connected to the mesh network or otherwise admitted to the communication network. In one embodiment, a communication protocol may be used to assign the sensor to the network. In another exemplary implementation, the network assigns the sensor to a particular timeslot for transmission of event data. The sensor may need other communication information, such as site identification information, radio channels being used at the site, network topology information, among other site communication information. Such information may be provided to the sensor by one or more nodes of the network, the site information being formatted within an administrative message communicated to the sensor over an administration channel.

After the sensor is admitted to the network, the system monitors the sensor for events at block 505. In one implementation, the sensor transmits events generated within a predefined period during its assigned timeslot. At block 506, the sensor transmits events to the management system. Optionally, the system may alert the user (e.g., at block 507) of particular events received from a particular sensor. The monitoring process is continually performed, with sensors being admitted and removed from the network in real-time.

Figure 6:
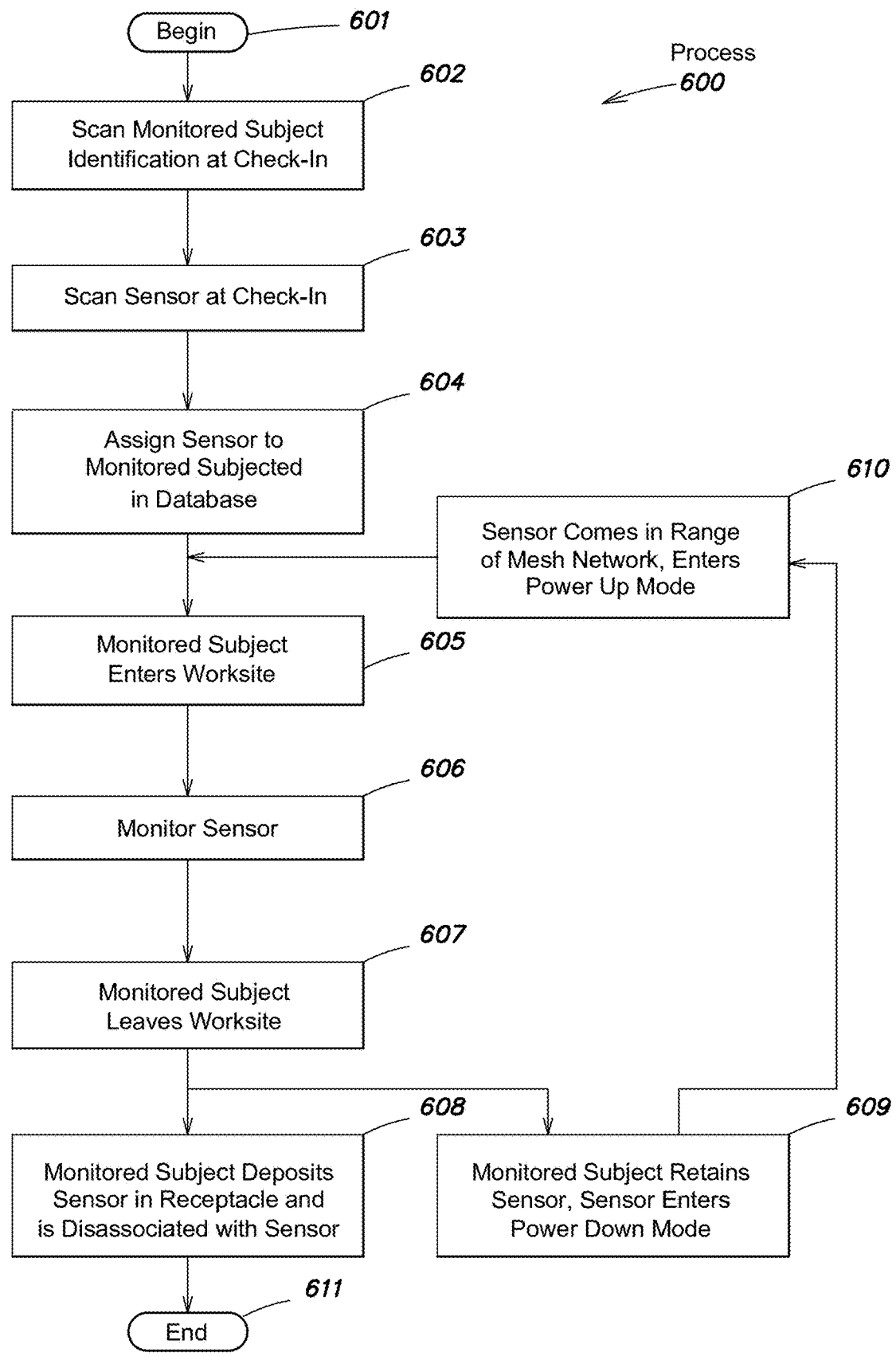
FIG. 6 shows another exemplary process for operating sensors in a mesh network according various aspects of the embodiments described herein.

FIG. 6 shows another exemplary process 600 for operating sensors in a mesh network according various aspects of the embodiments described herein. At block 601, process 600 begins. At block 602, system scans a monitored subject identification at a check-in location. For instance, a computer system at the check-in site be used to scan and ID badge or other identification from the monitored subject. Block 603, the system scans the sensor at the check-in site, by reading, for example an RFID tag associated with the sensor. At block 604, the system assigned to sensor to the monitored subject within the database.

At block 605, the monitored subject enters the worksite. At block 606, the system admits the sensor to the mesh network and monitors the sensor for the occurrence of events. In one implementation, a management system passively receives event and other status information from one or more sensor devices. When the monitored subject leaves the worksite at 607, the subject can return the sensor devices when they leave the jobsite, or the monitored subject may keep the assigned sensor without needing to revisit the check-in site.

In one example, the monitored subject may deposit the sensor in a receptacle at the worksite, and the sensor may then be disassociated with the monitored subject. Thereafter, the sensor may be reassigned to another monitored subject. Alternatively, the monitored subject may leave the worksite and retain the sensor. The sensor, after leaving the worksite and being out of range of the network may enter a power down mode (e.g., after a predetermined amount of time) at block 609. If temporarily out of range of the network, the sensor may still record event data for a predetermined amount of time, and may transmit the information when the sensor is readmitted to the network. At block 610, the monitored subject may return to the worksite and may come into range of the mesh network. The sensor may then enter a power-up mode and may be admitted to the network. At block 611, process 600 ends.

Figure 7:
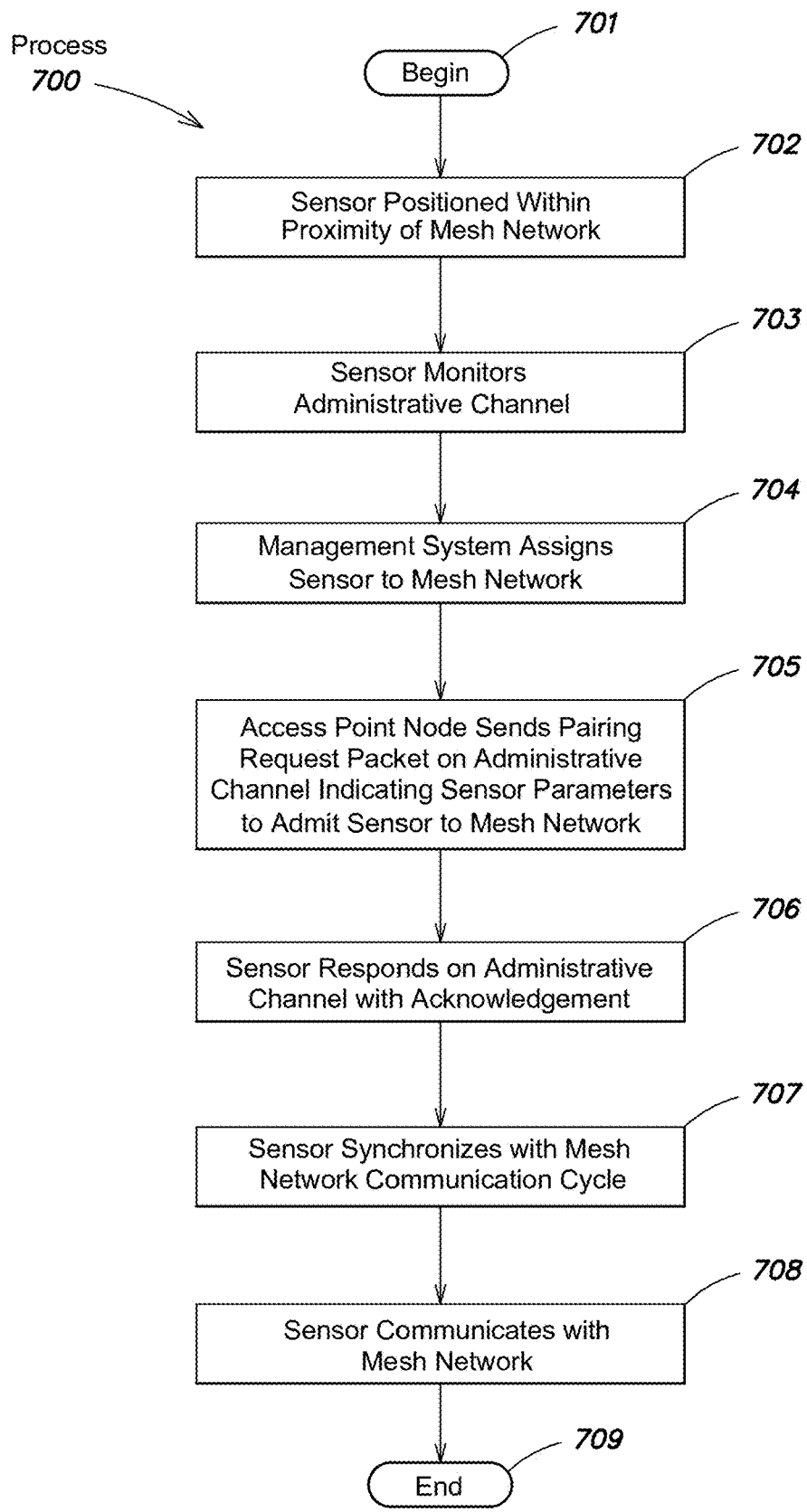
FIG. 7 shows an exemplary process for admitting a sensor to a mesh network according to various aspects of the embodiments described herein.

FIG. 7 shows an exemplary process 700 for admitting a sensor to a mesh network according to various aspects of the embodiments described herein. In particular, one aspect relates to a process for admitting sensors to the mesh network. At block 701, process 700 begins.

At block 702, the sensor is positioned within proximity of the mesh network. In one embodiment, the system uses a special administrative channel to perform administrative functions with sensors, and uses the administrative channel to facilitate sensors joining the network.

At block 703, a sensor that has not yet joined the network monitors and administrative channel. At block 704, the management system assigns the sensor to the mesh network. This may be performed, for example, responsive to a computer system at a check-in point making an association between the sensor and a particular monitored subject (e.g., as an association between an ID badge and a sensor ID).

After assignment, an access point note sends a pairing request packet on the administrative channel indicating the sensor to be admitted to the mesh network (e.g., block 705). According to one embodiment, the administrative channel is operated at a low power setting in relation to general data transmission channels so that signals will not interfere between other nodes in the network. However, the signal is operated at a level that nearby sensors are able to receive the signal and be admitted to the network. Further, operating the administrative channel frequency at a relatively low power permits multiple check-in sites to be operated relatively close to one another.

In one embodiment, the pairing request packet may include information identifying the sensor such as a serial number, network identifier, or other indicator. The pairing request may also include information that identifies a communication slot assigned to the sensor that uniquely identifies the slot in which a particular sensor sends status messages. For instance, the pairing request may include an indication of a time offset from the start of a communication cycle. The pairing request may send other information such as timestamp information (e.g., to provide a system time setting for synchronization purposes), a common channel for communicating in the particular mesh network.

At block 706, the sensor responds on the administrative channel with an acknowledgement message indicating that the particular sensor has received its configuration. At block 707, the sensor synchronizes with the network communication cycle, and begins communicating with the mesh network at block 708, periodically sending status messages within its assigned timeslot. At block 709, process 700 ends.

Exemplary Protocol

According to one embodiment, a protocol may be provided for communicating between nodes and sensors for monitored subjects and pieces of equipment. According to one aspect an RF wireless communication protocol is provided that includes a hybrid time-division/cellular approach to facilitating communication between a large number of sensors in a sensor network and a cloud-based server. Here, according to one implementation, the term cellular refers to the fact that the network is organized into cells, not a cellular telephone network such has 3G or LTE, although it should be appreciated that any type of network may be used.

In one implementation, the network protocol may be implemented as a specialized protocol operating over multiple channels in the 900 MHz ISM band. In one example, the protocol utilizes a Time Division Multiple Access (TDMA) scheme wherein each transmitter has specific time slots in which it is allowed to transmit. This arrangement allows large numbers of transmitters to share a single channel without interfering with each other.

The network protocol, according to one embodiment, also may be based around a periodic cycle. This cycle can be nominally 10 seconds in one implementation, but could be longer or shorter depending on the requirements for number of transmitters and maximum latency. The cycle may be further broken up into blocks, each of which provides a specific function to the system. Because, according to one embodiment, the sensors have information in advance when they need to receive beacons, they can keep their radios turned off much of the time, resulting in very low power consumption.

Nodes in the Network can be Three Primary Types:

Coordinator/Gateway—Coordinates communication activity within a cell and routes data from nodes in that cell to the cloud server (e.g., via the Internet). These nodes are powered externally and have some form of network connectivity (e.g., Internet). One coordinator in the network is designated the master and drives the timing for the entire network.

Router—Routers can be used as most of the fixed-position nodes in the sensor network. In one implementation, router nodes are responsible for providing the mobile nodes with location data and relaying data to the Gateway nodes.

Routers are placed within communication range of a Coordinator/Gateway. In one implementation, router nodes are capable of being battery-powered, allowing for easy deployment.

Mobile Nodes—The mobile nodes, according to one implementation, router nodes include the sensors. According to various embodiments, these sensors are worn by personnel, and attached to pieces of equipment, moving around the job site. They report status, location, and events to the nearest router or gateway node. The nearest router or gateway node may be determined, for example, by comparing values of Received Signal Strength Indication (RSSI) as measured from the perspective of each sensor. The nearest router or gateway node may be selected as the entity with the highest value of RSSI.

Figure 8A:
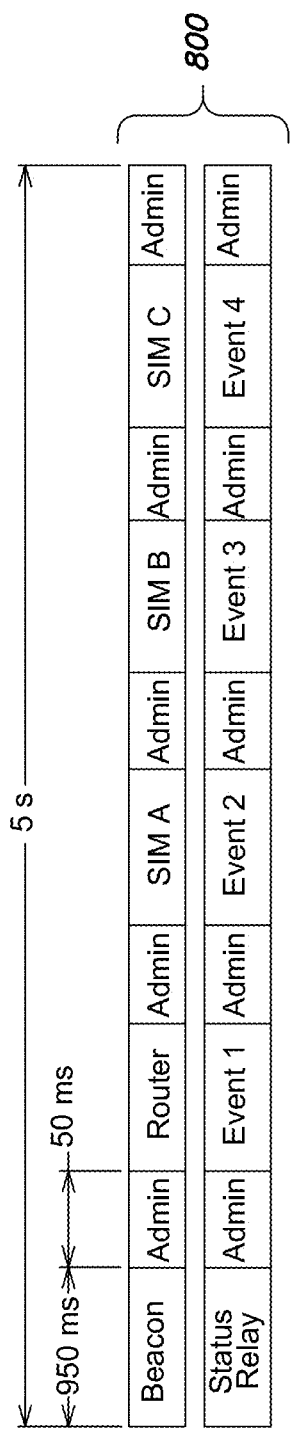
FIG. 8A shows an exemplary message format according to various aspects of the embodiments described herein.

The design parameters met by at least one version of this protocol are as follows:
  Support for 500 SIMs
  Support for 180 fixed nodes (covering over 18 million square feet)
  Update SIM location and status every 10 seconds
  Retrieve event details within 20 seconds
  Support a sustained event rate of 1.5 events per second per cell
  Low SIM radio duty cycle (<0.5% while in active use)
  Link up to 2 SIMs per second at gate stations.
  In one implementation, the system continues to operate during a network outage (with local storage of events in Gateway nodes)
  In one implementation, the system may implement the following specifications:
  RF data rate of 5 kB/s (50 kBaud base rate minus overhead)
  AP range of 100 yards Protocol Design Communication Cycle According to one embodiment, the protocol is based on a time-division scheme using a 10-second cycle. This cycle is broken up into blocks, each of which has a specific purpose and is further broken into timeslots. FIG. 8A shows blocks within the 10-second cycle, and as shown, the cycle is broken into alternating Normal Blocks and Admin Blocks. Normal blocks are used for most of the functions of the system, and are transmitted on the operating channel selected for the site. According to one implementation, Normal Blocks 800 are 950 ms long. Admin Blocks are used for pairing of SIMs, always transmitted on channel 0, and are 50 ms long. In one implementation, block reserves a 10 ms window at the end for changing channels.

Channel Assignment and Use

In one implementation, the network uses multiple channels to allow adjacent cells to operate independently while allowing mobile nodes to move between cells seamlessly. In one exemplary system, the following channels are assigned:
Admin Channel—According to one embodiment, this is hardcoded (e.g., to a designated channel such as channel 0), and is used only for pairing SIMs with the network. The admin channel may be used at reduced signal strength to prevent interference with other nearby deployments.
Common Channel—This is the channel used by all nodes in the network during the Beacon, Router and SIM blocks. This channel may be assigned to the network during deployment, and passed to the SIMs during pairing.
Cell Channel—Each cell is assigned a channel such that no two adjacent cells have the same channel. Some cells may use the Common Channel as their Cell channel. For example, according to one implementation, a network with square cells would need four (4) cell channels to operate, and a network with hexagonal cells would require three (3) cell channel.

Packet Header

In one implementation, each packet sent in a timeslot contains a standard header comprising the following fields:
  Project ID (1 byte)
  Packet Length (2 bytes)
  Packet Type (1 byte)
  Source ID/status flags (2 bytes)

Note that, according to one embodiment, destination ID information is not part of the header, as many of the packets in the system are considered to be broadcast. Certain packet types may add a destination ID, however. In addition, according to one implementation, each packet contains a 2-byte CRC.

Admin Block and Pairing

Figure 8B:
FIG. 8B shows an exemplary admin block message according to various aspects of the embodiments described herein.

According to one protocol implementation, when a sensor (e.g., a SIM) is first activated (e.g., powered on, woken from sleep, etc.), the SIM starts listening continuously on channel 0. The normal process includes scanning the SIM at the Gate Station, and which causes the AP to send a pairing request packet in the next admin block. The pairing request, according to one embodiment, contains the following:
  Identifier of activated SIM
  Time offset from start of cycle
  System Timestamp
  Common channel
  Site number of APs
  SIM timeslot assignment The SIM responds with an acknowledgment, and then synchronizes to the communication cycle (using the time offset in the pairing request) and begins transmitting during its SIM timeslot. An exemplary implementation of an admin block 810 is shown in FIG. 8B. The admin block contains timeslots for two pairs of pairing requests/responses. Both the request and response have room for up to 45 bytes. In one embodiment, the admin channel 0 communication is performed at a reduced power level, and that no two gates are within range of each other to cause interference.

Beacon Block

Figure 8C:
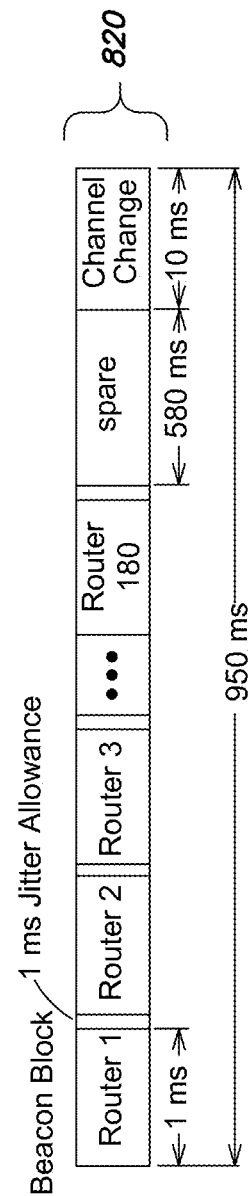
FIG. 8C shows an exemplary beacon block message according to various aspects of the embodiments described herein.

According to one embodiment, the Beacon Block supports the following functions:
  Synchronization of communication cycle
  Allow SIMs to determine a closest Router node
  According to one implementation (e.g., beacon block 820 as shown in FIG. 8C), the beacon utilizes very short packets to minimize the amount of time the SIM needs to have its receiver active. Each packet, according to one embodiment, comprises the following information:
  Project ID (1 byte)
  Router ID (1 byte)
  Status flags (1 byte)
  Checksum (1 byte)

According to another implementation, the SIMs listen to the beacon block to determine the closest router. Once the closest router is located, the SIM needs only to listen for beacons from that router and its neighbors. The list of neighbors and other information about the router is determined by listening to the router block.

Router Block

Figure 8D:
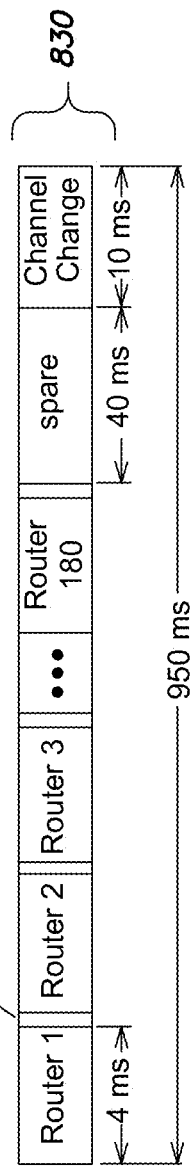
FIG. 8D shows an exemplary router block message according to various aspects of the embodiments described herein.

According to one embodiment the Router Block allows SIMs to gather information about network topology which is required for efficient use of the network. FIG. 8D shows one exemplary implementation of the Router Block 830. The block is divided into timeslots for up to 180 Router or Gateway Nodes. During the Router Block, each router transmits information regarding the topology of the network:
Header/CRC (8 bytes)
Cell ID/timeslot (1 byte)
Cell Channel (1 byte)
Distance from Master (hops, 1 byte)
Neighbor router IDs (8 bytes)

The timeslots allow for 1 millisecond of "dead air" between timeslots of different transmitting devices to allow for jitter. This feature may be consistently implemented throughout the protocol.

The Routers monitor each other during the Router Block as well. This allows resynchronization of both the communication cycle and the system timestamp. A master router (e.g. Router 1) may, in one implementation, to be considered the master, and Routers should use the timing information from the router with the lowest master distance they receive from to allow propagation through the network.

SIM Block

Figure 8E:
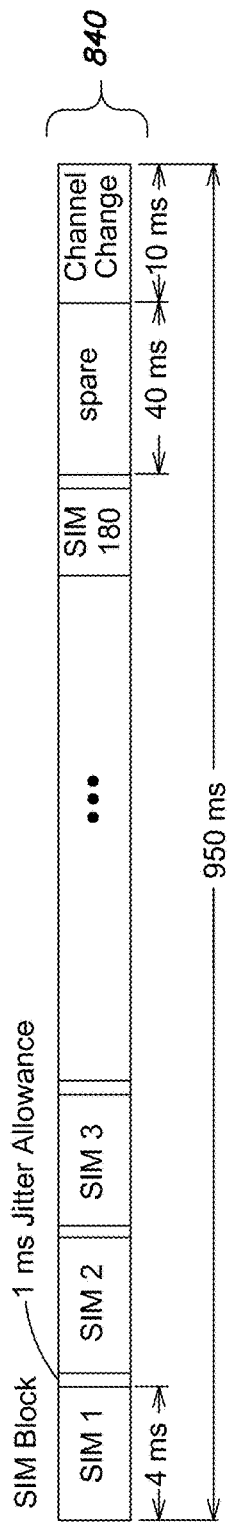
FIG. 8E shows an exemplary SIM block message according to various aspects of the embodiments described herein.

In one implementation, there are 3 SIM blocks in the cycle, each of which provides timeslots for 180 SIMs to transmit their status. FIG. 8E shows the timeslot division of the SIM Block 840. In one implementation, the SIM packets are short (up to 20 bytes). The following information is contained in each:
Header/CRC (8 bytes)
Event count (1 byte)
Battery level/status (1 byte)
Nearest routers/RSSI values (4 routers, 8 bytes)

Status Relay Block

Figure 8F:
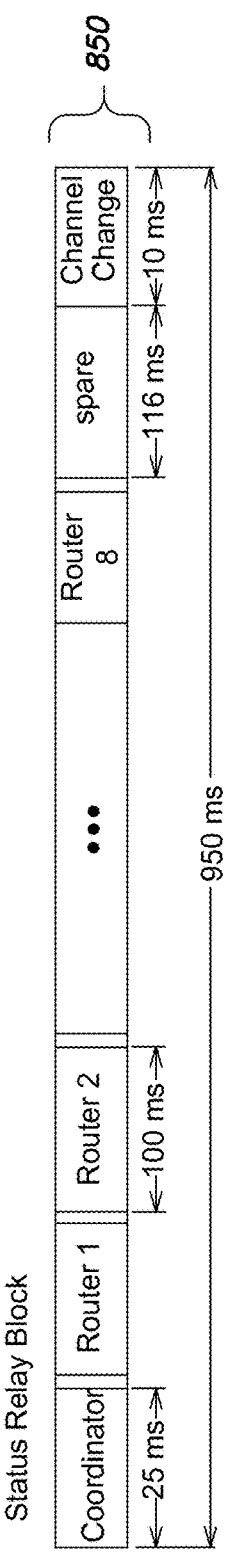
FIG. 8F shows an exemplary status relay block message according to various aspects of the embodiments described herein.

According to another embodiment, a Status Relay Block allows each of the router nodes in a cell to relay SIM status and routing information to the cell's Coordinator node. Within the Status Relay Block (e.g., block 850 as shown in FIG. 8F), the Coordinator first sends a packet containing any commands for the routers. According to one implementation, the command may include commands that control the routers to change network organization (e.g. join a different cell) or power down for a period of time, or perform other functions. Following the Coordinator timeslot, each Router in the cell transmits a packet in its designated timeslot containing its own status and the SIM statuses it has received in the current cycle:
Header/CRC (8 bytes)
Status/Battery (4 bytes)
SIM Status (up to 40 SIMs):
SIM ID (2 bytes)
Nearest Routers/RSSI Values (4 routers, 8 bytes)
Battery level/status (1 byte)
Event count (1 byte)

In one exemplary implementation, if more than 40 SIMs report to a single Router, not all statuses are able to be sent to the coordinator in the current cycle. One possible way to mitigate this is to have the router alternate between ascending and descending ordering of SIMs, so that any missed SIMs should be reported in the following cycle. In addition, adjacent routers could use opposite ordering, to improve the chances that one of the routers would be able to report the status. By the end of the Status Relay Block, the coordinator has (e.g., stored in memory) the current status and event count for all SIMs within the cell, which it can then use to allocate timeslots and routing for the Event Block.

Event Block

Figure 8G:
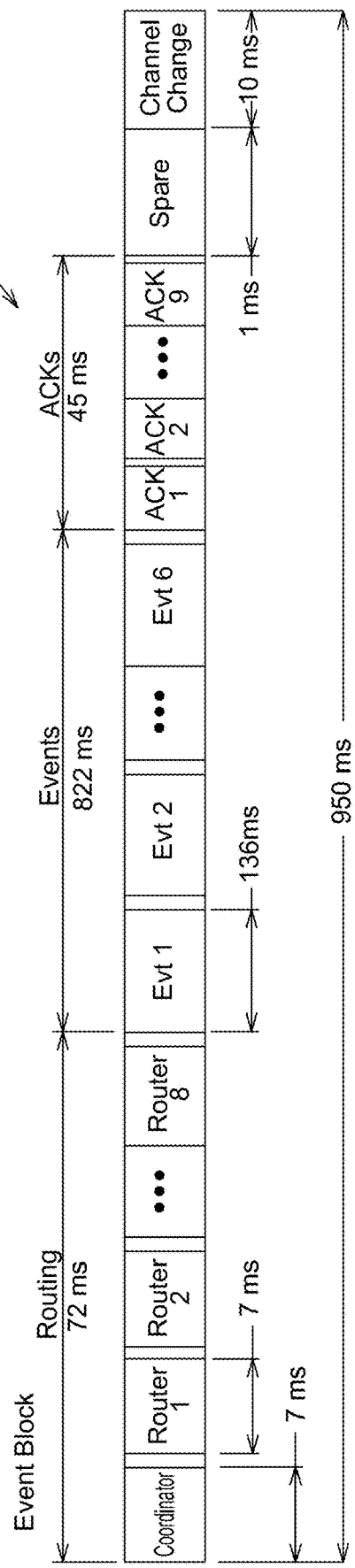
FIG. 8G shows an exemplary even block message according to various aspects of the embodiments described herein.

In one exemplary implementation, the communication cycle contains 4 event blocks, each of which can hold 6 events. In one network arrangement, events generally require two hops to make it to the Gateway, so this arrangement provides for a sustained rate of 1.2 events per second within each cell. FIG. 8G shows an exemplary breakdown of an Event Block 860 according to one implementation. The first portion of the Event Block is dedicated to routing, where the event timeslots are allocated to SIMs and Routers in such a way to allow event packets to be relayed to the Gateway. First the Coordinator sends a routing packet, which is then repeated by each of the routers so that all nodes get the information.

The routing packet, according to one example, comprises a Message ID, Source ID, and Destination ID for each of the six (6) event timeslots. This information indicates to the nodes in the system when they should be receiving and transmitting to relay event packets from SIM to Gateway. The next portion of the Event Block is the event timeslots. In one implementation, each event timeslot has room for a 680 byte payload. This is sufficient, for example, to handle 100 samples on each of the accelerometer and gyro axes, forty (40) samples from the altimeter, plus additional timestamp, initial conditions, location, and status information.

The final portion of the Event Block is the ACK timeslots, in one implementation. In one example, each ACK timeslot contains flags for the acknowledgment of events that were transmitted. First the coordinator sends its ACKs, and then each of the routers relay these ACKs to all SIMs in the cell. This block provides significant room for expansion as the block allows routing of arbitrary packets between nodes within a cell. For instance, this may be used for initial autoprovisioning of the network, reconfiguration of the nodes, and/or support of new sensor types.

Cell Organization

Figure 9:
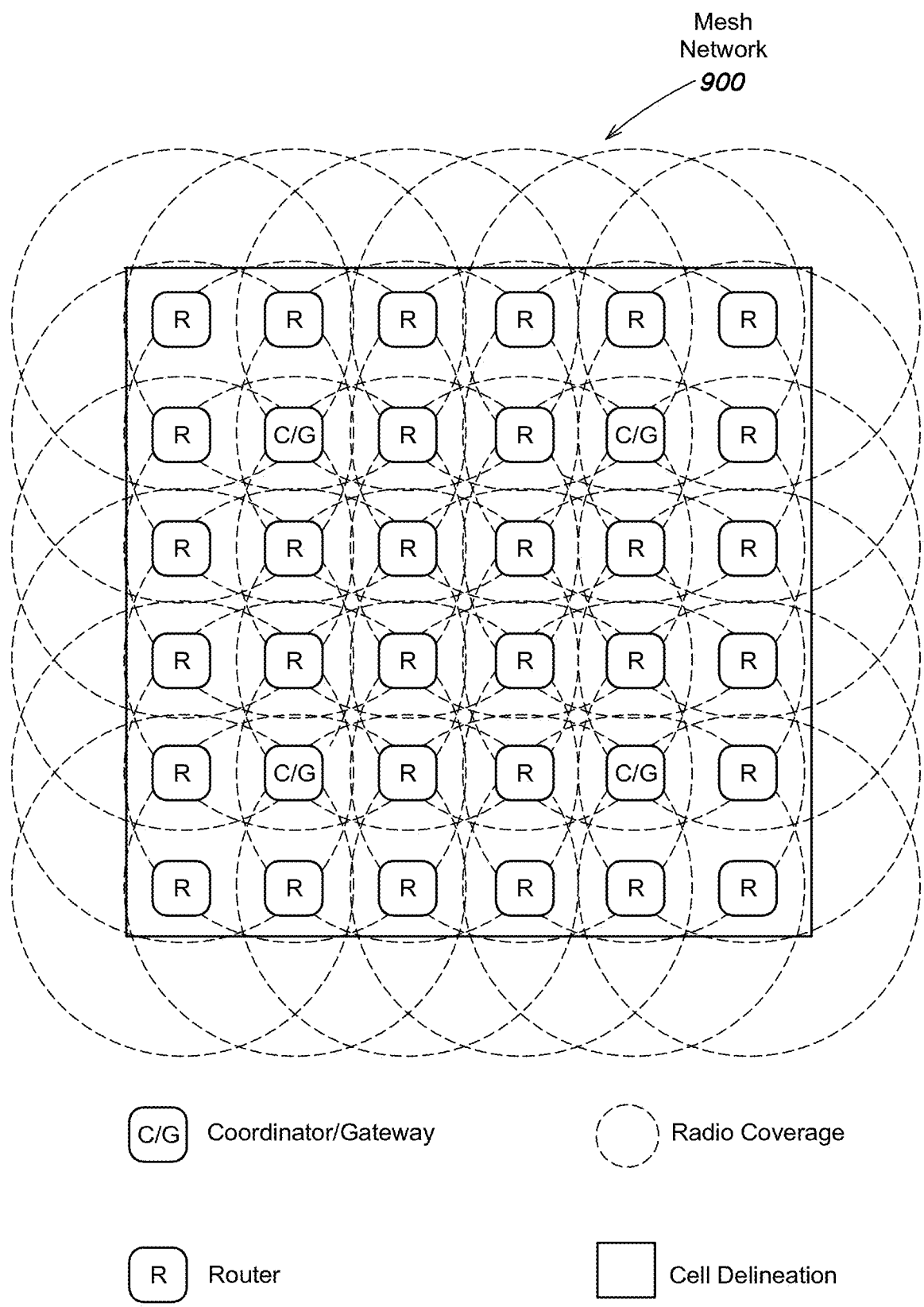
FIG. 9 shows an exemplary mesh network configuration according to various aspects of the embodiments described herein.
Figure 10:
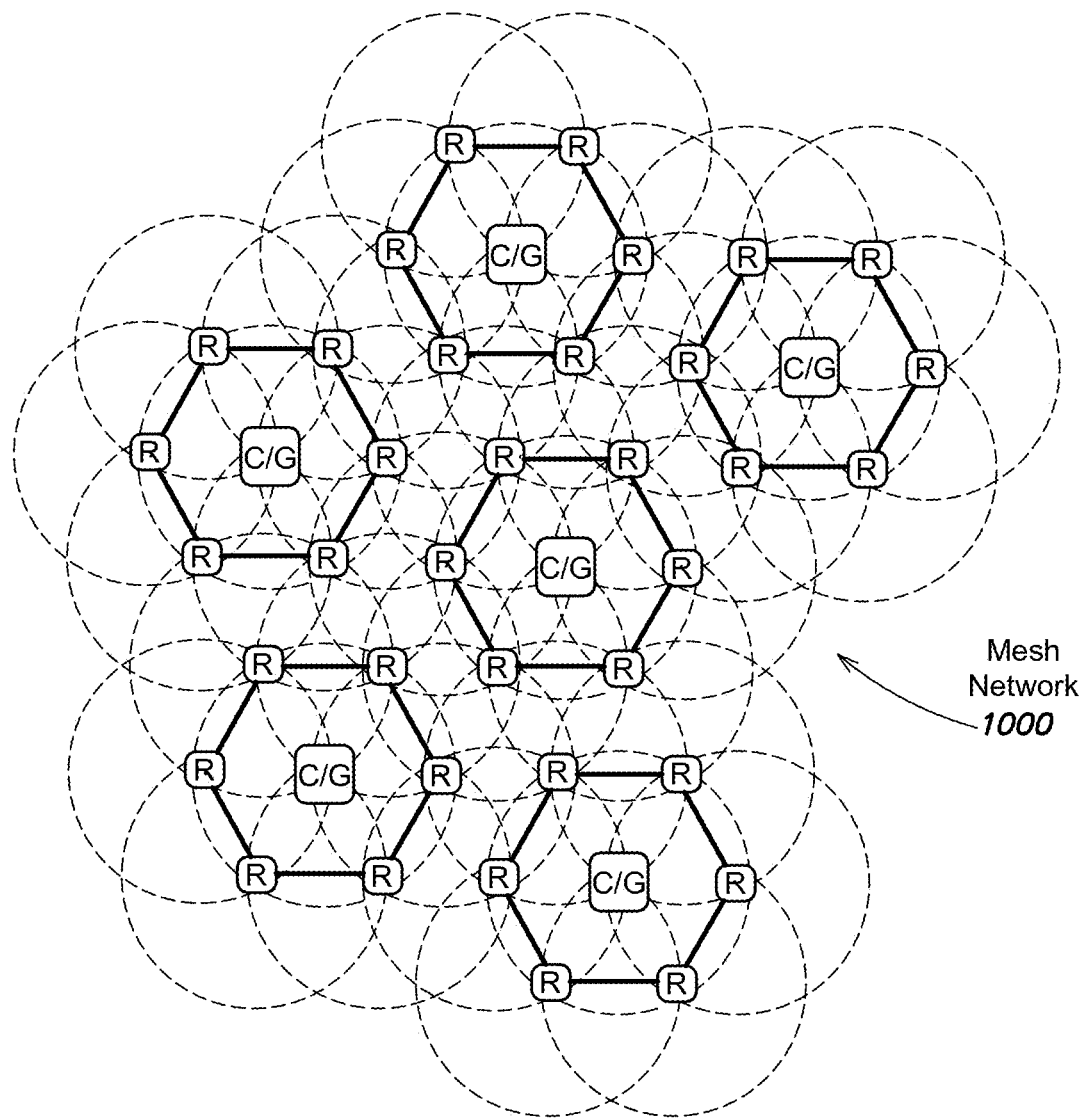
FIG. 10 shows another exemplary mesh network configuration according to various aspects of the embodiments described herein.

FIGS. 9 and 10 show exemplary implementations of possible matrixes of router nodes and coordinator/gateway devices in one or more mesh networks (e.g., mesh networks 900 and 1000). In particular, FIG. 9 shows a network organization of a mesh network 900 using four cells in a square-grid layout. This layout could cover, for example, over 2 million square feet using four (4) Gateways and thirty-two (32) Routers.

FIG. 10 shows a hexagonal arrangement of cells in a mesh network 1000. This arrangement covers area more efficiently than a square grid and requires one fewer channels to operate, however, this arrangement may be more difficult to deploy and provision.

SIM Power Consumption

Various aspects of the embodiments described herein relate to reducing power consumption within sensor devices (e.g., SIMs). During nominal operation, according to one implementation, the SIM may be required to have the receiver active during the Beacon Block, and to transmit during its designated timeslot in the SIM block. When receiving the Beacon block, the SIM can typically monitor at most nine (9) of the timeslots, corresponding to the closest node from the previous cycle and up to eight (8) of its neighbors. This represents 18 milliseconds out of a 10 second cycle, or a 0.18% duty cycle. Transmission in the SIM block is a short 4 ms packet once per 10 s cycle, or a 0.04% duty cycle.

When an event needs to be transmitted, the SIM can perform the following with the radio:
Listen for a routing message from the nearest router (8 ms)
Transmit the event (136 ms)
Listen for an ACKs (45 ms)

Therefore, each event adds 53 ms of RX time and 136 ms or TX time. If 100 events are expected over an 8-hour shift (most of these false events filtered by cloud), this results in an additional 0.02% RX duty cycle and 0.05% TX duty cycle. When the SIM moves within range of a router for the first time, the SIM listens to the corresponding packet in the router block, which is a rare occurrence in most exemplary deployments.

Total radio duty cycle: RX: 0.20%, TX: 0.09%, Total: 0.29%

Those numbers represent if the device was active 24-hours a day. If the device is only used for a single 8-hour shift, then the total duty cycle is <0.1%.

To cut this further, it may not be necessary for the SIM to listen to every Router block, especially if the accelerometer/gyro indicates that the device has not moved significantly. Such implementations may permit sensors to remain in the field for longer periods, and to extend the time periods between recharges.

Event Analysis

Once an event has been recorded, according to one embodiment, it is analyzed to determine whether the event represents a real fall or other type of event. In one implementation, a basic version of this analysis is performed within the sensor, in order to reduce network bandwidth utilized sending false events.

The analysis of an event may include one or more of the following components:

Freefall duration: In a simple freefall, the duration in freefall can be used to compute the height of the fall using:

$$h = \tfrac{1}{2} a t^2$$

where h is the fall height in meters, t is the duration of freefall in seconds, and a is the acceleration of gravity (9.8 m/s^2)

Jump Detection: it is appreciated that the above equation used to determine freefall duration may not provide accurate results in the case of a jump, where the user accelerated upwards at the start of the freefall duration. To account for this, the pre-trigger accelerometer data is examined for a jump. This can be represented as an upward acceleration immediately prior to the freefall. Through discrete integration the upward velocity can be approximated, and used in the modified equation:

where h is the fall height in meters, v0 is the initial upwards velocity, t is the duration of freefall in seconds, and a is the acceleration of gravity (9.8 m/s^2)

Motion Integration: Optionally, if sufficient angular velocity data from the gyro is available, all of the acceleration samples can be placed in a reference frame relative to the ground, thus allowing the vertical displacement during the fall to be computed as the second integral of acceleration.

Altimeter Analysis: The altimeter data can be correlated with the fall height computed above to provide a more accurate estimate of fall height and higher confidence in the legitimacy of the event.

Impact Detection: the acceleration at the end of freefall can be examined to determine whether the subject experienced a hard or soft landing. This can be used to help determine whether the fall was intentional (such as hopping down from the bed of a truck) or unintentional. The severity of the landing can be recorded with the event in the cloud database, and events with severity below some threshold will be hidden from reports by default (e.g., to lessen the number of false reports).

Rotation Analysis: The gyro data may be examined for angular velocity during freefall. This is used to discriminate the type of fall. For example, a forward rotation indicates the user probably tripped over an obstacle, while a backwards rotation may indicate the user slipped and lost their footing.

Post-fall Analysis: The accelerometer and gyro data may be examined in the period immediately post-landing to determine whether the subject continued walking normally or stayed on the ground for some time, and if the subject stayed on the ground, a determination may be made whether the subject rolled around or lay still. These conditions is indicated on the event report.

Proximity Sensor Analysis: The data from the proximity sensor may be examined to determine whether the sensor was being worn before, during, and after the fall.

According to one embodiment, the system may be capable of detecting and reporting false events. In one implementation, there are two types of false events that the system is capable of identifying:

Probable Sensor Throw—These events occur when a user throws a sensor up in the air, either catching it or letting it fall. In one embodiment, these events are characterized by a high acceleration immediately prior to the period of freefall. This acceleration is greater than if the user jumps or falls during a genuine event, and can be used to discriminate this event type from other event types. The system compares the average magnitude of the acceleration vector during a period (for instance, 0.4 seconds) immediately before freefall, and if this acceleration exceeds a pre-set threshold (2.4 g) the event is marked as a probable sensor throw.

Probable Sensor Drop—These events occur, for example, when the user drops their sensor, or the sensor is knocked off their belt and falls to the ground. These events are characterized by a high rate of rotation upon impact, followed by a period of no rotation as the unit sits at rest on the ground. In one implementation, the algorithm is only applied to falls that have a measured height of less than a predetermined height (e.g., 2 meters). The system may be configured to identify the peak angular velocity during the period starting when the device is in freefall through a predetermined time (e.g., 1 second) after the end of freefall. If the peak angular velocity exceeds a set threshold (e.g., 800 degrees per second) then the system checks for inactivity by calculating the RMS angular velocity during a period after impact. If the RMS angular velocity is below a set threshold (e.g., 5 degrees per second) then the device is assumed to be at rest, and the event is marked as a probable sensor drop. Input from the proximity or clip sensor may be used to increase the confidence of this filter function.

Location Determination

According to one implementation, the system is able to determine the approximate location of each sensor by comparing the signal strength between the sensor and each node in the mesh network (e.g., via measurement of RSSI), and interpolating the position between the nodes. In one exemplary implementation, the sensor records the received signal strength of each Beacon packet and returns this information in its status packet. The Gateway and Relay nodes also record the received signal strength from each sensor, and send this information along to a management system (e.g., an application program executing on one or more server systems in a cloud-based environment (referred to herein as the "Cloud server"). In one example, the Cloud server can combine the signal strengths for a more accurate estimate of the distance between the sensor and each node.

It should be noted that buildings can be complex environments for tracking location in this way, as structures can both block and reflect radio waves. Several strategies can be used to improve location accuracy:

Filtering: Because people generally move at a walking pace on a job site, and tend to move in regular paths, a significant amount of filtering can be done on the location data to prevent the reported position from jumping around.

Pedometer: The pedometer function of the accelerometer can be utilized to estimate the distance a user has walked in a given period of time, further improving the filtering that can be performed.

Calibration map: For fixed installations, part of the deployment can be mapping signal strengths across the job site, which can then be used to provide much more accurate location measurements. For instance, in one application, a signal from the altimeter is used as an input to determine which floor a user or piece of equipment is on, and then responsive to the floor determination, a calibration map may be selected that is linked to the particular floor. Calibration maps may be determined when the system is first installed, and may associate actual logical locations (e.g., via a map or other locational construct) with a pattern of RSSI values from multiple mesh nodes.

Fraud Prevention

Fake Event Generation

In some cases, a user may try to simulate a slip or fall in order to fake an injury. In most cases, this will require taking the sensor off the body. The proximity sensor or clip-based switch in the device will detect that the sensor is not being worn, and any events that occur while not worn is disregarded. Further, in one exemplary implementation, the proximity sensor has the ability to discriminate between an animate object (such as a human body) and most inanimate materials, such as wood and stone. In this way, for example if a user takes off his sensor and attaches it to a sack of concrete and then pushes it off the back of the truck, the system will know that this was not a real fall. Further, the system will contain a record of the attempted fraud, so that appropriate action may be taken.

Location Tracking

In some cases, a user may want to bypass the location tracking of the sensor by taking it off. If the user takes off the sensor and leaves it somewhere, according to one embodiment, the system detect it is not being worn (via, for example, the proximity sensor and/or clip switch) and that it is not moving (via the accelerometer) and the sensor may alert the supervisor or other system. If a user tries to bypass the system by having another user wear his sensor (in addition to that user's own sensor), this situation may be more difficult to detect. Within the Cloud server, the system may be adapted to run correlations on the position and motion of the sensors to detect if a single individual is wearing more than one sensor. In this case, an alert can be generated and sent to the supervisor.

User Identification

According to yet another implementation, gateway nodes can be outfitted with an RFID scanner capable of scanning both the sensors as well as standard RFID access cards or tokens. In a deployment where sensors are to be kept on site, on arrival the user will first scan his badge, then take a sensor and scan the sensor as well. This capability allows the system to associate that sensor with a particular user or piece of equipment. When leaving the site, the user just scans his badge, and deposits the sensor in a receptacle. The system may then automatically disassociate the user from the sensor.

Note that access cards may be replaced with keychain fobs or stickers placed on hardhats or other gear, with the rest of the operation staying the same. In scenarios where the user keeps the same sensor day-to-day, they do not need to badge-in at all. Instead, the system may be adapted to automatically register the user when a user has come within range of the mesh network and mark them as having arrived on site. When the sensor leaves range of the mesh network for a specified duration, the user is marked as having left the site.

The above situation may work optimally when the site is fully covered by the mesh network. In cases where the site has "blind spots" not covered by the network, it may be necessary for users to badge in and out. In this case, the users can scan their badges, and not their sensors.

Dynamic Sensor Provisioning

To function within the mesh network at a specific site, the sensor requires configuration information regarding the site, such as site identification, radio channels being utilized, network topology, etc. This information is collectively called the "site configuration." In one specific implementation, the system contains a mechanism for automatically associating sensors with the network such that a new sensor from the factory can be utilized at any job site with no manual configuration.

To achieve this, all gateway nodes periodically transmit on a fixed frequency, known as the "admin channel". These transmissions are performed at a reduced signal strength, so that only nearby sensors can receive it and so that the signals do not interfere with other gateway nodes in the network. These admin transmissions contain the site configuration required for a sensor to find the mesh network. Further, packets targeting a specific sensor may be sent on the admin channel, containing sensor-specific configuration such as protocol timeslot assignments. This may be done following a scan of the sensor's RFID tag or automatically upon detection of a new sensor.

Sensor Device

Figure 11A:
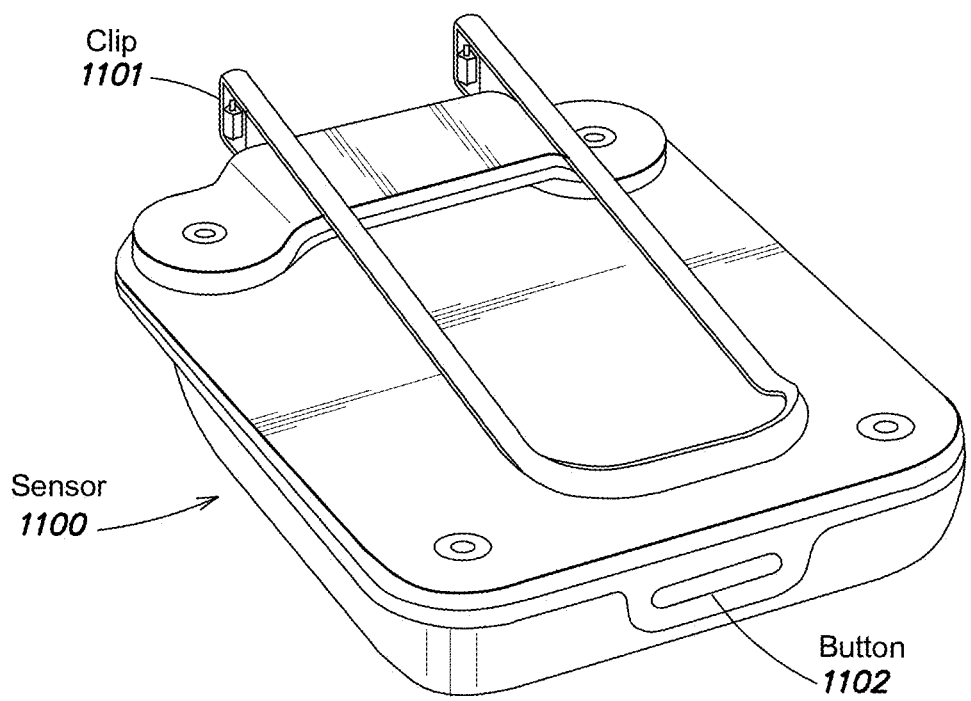
FIGS. 11A-11B show several views of a sensor device according to various aspects of the embodiments described herein.
Figure 11B:
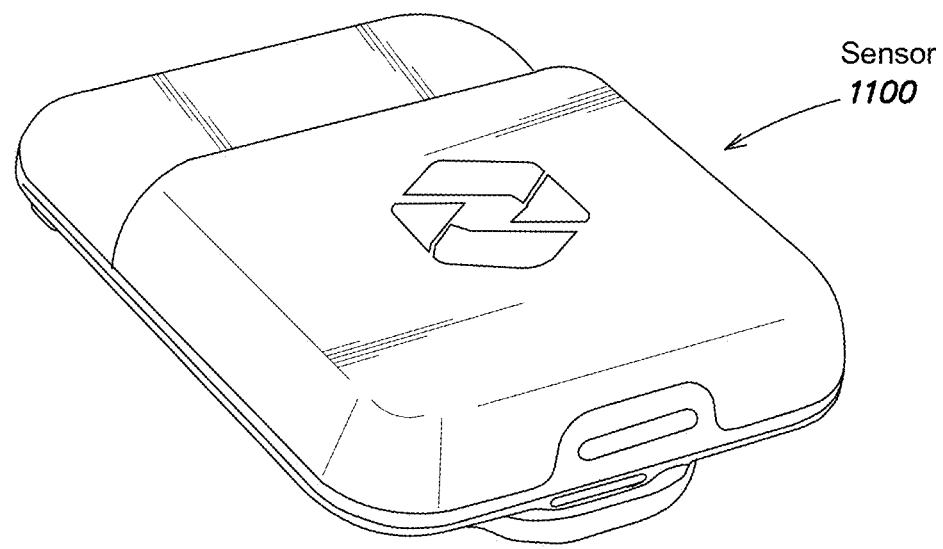
Figure 12C:
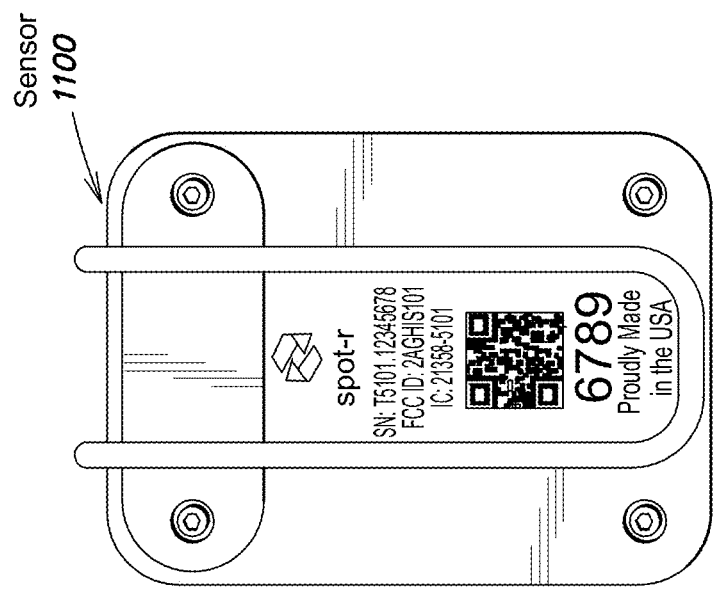
FIGS. 12A-12C show additional views of a sensor device according to various aspects of the embodiments described herein.
Figure 12B:
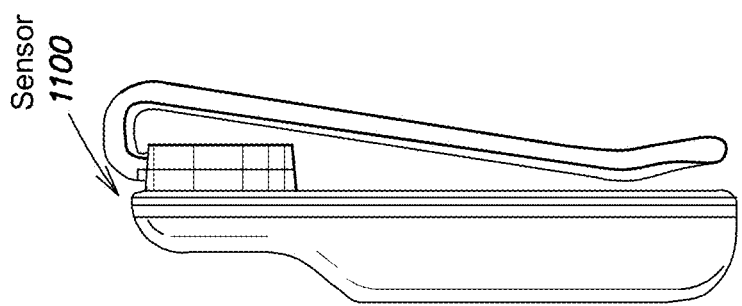
Figure 12A:
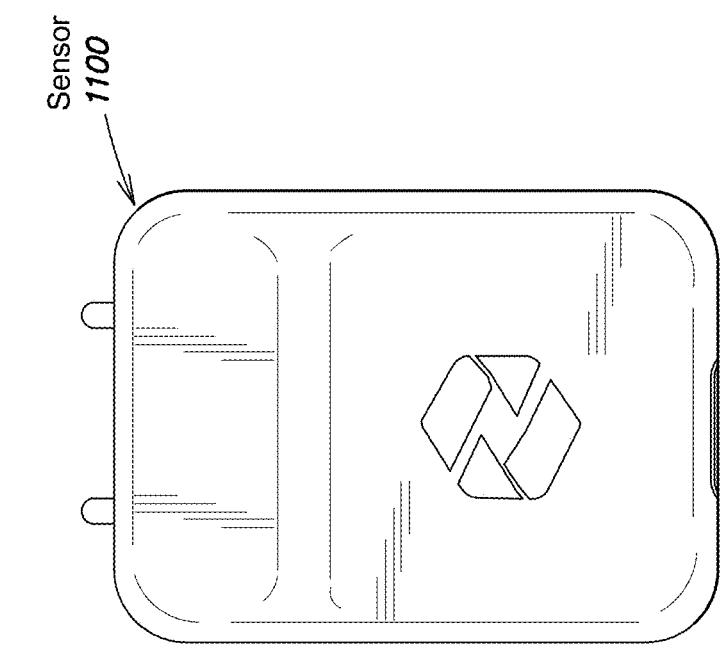

According to one embodiment, as discussed above, the sensor device that worn the beltline by a particular subject. To this end, the sensor system may have one or more attachments that are used to affix sensor to the monitored subject. FIGS. 11A and 11B show varies embodiments of a sensor 1100 that may be used to monitor a particular subject. Sensor 1100 include, for example, a clip 1101 that attaches sensor 1100 to the user. Clip 1101 may include an internal mechanism that, when clipped to the user, a switch is activated. The switch may be used alone or in conjunction with other sensors (e.g., a proximity sensor) to determine whether the sensor is coupled to the user. Further, as discussed above, the sensor 1100 may also include a button 1102 that is used by the user to initiate manual alerts. The sensor may be responsive to one or more different patterns of button presses to indicate different types of alerts. Also, FIGS. 12A-12C show different perspective views of an exemplary sensor 1100 that may be used by the system in accordance with various embodiments.

Cloud Server System

As described above, a gateway node may be configured to send all events, statuses and scan operations to the Cloud server by utilizing web services. The Cloud server may include logic that decodes the events, status and scan operations and store the appropriate decoded information, along with the source into its database for further processing and for display to the user via one or more user interfaces (e.g., a Cloud Dashboard). The Cloud server system may be accessible by one or more user types through one or more networks. The Cloud server may also include one or more management interfaces (e.g., as shown by way of example in FIGS. 13-24 discussed below) through which the system may be configured, alerted and monitored.

Resource Management

The Cloud server and its associated management interfaces may allow for various users to set resource budgeting information, such as how many hours on site a particular role (e.g. framer, plumber) will be on site and on what days. This information can also be loaded via an API for integration with existing resource management software. Either via scan operations or a sensor device coming into and out of the mesh network the cloud will know the time a worker is on site. It can present this information on its own for planning purposes (via direct detailed records, or via charts), or it can compare this to the resource budgeting to identify whether the appropriate amount of hours are being used against budget.

Location Management

The Cloud server can indicate the location of workers and equipment on the job site, by overlaying pins or dots over a graphic representation of the site such as a blueprint. Dot locations may be determined by interpolation of RSSI values, altitude, pressure, and/or other measurement data. In one exemplary implementation, the pins can be animated, though with refreshes of statuses, the pin associated with a particular user or piece of equipment may not necessarily move with every step, but a management user (e.g., a supervisor) can be shown the current position of all workers and equipment. In one embodiment, the sensor may have a more real-time view of the person's location for the purpose of event reporting. In the case of an emergency or event condition, the user's location may be reported and/or determined at a higher resolution.

Event Notification

The Cloud server may be adapted to show (e.g., within a management interface) a running list of recent events, as well as allow a user to drill into workers or sites and see events that have occurred. Real-time notifications can be presented when an event occurs. This can be shown on the dashboard, but can also be sent via email or SMS to users such as foremen or site managers.

Status Digest Emails

The Cloud server may be configured to send emails containing consolidating information for a job on a scheduled basis (e.g., every morning, every Monday, etc.). These emails can include events that have occurred since the previous email, numbers and hours of workers, etc. In one implementation, the content of status digest emails can be formatted by a user.

Exemplary Management Interfaces

As discussed, a cloud-based server may be capable of performing one or more management functions with the sensor-based system. Such management functions may include monitoring sensor devices and locations, viewing events, performing analysis of events, allocating sensors to individuals and pieces of equipment, monitoring employee performance, and monitoring equipment usage, among other functions. To this end, the cloud-based server may include one or more management interfaces to facilitate these functions.

Figure 13:
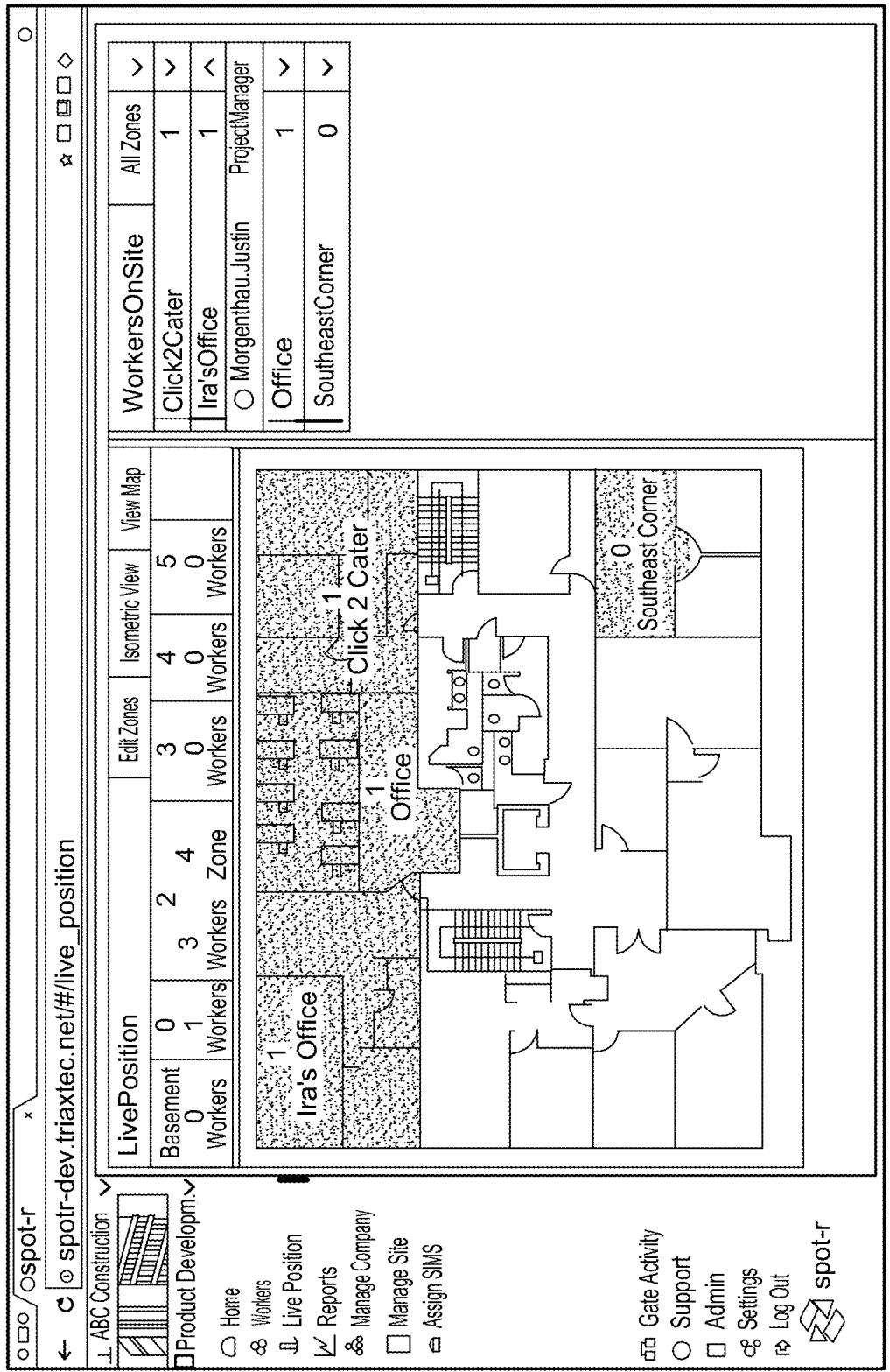

For example, FIG. 13 shows a map layout of a particular workplace within a management interface presented to the user (e.g., an administrator). The interface may have the capability of mapping the live position of the worker or piece of equipment within certain designated areas of the workplace. An administrator may be capable of configuring zones and monitoring workers within those zones.

Figure 14:
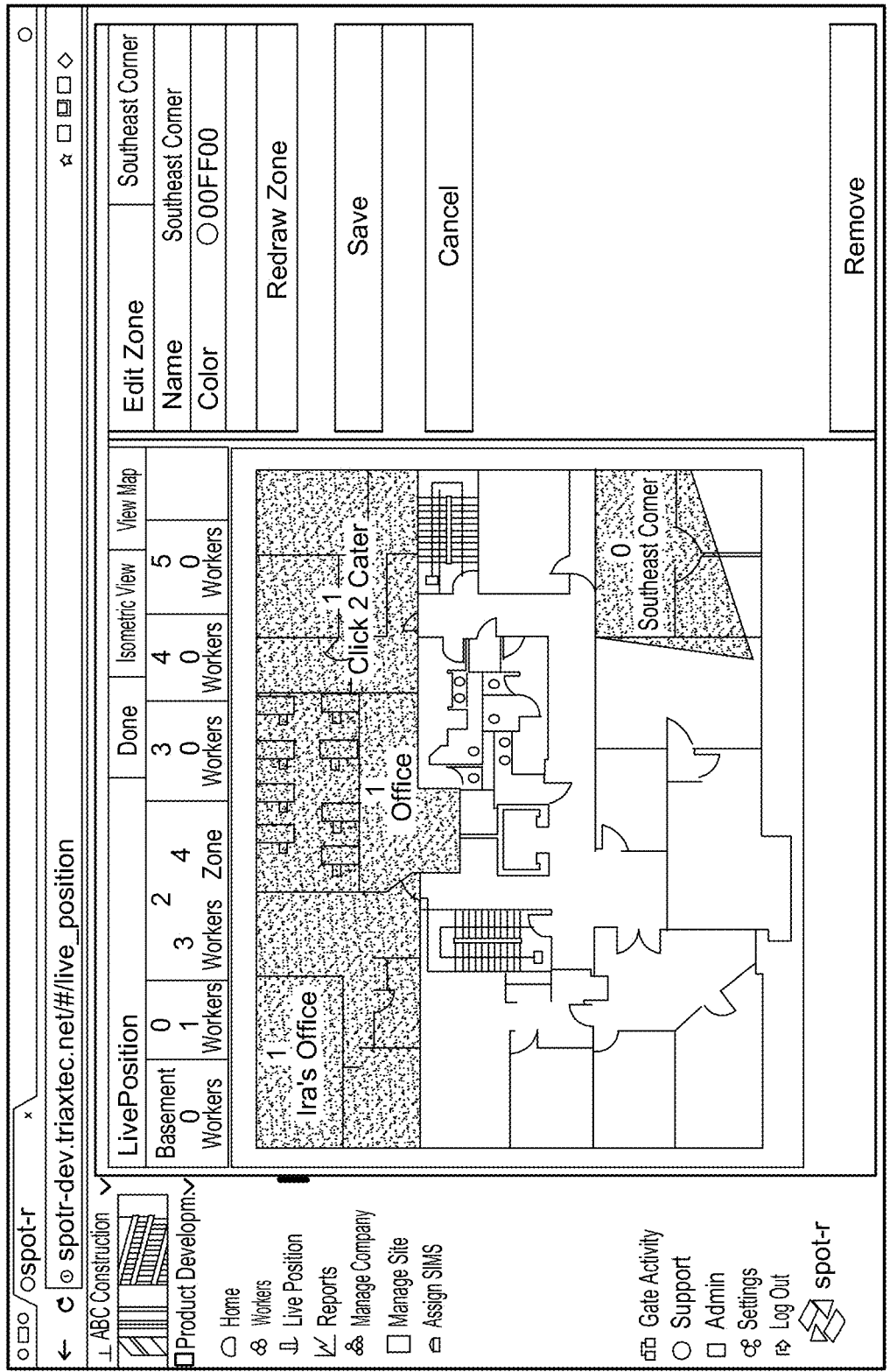

FIG. 14 shows an exemplary interface that permits an administrator to define zones on a map showing the architectural view of a particular floor within the workplace. The system may include a control that allows the administrator to define the zones through a drag and drop interface. In the example shown, the user is permitted to resize the zone associated with the architectural view.

Figure 15:
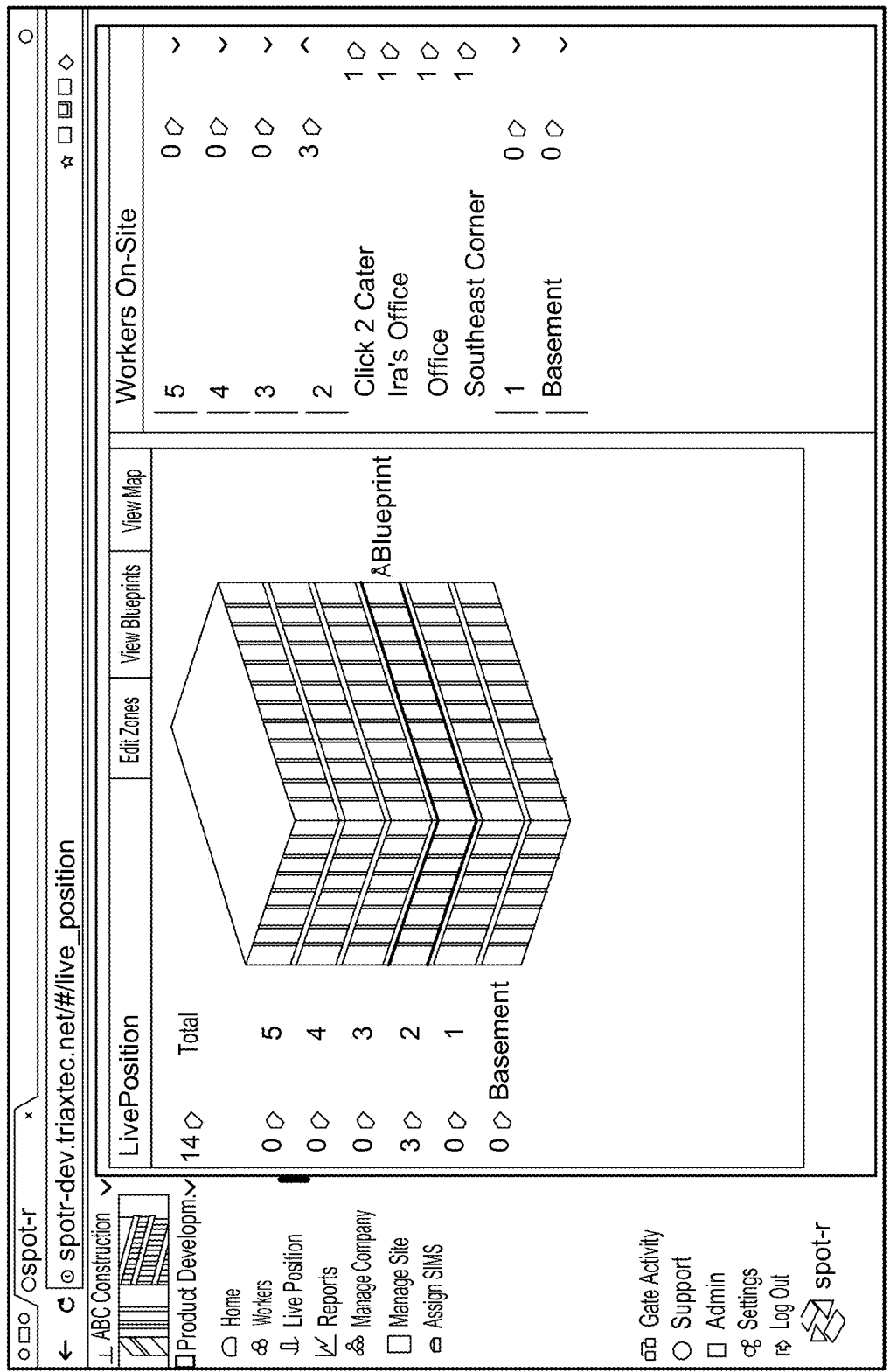

FIG. 15 shows an exemplary interface that permits an administrator to view a 3D viewpoint of a particular workplace (e.g., via an isometric view interface). In this interface, the system may show the workers' and equipment's live positions within the workplace. This determination may be assisted by an altitude calculation as discussed above with respect to mesh network devices. Thus, there may be a capability of detecting certain workers and pieces of equipment on particular floors in real-time.

Figure 16:
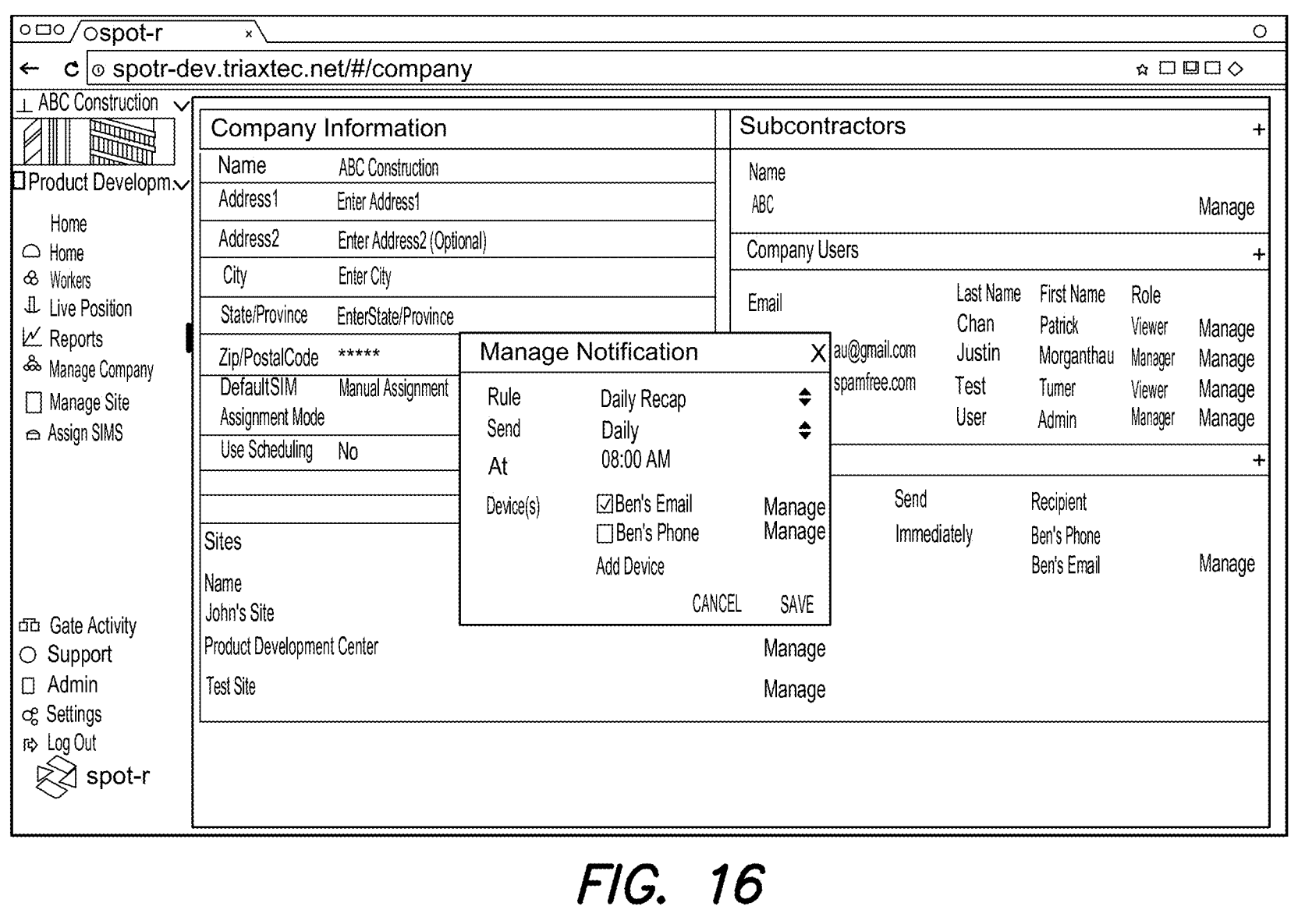

FIG. 16 shows an exemplary interface that permits an administrator to manage notifications handled by the system. For instance, for a particular installation, the system may permit an administrator to configure alerts, determine the frequency and/or times alerts are generated, to whom they are sent, etc. Further, the system may be capable of defining rules that can have one or more parameters specified by a user, and these rules can be applied to one or more job sites, worker types, groups of workers, or individual workers.

Figure 17:
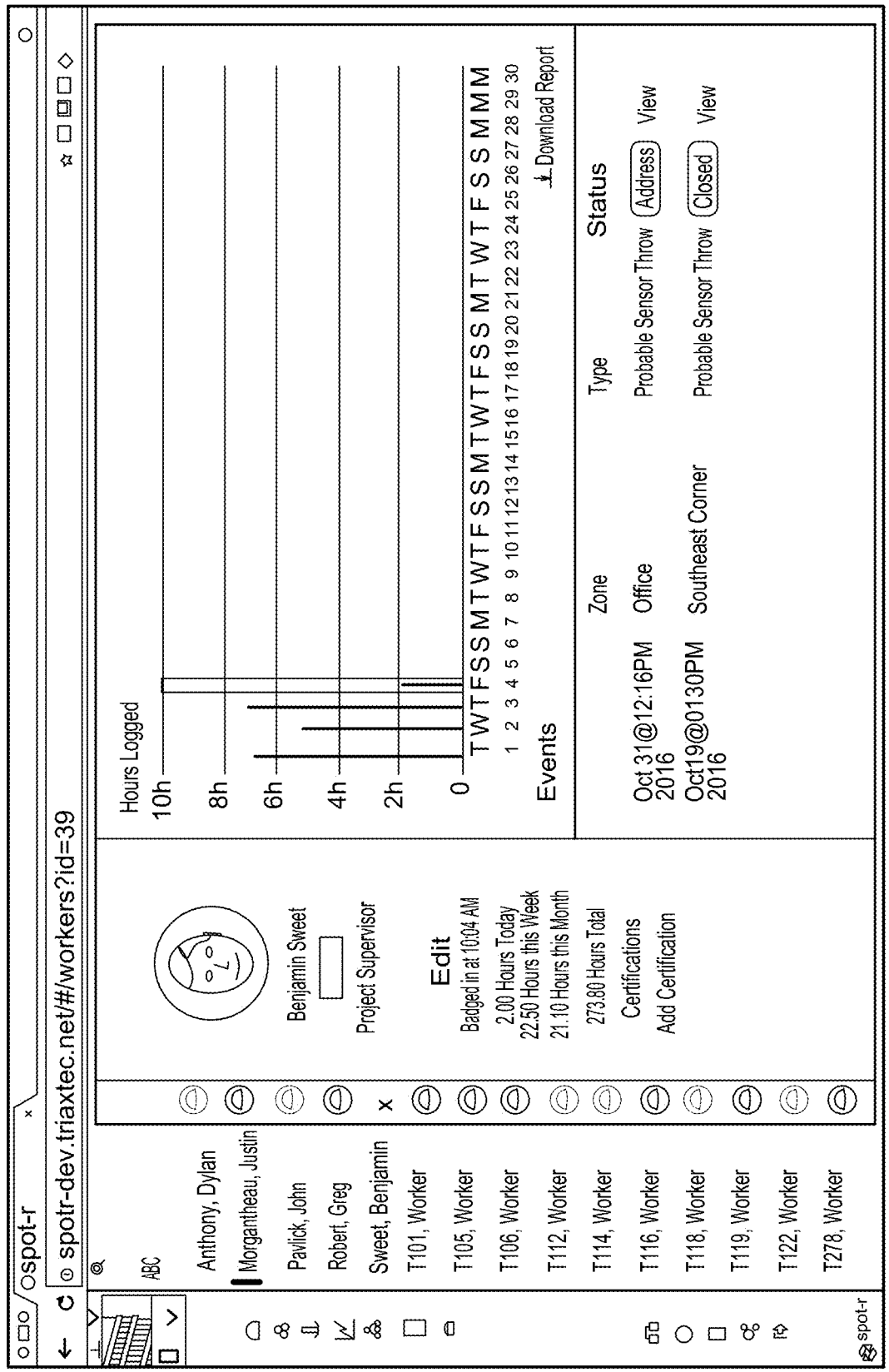

FIG. 17 shows an exemplary interface that permits an administrator to view the onsite history of a particular worker. The interface may show specific performance information associated with the worker, such as hours worked over particular periods, events logged, types of events, among other performance information.

Figure 18:
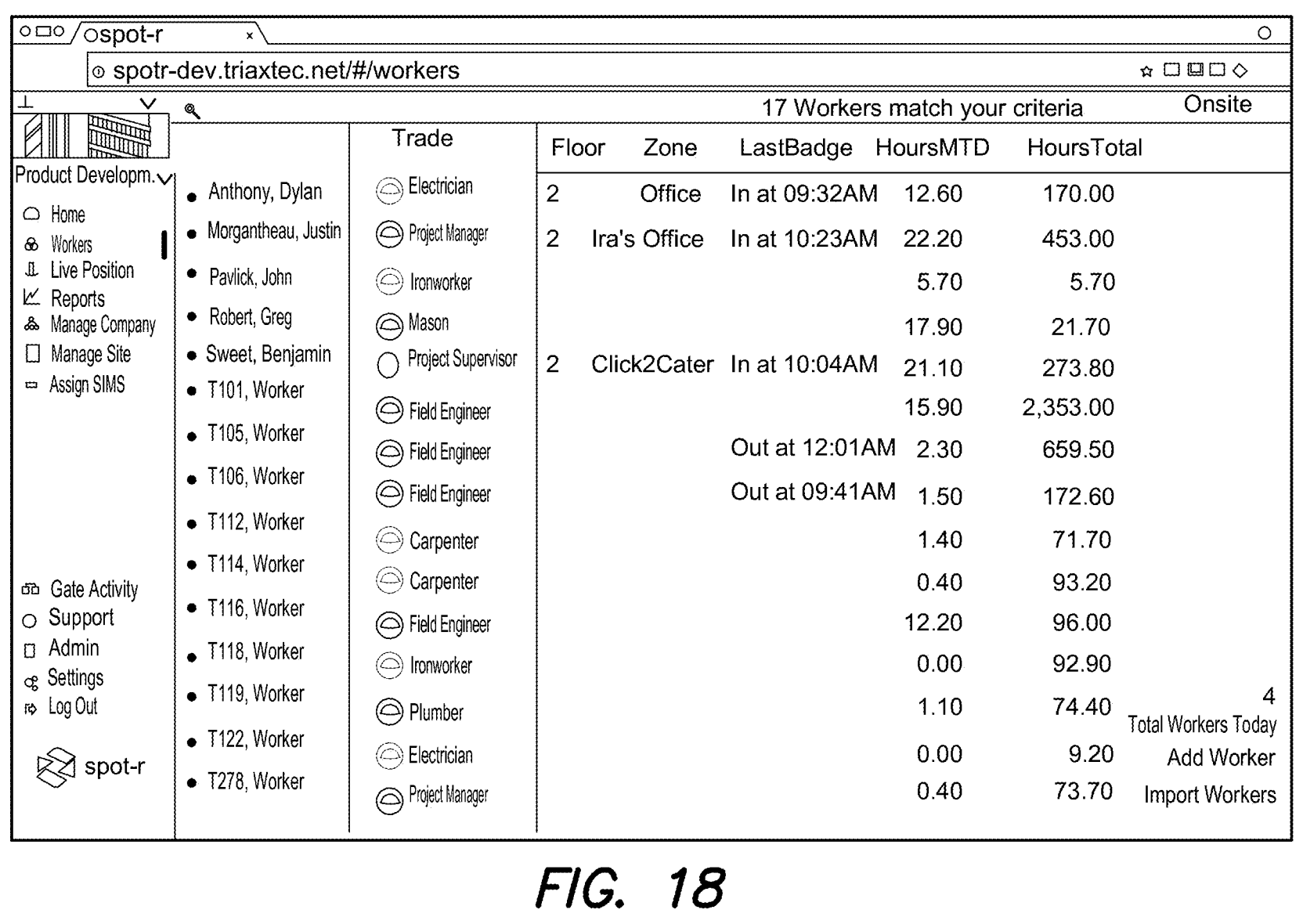

FIG. 18 shows an exemplary interface that permits an administrator to view a list of workers (e.g., in a tabular form). From this list, individual workers may be selected, and the administrator may selectively view information relating to individual workers. In the tabular view, the user (administrator) may view a list of workers, along with their role (e.g., a trade, level, etc.), the floor where they are presently located, a zone (e.g., a logical association of an area which can be mapped to one or more physical locations), when the worker was last badged, and hours logged information (e.g., daily, monthly, or some other period).

Figure 19:
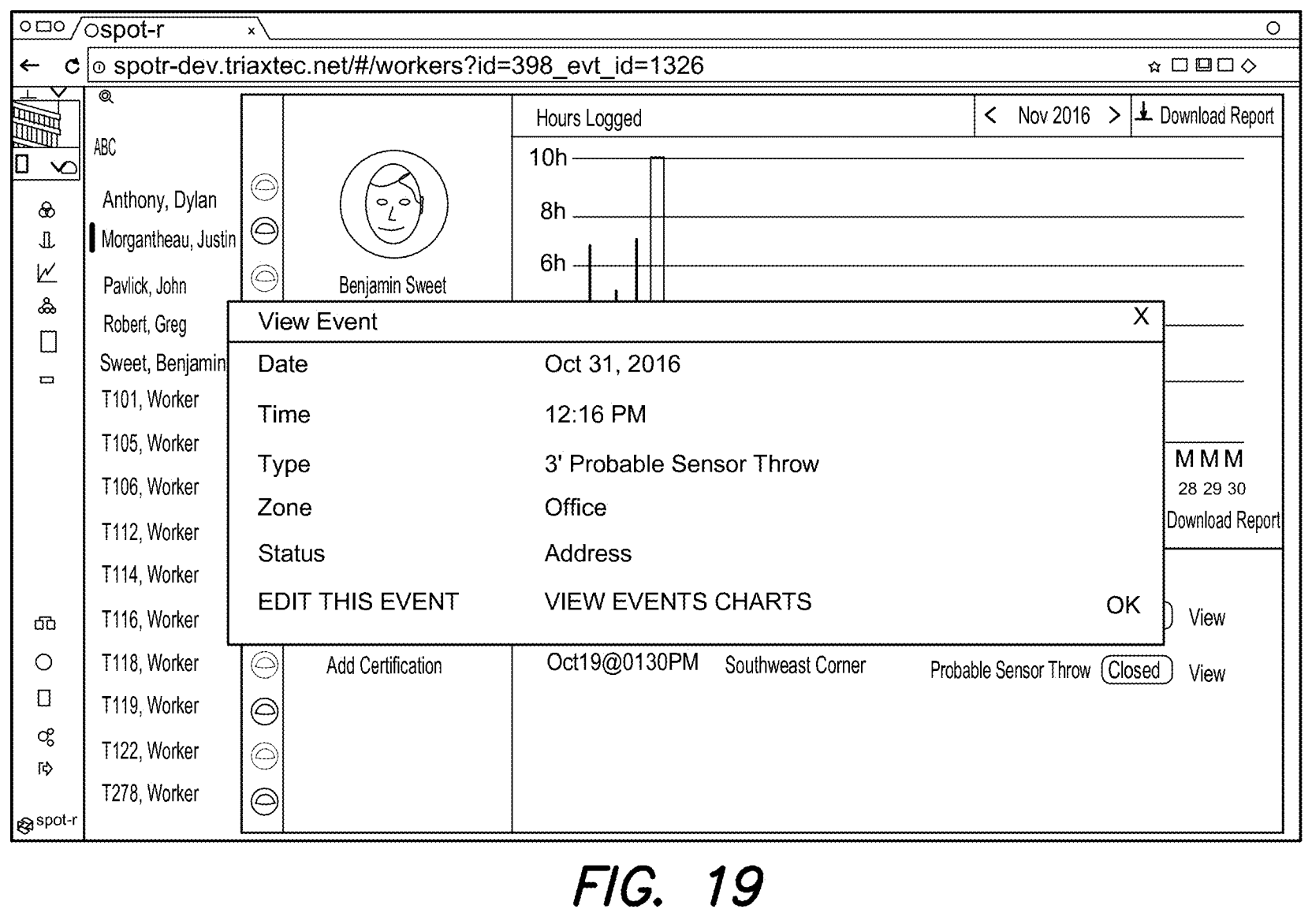

FIG. 19 shows an exemplary interface that permits an administrator to view detailed event information associated with particular workers. For instance, from a worker view, the administrator may select a particular event, which causes a window to provide more detailed information, such as when the event occurred, the type of event (e.g., as determined by the sensor and/or system analysis), and any zone or other event information. The system may also track how supervisors address and deal with identified events.

Figure 20:
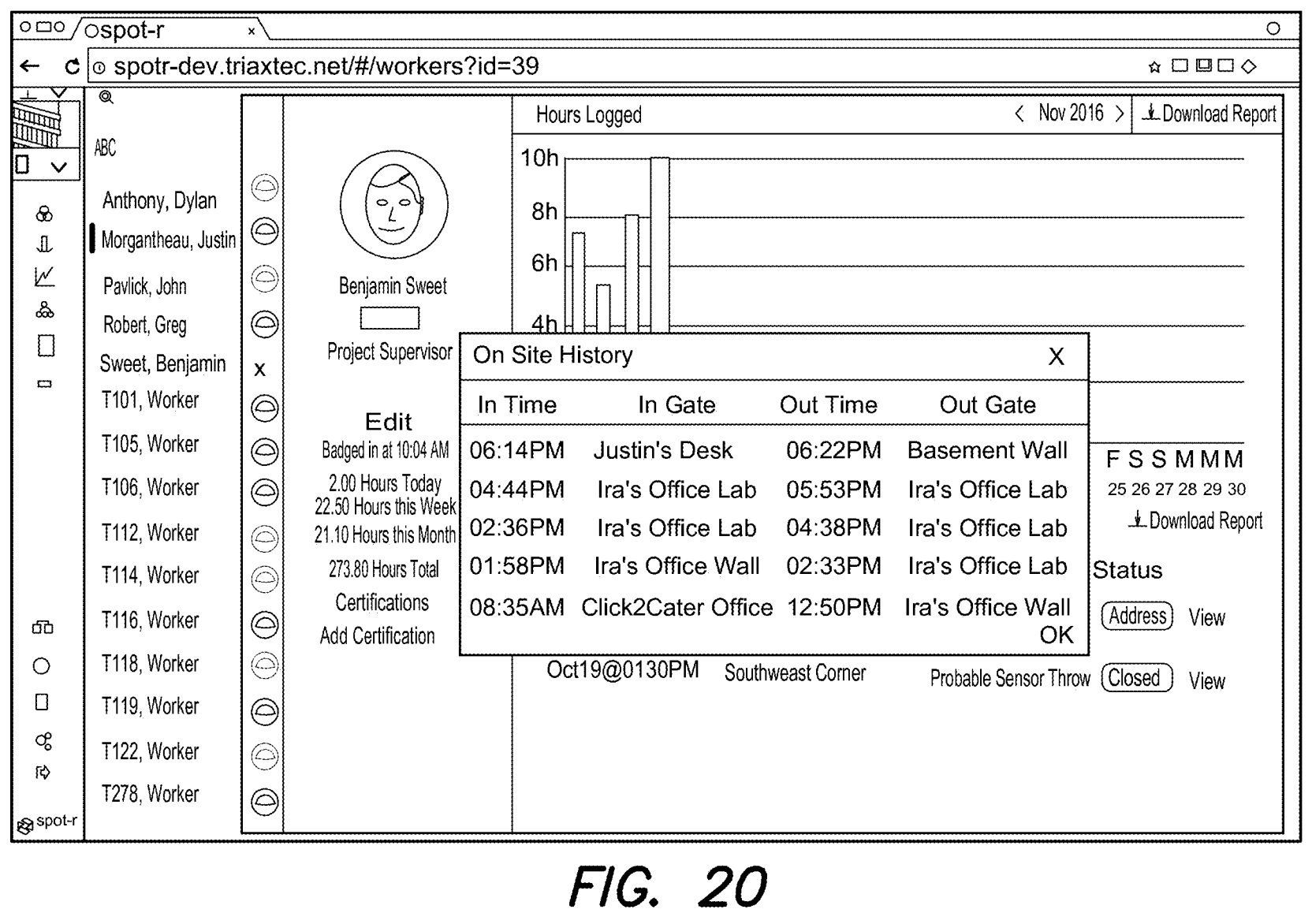

FIG. 20 shows an exemplary interface that permits an administrator to view a history of particular workers during their times on the identified worksite. In particular, an administrator may be provided a listing of the worker's location, in-time, out-time, in-gates, out-gates, or other relevant information while onsite.

Figure 21:
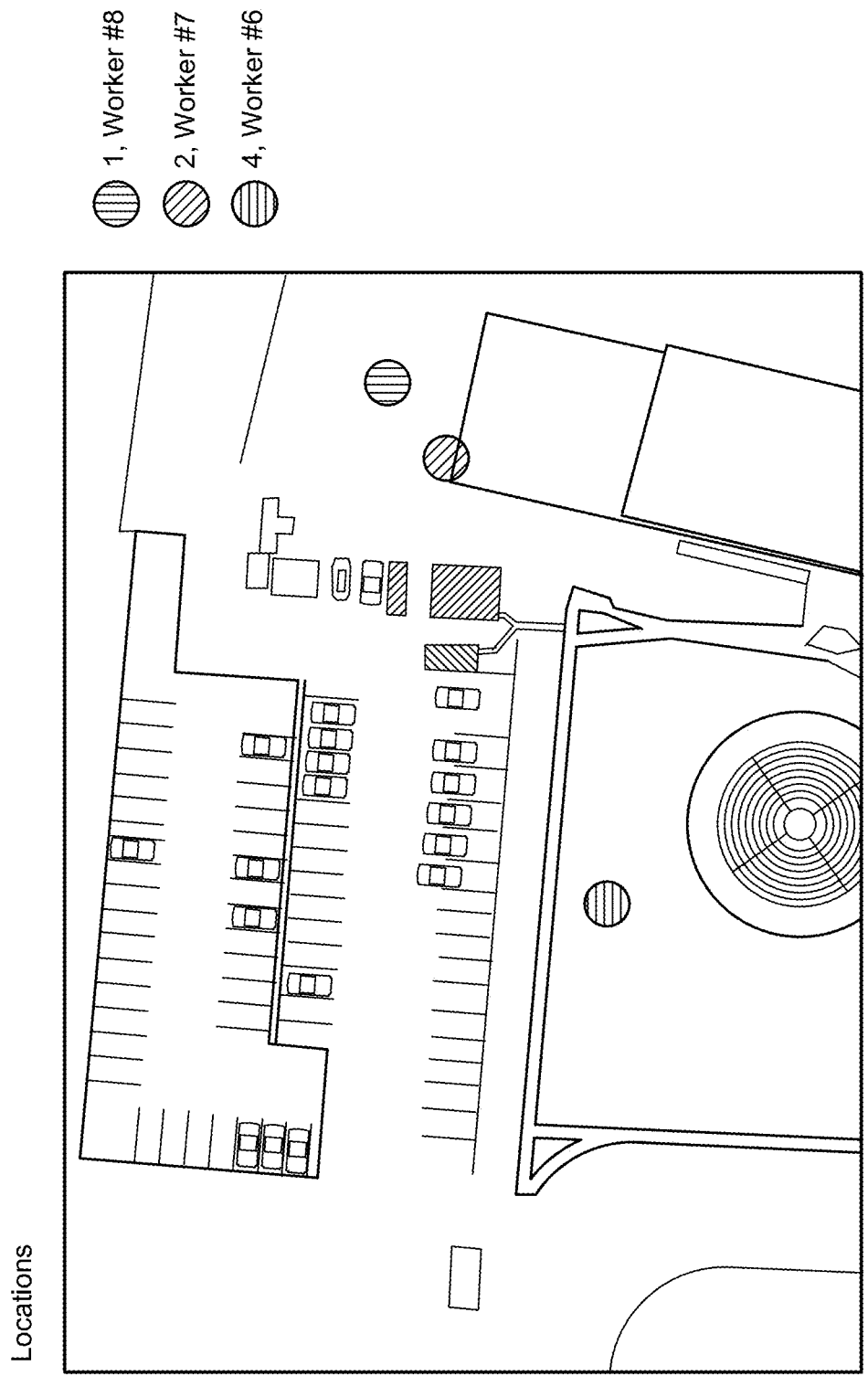

FIG. 21 shows an exemplary interface that permits an administrator to view the actual location of the worker on a map. Similarly, the interface may permit the administrator to view the actual location of a piece of equipment on the map. The workers or equipment may be identified as pins superimposed on a logical and/or image map, allowing the administrator to quickly discern the worker's or piece of equipment's location.

Figure 22:
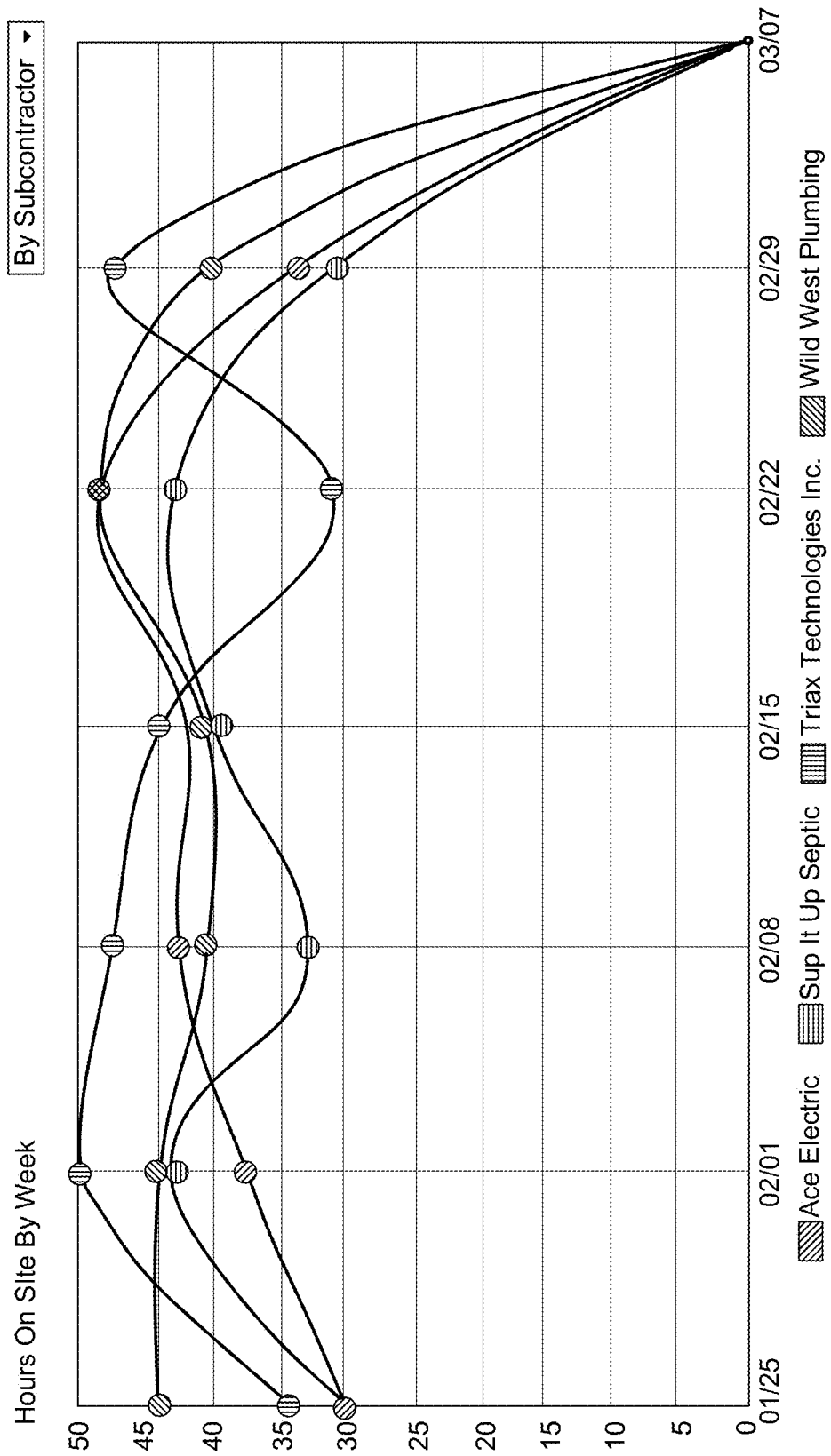

FIG. 22 shows an exemplary interface that permits an administrator to view performance information relating to the presence (or absence) of particular workers or groups of workers on a particular jobsite. This information may aid in planning and/or monitoring workers either individually or as a group (e.g., particular subcontractors). Such capabilities may also be integrated with one or more other systems, such as project planning, accounting, cost recovery and/or other tools.

Figure 23:
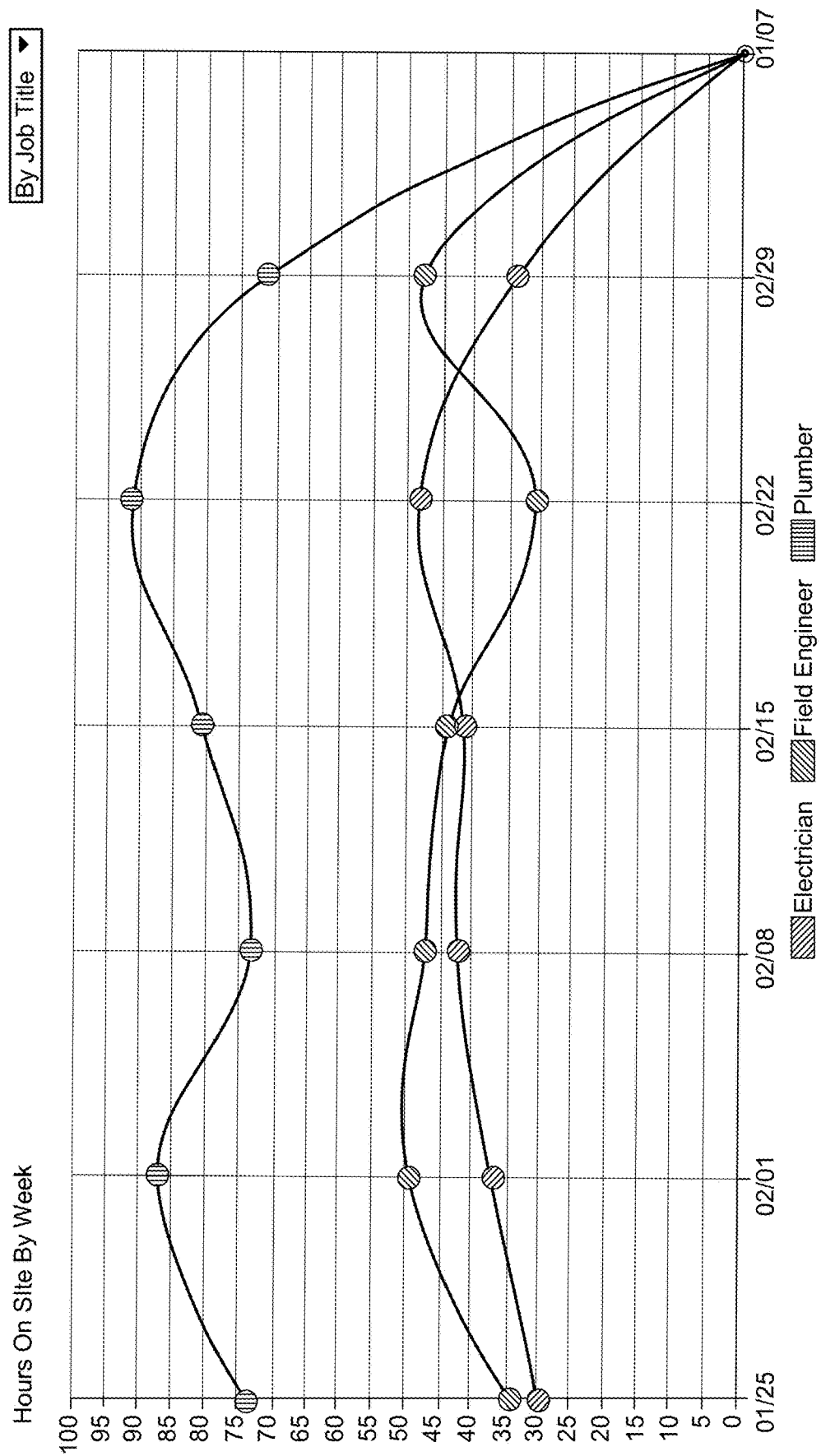

FIG. 23 shows an exemplary interface that permits an administrator to view performance information relating to particular types of workers at a jobsite. Such a view may show quickly to an administrator and/or manager whether there are issues relating to insufficient oversight, inadequate coverage or integration between trades, budget issues, or other issues relating to particular allocations of jobs and roles.

FIG. 24 shows an exemplary interface that permits an administrator to view, in a calendar view, what particular types of workers were present at a particular job site, job zone, or other identified work location. This capability may allow the administrator to identify resource allocation issues, and to more efficiently allocate resources.

It should be appreciated that the system may include other management features, and the embodiments described herein are not limited to these features. Also, it should be appreciated that any of these features may be used alone or in conjunction with any other features described herein.

Equipment Sensors

Figure 25:
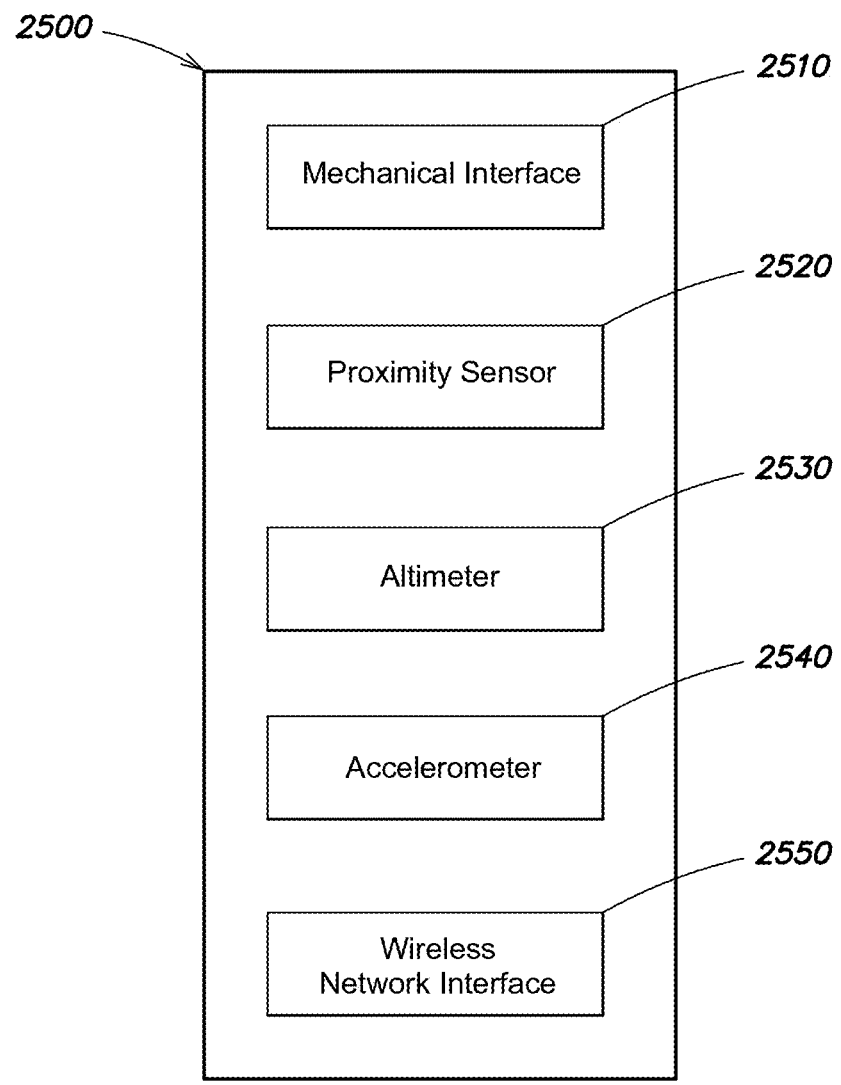
FIG. 25 shows an embodiment of an equipment sensor according to various aspects of the embodiments described herein.
Figure 26:
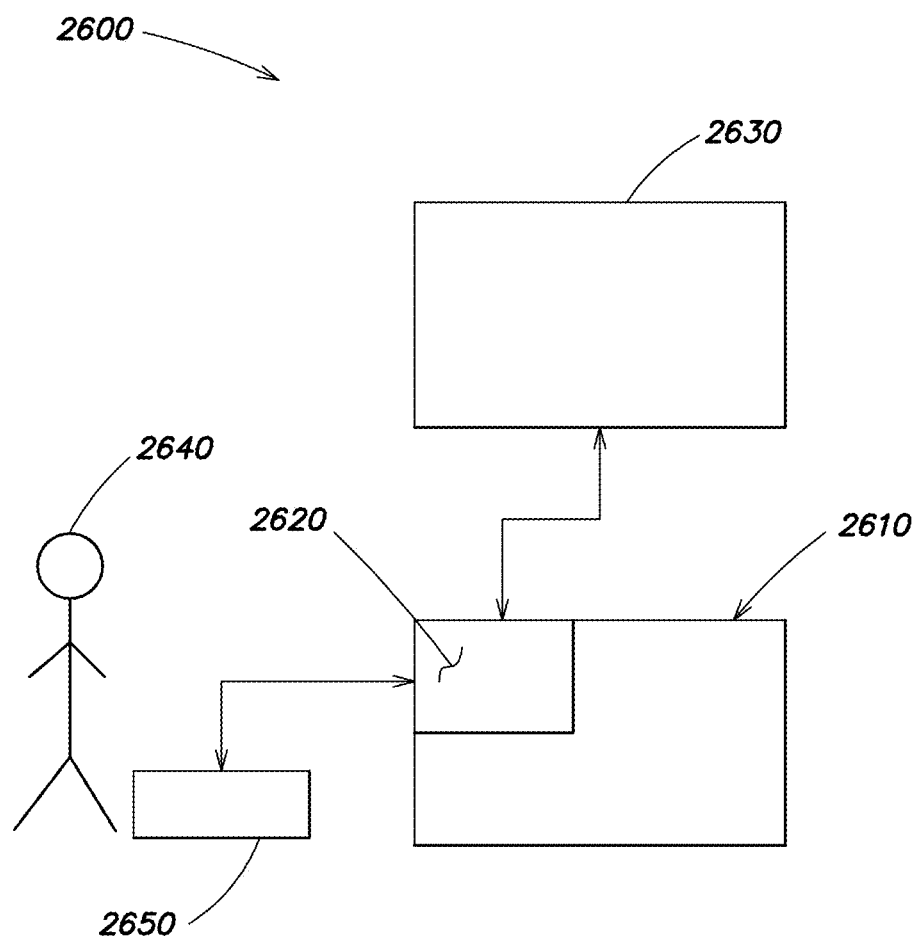
FIG. 26 shows an exemplary system in which the equipment sensor may be used.

Another aspect of the embodiments described herein relates to equipment sensors. The equipment sensor may have one or more attachments that are used to affix the equipment sensor to an item of equipment. For example, the equipment sensor may have one or more attachments that are used to affix the equipment sensor to a forklift, a skidsteer, a scissor lift, or another item of equipment either larger or smaller. FIGS. 25-26 show various embodiments of an equipment sensor that may be used to monitor a particular piece of equipment. The equipment sensor may include, for example, a clip that attaches the equipment sensor to the piece of equipment. The clip may include an internal mechanism that, when clipped to the piece of equipment, a switch is activated. The switch may be used alone or in conjunction with other sensors (e.g., a proximity sensor) to determine whether the equipment sensor is coupled to the piece of equipment.

FIG. 25 shows an embodiment of an equipment sensor according to various aspects of the embodiments described herein. In some embodiments, an equipment sensor 2500 may include one or more mechanical interfaces 2510, one or more proximity sensors 2520, one or more altimeters 2530, one or more accelerometers 2540, and one or more wireless network interfaces 2550.

The one or more mechanical interfaces 2510 may be configured to attach the equipment sensor 2500 to a piece of equipment. The one or more mechanical interfaces 2510 may comprise at least one screw, at least one zip-tie, or double sided-tape, or any other suitable mechanical interface to attach the equipment sensor 2500 to the piece of equipment. The piece of equipment may have Velcro permanently affixed to the piece of equipment, and the one or more mechanical interfaces 2510 may be designed to attach to the Velcro. The equipment sensor 2500 may include a physical holder or case, and the one or more mechanical interfaces 2510 may be included in the physical holder or case.

The proximity sensor 2520 may be configured to detect a presence of an operator of the piece of equipment. In some embodiments, the proximity sensor 2520 may be configured to detect the presence of the operator when the operator is operating the piece of equipment. In some embodiments, the proximity sensor 2520 may be an infrared sensor or a capacitive proximity sensor, or any other suitable proximity sensor to detect the presence of the operator of the piece of equipment. When the proximity sensor 2520 detects the presence of an operator, the equipment sensor 2520 may determine if the operator is authorized to operate the piece of equipment. This may be useful as a supervisor may be alerted when an unauthorized operator, for example an operator with insufficient training to operate the piece of equipment, attempts to operate the piece of equipment. The equipment sensor 2500 may be capable of providing an alert when such an event occurs. The equipment sensor 2500 may include a speaker, sound module, transducer, or other type of sound generating component to generate audio alerts. For instance, in one embodiment, the sound generating component may be configured to generate sounds upon certain conditions (e.g. detection of an unauthorized operator). The equipment sensor 2500 may also include a mechanism for visually displaying an alert. For example, the equipment sensor 2500 may include an LED indicator to indicate that the operator is unauthorized to operate the piece of equipment.

The altimeter 2530 may be configured to detect an altitude of the piece of equipment. In some embodiments, the altimeter 2530 may be a barometric pressure sensor, or any other suitable pressure sensor to detect the altitude of the piece of equipment. The altimeter 2530 may determine the altitude of the piece of equipment by comparing the barometric pressure as measured by the equipment sensor 2500 with pressure measured by one or more nearby nodes of the external system. According to one implementation, the altitude of particular nodes in the external system is a known entity (e.g. they can be determined a priori during installation, or may be determined using a pressure detection element located within a node of the external system. These known heights may be used to determine what floor of a structure the piece of equipment is located using a table (or other data structure) including heights for each floor, the data being stored in a database accessible through a communication network. An absolute altitude may be determined by comparing the altimeter's pressure measurement to the values stored in the database. Once an altitude is determined, a floor of a particular structure may be determined based on a comparison with the pressure values of the known nodes of the external system. Once a floor is determined, possible regions/zones may be determined on that floor using relative signal strengths to nodes of the external system. By using both altitude an relative signal strengths, a more accurate location within the worksite of the piece of equipment may be determined.

The accelerometer 2540 may be configured to detect motion of the piece of equipment. In some embodiments, the accelerometer 2540 may be a 3-axis accelerometer, or any other suitable sensor to detect the motion of the piece of equipment. The detected motion of the piece of equipment may indicate whether the piece of equipment is in use. This may be useful in monitoring how long a specific piece of equipment is use, and thus determine its fuel consumption or determine when the specific piece of equipment is in need of routine maintenance.

The wireless network interface 2550 may be configured to communicate data to an external system, the data comprising at least one of a group of information including: the altitude of the piece of equipment, the presence of the operator of the piece of equipment, and the motion of the piece of equipment. To this end, the equipment sensor 2500 may include one or more antennas that permit the equipment sensor 2500 to communicate wirelessly to one or more nodes within the external system. The equipment sensor 2500 may also include a power source (e.g. a battery). The equipment sensor 2500 may be designed in order to minimize the amount of power drawn on the battery such that the equipment sensor 2500 need not be recharged as often.

The equipment sensor 2500 may be RFID capable and, to this end, may include an RFID transponder. When scanned, the RFID transponder may provide an identifier of the particular equipment sensor (e.g. equipment sensor 2500). The RFID transponder or tag may be an active tag, a passive tag, battery-assisted passive tag, or other implementation. The RFID function may be implemented in conjunction with or separate from other functions of the equipment sensor 2500. In an alternative embodiment, RFID capability may be built in to one or more of the nodes of the external system, and a control on the node may be provided that permits the equipment sensor 2500 to be admitted to the network without a separate computer system. In such a case, the network node, after scanning the RFID of the equipment sensor, may send a message over an administration channel to admit the equipment sensor to the network.

FIG. 26 shows an exemplary system in which the equipment sensor may be used. In some embodiments, a system 2600 may include a piece of equipment 2610, an equipment sensor 2620 attached to the piece of equipment 2610, an external system 2630, an operator 2640, and a wearable sensor 2650. In some embodiments, the external system 2630 may be a mesh network as described herein, and the wearable sensor 2650 may be a sensor device worn by the operator 2640 as described herein.

In some embodiments, the equipment sensor 2620 may communicate with the wearable sensor 2650 of the operator 2640. As discussed in connection with FIG. 25, the equipment sensor may include a proximity sensor configured to detect a presence of the operator. If the equipment sensor 2620 detects the presence of the operator 2640, the equipment sensor 2620 may attempt to communicate with the wearable sensor 2650 in order to detect and identify the wearable sensor 2650 and thus the operator 2640. In order to detect and identify the wearable sensor 2650, in some embodiments the equipment sensor 2620 may transmit a signal at a regular interval, but at a significantly reduced power level. This may cause nearby wearable devices to detect and report the equipment sensor 2620 if they receive its signal. In other embodiments, the equipment sensor 2620 may receive a signal from the wearable sensor 2650. In each embodiment, the equipment sensor 2620 may then determine which wearable sensor 2650, and thus which operator 2640, is at the controls of the piece of equipment 2610. This may be done by determining if a signal strength exceeds a threshold. This threshold may be set differently based on the type of equipment and the location of the equipment sensor on the piece of equipment relative to the operator position.

By communicating with the wearable sensor 2650, the equipment sensor 2620 may determine if the operator 2640 is authorized to operate the piece of equipment 2610. For each piece of equipment 2610 or for each class of equipment, there may be specific operators who are authorized to operate the piece of equipment. Authorization may be determined by whether the individual has completed certain training/certifications, work experience, trade/job description, subcontractor, team, or other criteria set by site management. In some embodiments, the equipment sensor 2620 may determine whether the operator 2640 is authorized to operate the piece of equipment 2610 at least by determining if the operator is wearing a wearable device, identifying the wearable device, and determining if the operator is authorized to operate the piece of equipment based at least on a signal received from the wearable device. In other embodiments, the equipment sensor 2620 may determine whether the operator 2640 is authorized to operate the piece of equipment 2610 at least by determining if the operator is wearing a wearable device, transmitting a first signal to the wearable device, and receiving a second signal indicating whether the operator 2640 is authorized to operate the piece of equipment 2610. The equipment sensor 2620 may also include an access control list of operators that are authorized to operate the piece of equipment 2610.

When an operator is determined to be unauthorized, the equipment sensor 2620 may perform various actions. The equipment sensor 2620 may send a notification to a supervisor. The notification may be an SMS message, an email, or a push notification, and may be sent to the supervisor's computer and/or mobile device(s). The equipment sensor 2620 may also play an audible alert or display a visual alert on the wearable device 2650 or the equipment sensor 2620. The equipment sensor 2620 may also be integrated with telematics and control systems of the piece of equipment 2610 and be configured to disable the piece of equipment 2610.

In other embodiments, the determination if the operator 2640 is authorized to operate the piece of equipment 2610 may be performed by the external system 2630. For example, the equipment sensor 2620 may determine the identity of the operator 2640, and send a signal to the external system 2630 indicating the identity of the operator 2640. The external system 2630 may then determine if the operator 2640 is authorized to operate the piece of equipment 2610. In such an embodiment, if it is determined that the operator 2640 is not authorized to operate the piece of equipment 2610, the external system 2630 may alert a supervisor of the worksite.

In some embodiments, the equipment sensor 2620 may communicate with the external system 2630 in order to determine a location of the piece of equipment 2610. The equipment sensor 2620 may determine the location of the piece of equipment 2610 at least by determining strengths of signals received from nodes of the external system 2630. In other embodiments, the location of the equipment sensor 2620 may be determined wherein the equipment sensor 2620 transmits a signal that may be received by at least one wearable device 2650. The equipment sensor 2650 may communicate with the external system 2630 to indicate the presence of the equipment sensor 2620, and thus the piece of equipment 2610. The relative location of the equipment sensor 2620 may be determined by the strength of the signal received by the wearable device 2650. Such an arrangement may improve battery performance for both the wearable device 2650 and the equipment sensor 2620.

In some embodiments, the equipment sensor 2620 may determine an activity level of the piece of equipment 2610. The equipment sensor 2620 may determine the activity level of the piece of equipment 2610 at least through motion measured by an accelerometer. Various levels of activity may be set by using filters and thresholds to measure specific types of activity. For example, a low-amplitude periodic acceleration within a particular frequency band may indicate idling of an engine of the piece of equipment 2610, while larger non-periodic acceleration may indicate driving or digging. The equipment sensor 2620 may also determine whether the piece of equipment 2610 is being operated by the operator 2640. The filter parameters and thresholds may be programmable, and may allow for activity detection to be optimized for a specific piece of equipment.

The equipment sensor 2620 may monitor the overall utilization of the piece of equipment 2610. This may be advantageous as it may allow for improved productivity and efficiency, for example by moving idle equipment to different sites and/or adjusting construction schedules in order to equalize the utilization of various pieces of equipment. This may be especially important to rental companies, who may reduce internal costs and pass savings to customers through even relatively small improvements in utilization.

The equipment sensor 2620 may also regulate scheduled maintenance. Maintenance of a piece of equipment 2610 may be correlated with the number of hours the piece of equipment 2610 is in use. Larger equipment typically have telematics devices that support this, but such devices are often expensive in both initial and ongoing costs. The equipment sensor 2620 may be less expensive, and may be smaller and thus better suited than typical telematics devices to be incorporated into smaller equipment.

The equipment sensor 2620 may also be able to monitor the fuel consumption and/or the carbon footprint of a piece of equipment 2610. Since the equipment sensor 2620 may be able to differ between different types of activity, such as an engine idling or active use, data from the equipment sensor 2620 may be able to accurately measure fuel usage as well as identify unnecessary time spent idling.

In addition to real-time alerts generated for unauthorized users, the equipment sensor 2620 may gather statistics and generate reports in order to provide the above information. The reports may be sent to a supervisor of the work site, and may be communicated through the external system 2630. Reports may be generated covering various time frames (e.g. daily, weekly, monthly, quarterly, etc.), and may be aggregated to various levels within an organization (by subcontractor/team, job site, geographic region, business unit, etc.). Statistics in the report may also be aggregated in various ways, such as by equipment type and whether the piece of equipment is owned or rented. The report may include at least a percent of utilization of the piece of equipment, a number of unauthorized usage events, a number of hours of unauthorized use, a number of hours of use in one or more geographical areas, a time spent in one or more operating modes, a number of hours of operation since a maintenance service, and an estimated fuel consumption and/or carbon output.

In some embodiments, the equipment sensor 2620 may also have the capability to be recharged without having to uninstall the equipment sensor 2620 from the piece of equipment 2610. While the equipment sensor 2620 may achieve many months of battery life, it may be advantageous to recharge the equipment sensor 2620 in-place, especially in cases when the equipment sensor 2620 is permanently mounted to the piece of equipment 2610. In some embodiments, the recharging may be accomplished with a standard connector (e.g., micro-USB) or with a proprietary clip-on adapter. The clip-on adapter may include spring-loaded contacts or a standard wireless charging technology (e.g., Qi). In such embodiments, the recharging may be performed from a USB battery pack, of the kind that may be used to recharge a phone or a tablet. By doing so, the equipment sensor 2620 may be recharged without being uninstalled from the piece of equipment 2610.

Herein, the equipment sensor 2620 has been described as comprising various sensors (e.g., an altimeter and an accelerometer) and as capable of performing various functions. In other embodiments, various functions of the equipment sensor 2620 may be performed by the external system 2630 (for example, determining if an operator 2640 is authorized to operate a piece of equipment 2610, determining a location of the piece of equipment 2610, determining if the piece of equipment 2610 is in use, monitoring fuel consumption of the piece of equipment 2610, and gathering statistics and generating reports relating to the piece of equipment 2610). The equipment sensor 2620 may transmit at least one signal to the external system 2630 indicating measurements from the various sensors. The external system 2630 may perform the various functions of the equipment sensor 2640 using the measurements from the various sensors of the equipment sensor 2640 as inputs.

Over-the-Air Programming Using Accelerometer-Based Unlock Sequence

Another aspect of the embodiments described herein relates to configuration and programming of sensor devices and more generally, electronic devices that include the ability to detect movement and/or orientation. In one implementation of the sensor-based system, there may be included wearable sensors which are sealed at the factory, which may be updated with new firmware/software either at a distribution facility or in the field. To facilitate this, a system may be provided that uses the device's accelerometer to unlock and enable programming mode, so that the device can receive a firmware or other type of programming update via radio communication via a communication network.

In its simplest form, a device which has not had application firmware installed will remain in a low-power sleep state, periodically waking up to measure the acceleration measured by the accelerometer sensor. When at rest, this acceleration measures 1.0 g from gravity, in a direction dependent on the orientation of the device. According to one embodiment, the sensor may use this information to identify if the sensor is placed in a particular orientation, and if that orientation is detected, the sensor starts searching for a signal from the programming device. The orientation may be detected, for example, responsive to a wake-up event, such as movement, an outside signal, or other activity. When such a signal is detected, the programming process is started from the programming device.

Because this process does not require any direct interaction with the device other than placing the sensor in a known orientation, this capability makes it ideal for programming a large number of devices that are packaged together, or programming a device while it remains within its packaging without having to take the device out of the packaging. For instance, according to one embodiment, an administrator can take a box of devices off the warehouse shelf, put the box in a fixture to hold it in the activation orientation, and program all the devices in the box without unsealing the packaging.

Further, it should be appreciated that other methods may be used that incorporate this feature in a variety of options, such as implementing a multi-step sequence for unlocking programming mode, requiring two (2) or more orientations. Further, the orientations may also require specific timing, which lessens the possibility that the devices can be accidentally placed in the programming mode (e.g., during shipping) and providing for additional security. However, it should be appreciated that various aspects may use the single-orientation system in combination with other orientations and/or programming modes.

Evacuation Alert Device

Figure 27:
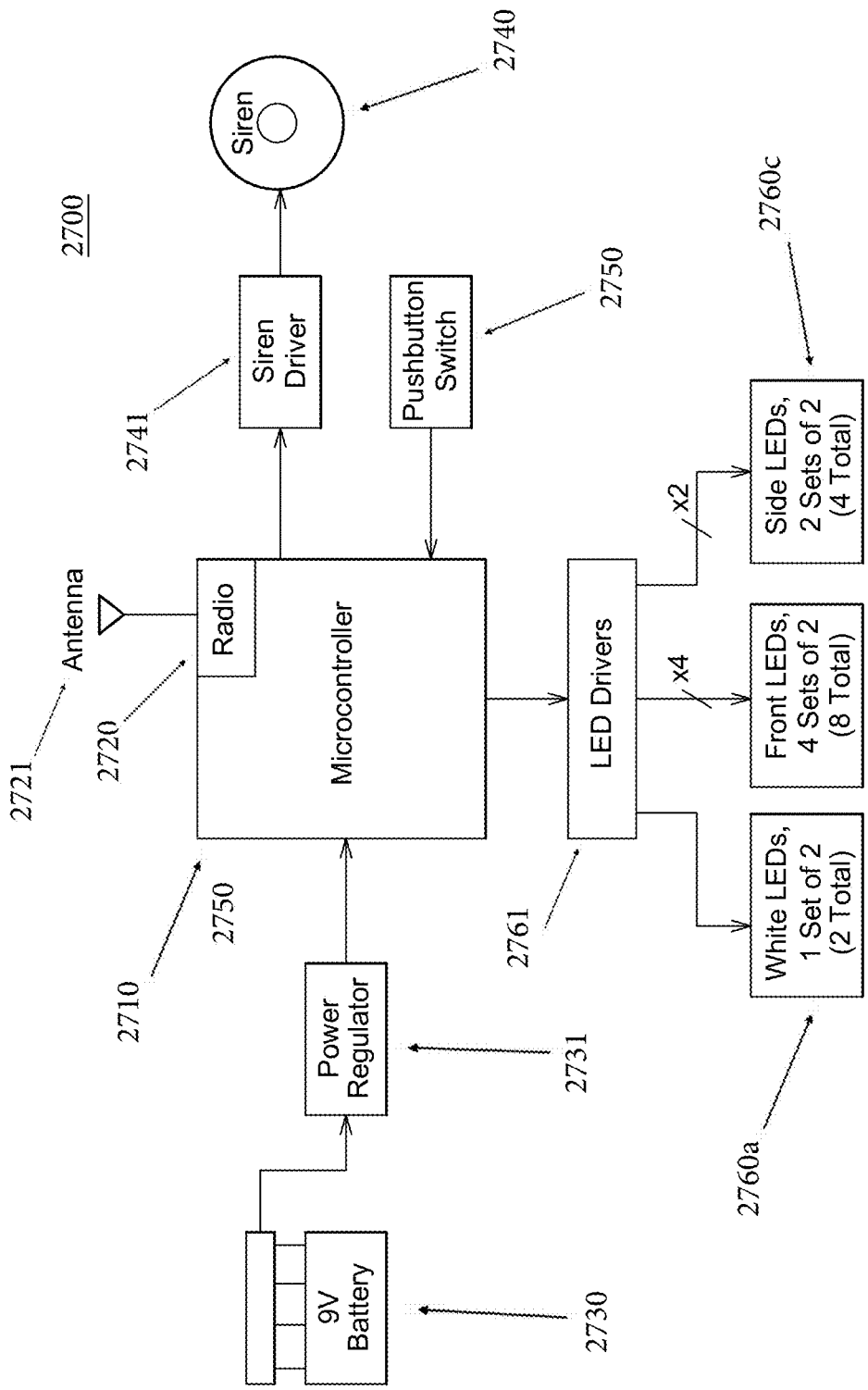
FIG. 27 shows a block diagram of an embodiment of an evacuation alert device according to various aspects of the embodiments described herein.
Figure 28:
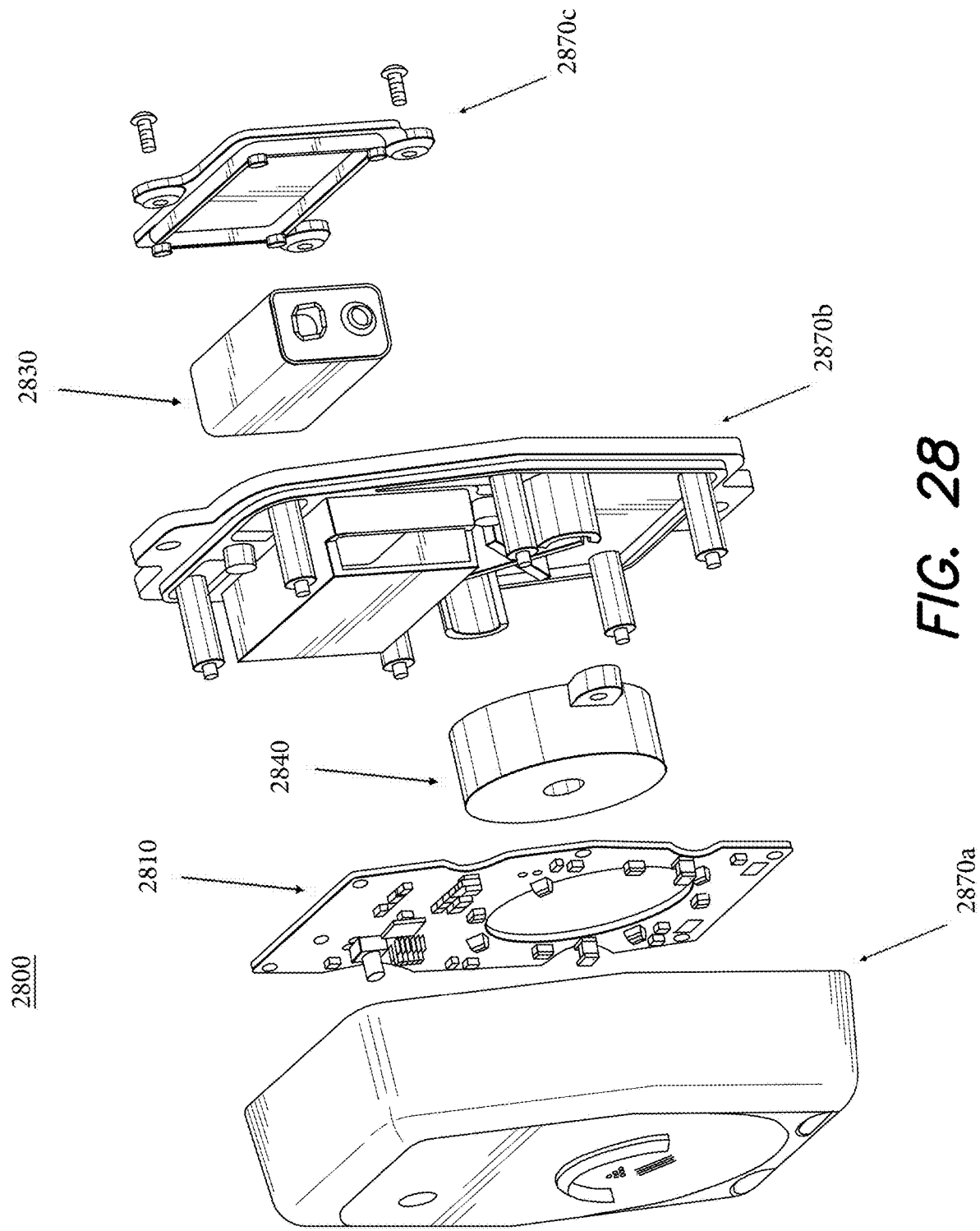
FIG. 28 shows an exploded view of an embodiment of an evacuation alert device according to various aspects of the embodiments described herein.
Figure 29:
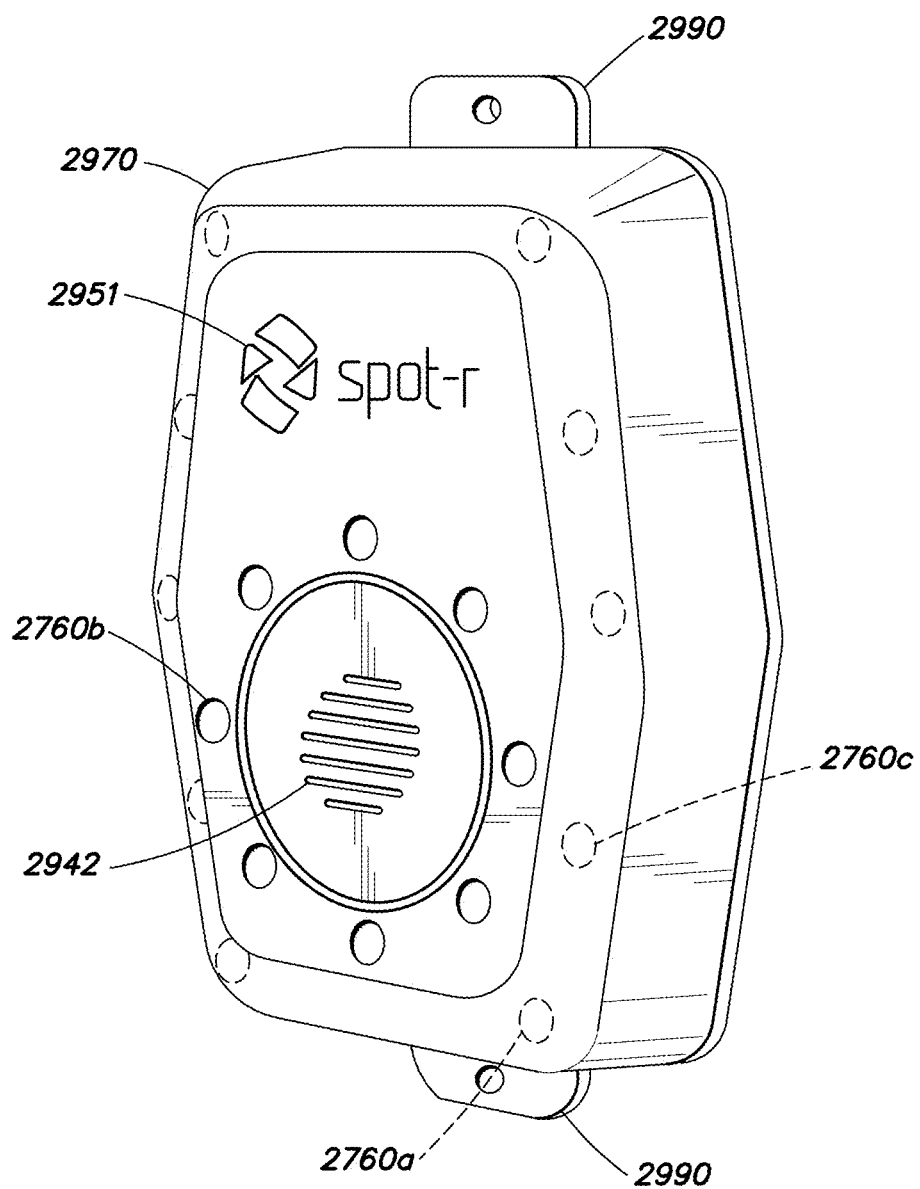
FIG. 29 shows an embodiment of an evacuation alert device according to various aspects of the embodiments described herein.

Another aspect of the embodiments described herein relates to an evacuation alert device. The evacuation alert device may have one or more attachments that are used to affix the evacuation alert device to a surface at a worksite. For example, the evacuation alert device may have one or more attachments that are used to affix the evacuation alert device to a wall or a ceiling at a particular location in the worksite. The evacuation alert device may be configured to provide an alert to workers at a particular location within a worksite in a quick and effective manner. Current methods for alerting within a particular location include manual alert methods such as using a blow horn, a megaphone, or other devices. Such manual alert methods often put the person who is alerting workers in danger themselves. In some embodiments, the evacuation alert device may allow an entire worksite to be notified of an evacuation event at once, which may improve safety of the worksite. According to some embodiments, it may be beneficial to have a device that can be easily placed around a worksite to perform visual and audible alerting. For instance, a device that has its own power source and does not require communication wiring can be easily used in construction areas that do not have such capabilities. FIGS. 27-29 show various embodiments of an evacuation alert device that may be configured to provide an alert to a worksite during an evacuation event.

FIG. 27 shows a block diagram of an embodiment of an evacuation alert device according to various aspects of the embodiments described herein. In some embodiments, the evacuation alert device 2700 may include a microcontroller 2710, a radio 2720, an antenna 2721, a battery 2730, a power regulator 2731, a siren 2740, a siren driver 2741, a pushbutton switch 2750, a plurality of white LEDs 2760a, a plurality of front LEDs 2760b, a plurality of side LEDs 2760c, and LED drivers 2761.

The microcontroller 2710 may be configured to control the operation of the evacuation alert device 2700. For example, the microcontroller 2710 may be connected to the radio 2710, the power regulator 2731, the siren driver 2741, the pushbutton switch 2750, and the LED drivers 2761. The microcontroller 2710 may communicate with the radio 2720 in order to operate the antenna 2721, which may allow the evacuation alert device 2700 to communicate with an external system. For example, this may allow the evacuation alert device 2700 to communicate on a wireless mesh network, and may receive signals from a management system, other sensor devices, a supervisor device, or other devices. In some embodiments, the external system may indicate an evacuation event to the evacuation alert device 2700. The microcontroller 2710 may be connected to the power regulator 2731 in order to draw power from the battery 2730.

In some embodiments, a location of the evacuation alert device 2700 may be determined by communicating with nodes of the external system. For example, the evacuation alert device 2700 may receive at least one signal from nodes of the external system, and may determine its relative location by the strength of the at least one signal. In other embodiments, the evacuation alert device 2700 may transmit a signal that may be received by nodes of the external system. The relative location of the evacuation alert device 2700 may be determined by the strength of the signal received by the nodes of the external system.

The microcontroller 2710 may communicate with the siren driver 2741 in order to operate the siren 2740. In some embodiments, the microcontroller 2710 may cause the siren 2740 to emit a sound during the evacuation event.

The microcontroller 2710 may be connected to the pushbutton switch 2750 in order to receive a signal when the pushbutton switch 2750 is pressed. In some embodiments, the pushbutton switch 2750 may be pressed to pair the evacuation alert device 2700 to the external system.

The microcontroller 2710 may communicate with the LED drivers 2761 in order to operate the plurality of white LEDs 2760a, the plurality of front LEDs 2760b, and/or the plurality of side LEDs 2760c. In some embodiments, the microcontroller 2710 may cause the plurality of white LEDs 2760a, the plurality of front LEDs 2760b, and/or the plurality of side LEDs 2760c to emit light during the evacuation event.

The radio 2720 may be configured, with the antenna 2721, to communicate with the external system. In doing so, the evacuation alert device 2700 may receive from the external system an indication of an evacuation event. In some embodiments, the evacuation alert device 2700 may receive an indication of an evacuation event from a management system, other sensor devices, a supervisor device, or other devices.

During the evacuation event, the evacuation alert device 2700 may cause the siren 2640 to emit sound and the plurality of white LEDs 2760a, the plurality of front LEDs 2760b, and/or the plurality of side LEDs 2760c to emit light. In doing so, the evacuation alert device 2700 may alert a worksite of the evacuation event. For example, a gas leak may occur on the worksite, and the evacuation alert device 2700 may alert workers within range of audio signals (e.g., from the siren 2640) and/or visual signals (e.g., from the plurality of white LEDs 2760a, the plurality of front LEDs 2760b, and/or the plurality of side LEDs 2760c) that a possible life-threatening event is occurring and to leave the worksite.

In some embodiments, the evacuation event may be indicated by an authorized person (e.g., a manager of the worksite) by, for example, pressing a button on a sensor device or selecting a user interface control on a management system. In such embodiments, when the authorized person has indicated an evacuation event, the evacuation alert device 2700 may receive a signal indicating the evacuation event. For example, the evacuation alert device 2700 may communicate on a wireless mesh network, and the evacuation alert device 2700 may receive the indication of the evacuation event from nodes on the wireless mesh network.

In the embodiment of the evacuation alert device 2700 shown in FIG. 27, the evacuation alert device 2700 includes a radio 2720 and antenna 2721. However, it should be appreciated that the evacuation alert device 2700 could include a different wireless network interface configured to pair the evacuation alert device 2700 to the external system and to communicate with the external system, as the present application is not so limited.

The battery 2730 may be configured to, through the power regulator 2731, provide power for the evacuation alert device 2700. In some embodiments, the battery 2730 may be a 9-volt battery, but the present application is not so limited.

The siren 2740 may be configured to emit sound during an evacuation alert. The siren 2740 may be capable of emitting a plurality of different sounds or patterns of sounds. In some embodiments, the siren 2740 may emit a specific sound depending on the type of the evacuation event. For example, the siren 2740 may be configured to emit a first sound when the evacuation event is a gas leak, and emit a second, different sound when the evacuation event is a fire. In the embodiment of the evacuation alert device 2700 shown in FIG. 27, the evacuation alert device 2700 includes a siren 2740. However, it should be appreciated that the evacuation alert device 2700 could include a different mechanism for emitting sound (e.g., a speaker or a buzzer), as the present application is not so limited.

The pushbutton switch 2750 may be configured to provide a signal to the microcontroller 2710, which may cause the evacuation alert device 2700 to pair to the external system. For example, an authorized person (e.g., a worksite manager) may press the pushbutton switch 2750 in order to pair the evacuation alert device 2700 to the external system, in order to allow an indication of an evacuation event to be provided to the evacuation alert device 2700. In some embodiments, there may be a predetermined amount of time that the pushbutton switch 2750 may be pressed in order to pair the evacuation alert device 2700 to the external system.

In some embodiments, the evacuation alert device 2700 may include an LED that emits light to indicate that the evacuation alert device 2700 is paired to the external system. For example, the LED may periodically blink to indicate that the evacuation alert device 2700 is paired to the external system. This LED may be one of the plurality of white LEDs 2760a, the plurality of front LEDs 2760b, or the plurality of side LEDs 2760c, or it may be a separate LED.

In some further embodiments, pressing the pushbutton switch 2750 may cause the evacuation alert device 2700 to test its functionality. For example, in such an embodiment, pressing the pushbutton switch 2750 may cause the siren 2740 to emit sound, and may cause the plurality of white LEDs 2760a, the plurality of front LEDs 2760b, and/or the plurality of side LEDs 2760c to emit light. This may allow for an authorized person to press the pushbutton switch 2750 in order to test for a defective evacuation alert device 2700, or defective parts on the evacuation alert device 2700, and realize the need for replacement.

The plurality of white LEDs 2760a, the plurality of front LEDs 2760b, and/or the plurality of side LEDs 2760c may be configured to emit light during an evacuation event. In some embodiments, the plurality of white LEDs 2760a may comprise one set of two white LEDs, however the embodiments described herein are not limited to this configuration. The plurality of white LEDs 2760a may be configured to emit light of a higher intensity than the plurality of front LEDs 2760b and the plurality of side LEDs 2760c. This may allow for the evacuation alert device 2700 to provide emergency lighting for workers on the worksite, as well as to provide additional visual signals.

The plurality of front LEDs 2760b may be capable of displaying a plurality of different patterns of light. In some embodiments, the plurality of front LEDs 2760b may comprise four sets of two front LEDs, however the embodiments described herein are not limited to this configuration. In some embodiments, the plurality of front LEDs 2760b may display a specific pattern of light depending on the type of the evacuation event. For example, the plurality of front LEDs 2760b may be configured to display a first pattern of light when the evacuation event is a gas leak, and display a second, different pattern of light when the evacuation event is a fire. In some embodiments, the plurality of front LEDs 2760b may be red LEDs, or may be any other color.

The plurality of side LEDs 2760c may be configured to emit light from at least one different side of the evacuation alert device 2700 than the plurality of front LEDs 2760b. In some embodiments, the plurality of side LEDs 2760c may comprise two sets of two side LEDs, however the embodiments described herein are not limited to this configuration. This may ensure that the alert can be seen at a 180° viewing angle. Similar to the plurality of front LEDs 2760b, the plurality of side LEDs 2760c may be red LEDs (or any other color) and may be configured to display a plurality of different patterns of light depending on the type of the evacuation event.

FIG. 28 shows an exploded view of an embodiment of an evacuation alert device 2800 according to various aspects of the embodiments described herein. The evacuation alert device 2800 may include each of the components as the evacuation alert device 2700 as described in connection with FIG. 27. The evacuation alert device 2800 may include a circuit board 2810, a battery 2830, a siren 2840, a front cover 2870a, a back cover 2870b, and a battery cover 2870c.

The circuit board 2810 may include, as described in connection with FIG. 27, a microcontroller (e.g., microcontroller 2710), a radio and an antenna (e.g., radio 2720 and antenna 2721), a power regulator (e.g., power regulator 2731), a siren driver (e.g., siren driver 2741), a pushbutton switch (e.g., pushbutton switch 2750), LED drivers (e.g., LED drivers 2761), and a plurality of white LEDs, a plurality of front LEDs, and a plurality of side LEDs (e.g., plurality of white LEDs 2760a, plurality of front LEDs 2760b, and plurality of side LEDs 2760c).

In some embodiments, the front cover 2870a and the back cover 2870b may be configured to attach to one another and encapsulate the circuit board 2810 (and the corresponding components) and the siren 2840. The front cover 2870a and the back cover 2870b may be attached with screws, for example. The front cover 2870a and the back cover 2870b may be weatherproof, and provide sufficient protection to the elements disposed inside.

The back cover 2870b may include a compartment in which the battery 2830 may be placed. In doing so, the battery 2830 may be connected to the circuit board 2810 and provide power to the evacuation alert device 2800. The battery cover 2870c may attach to the back cover 2870b in order to provide sufficient protection for the battery 2830. The battery cover 2870c may attach to the back cover 2870b with screws, for example. The separate battery cover 2870c may allow for easy replacement of the battery 2830. In some embodiments, the evacuation alert device 2800 may be configured to (e.g., with the siren 2840) make a noise when the battery drops below a predetermined threshold of charge.

FIG. 29 shows an embodiment of an evacuation alert device according to various aspects of the embodiments described herein. The evacuation alert device 2900 may include each of the components of the evacuation alert device 2700 as described in connection with FIG. 27, as well as the evacuation alert device 2800 as described in connection with FIG. 28. The evacuation alert device 2900 may include a speaker grill 2942, a label 2951, a cover 2970, and mechanical interface 2990.

In some embodiments, the speaker grill 2942 may allow for noise emitted from a siren (e.g., siren 2740 or 2741) to be emitted from the evacuation alert device 2900. In doing so, the evacuation alert device 2900 may be able to emit a noise loud enough to alert workers on a worksite of an evacuation event.

In some embodiments, the label 2951 may be disposed on the cover 2970 such that a pushbutton switch (e.g., pushbutton switch 2750) is located underneath the label 2951. This way, an authorized person may be aware of the location of the pushbutton switch, and thus know where to press in order to pair the evacuation alert device 2900 to an to external system, or to test the functionality of the evacuation alert device 2900.

The cover 2970 may be configured such that LEDs of the evacuation alert device 2900 disposed inside the cover 2970 are able to emit light through the cover 2970. As seen in FIG. 29, the plurality of white LEDs 2760a, the plurality of front LEDs 2760b, and the plurality of side LEDs 2760c are able to emit light through the cover 2970. In some embodiments, the plurality of front LEDs 2760b are arranged in a circle. In some embodiments, the cover 2970 may have an elongated hexagonal shape. In some embodiments, the cover may have dimensions of approximately 5.5"×3.5"×1.0", and thus may be a conveniently small device that can be located throughout the workplace.

The mechanical interface 2990 may be configured to allow the evacuation alert device 2900 to be mounted on a surface located at the worksite. For example, the mechanical interface 2990 may allow the evacuation alert device 2900 to be affixed to a wall or to a ceiling of the worksite. The mechanical interface 2990 may include at least one screw, an adhesive, or at least one magnet, or any other suitable mechanical interface.

Figure 30:
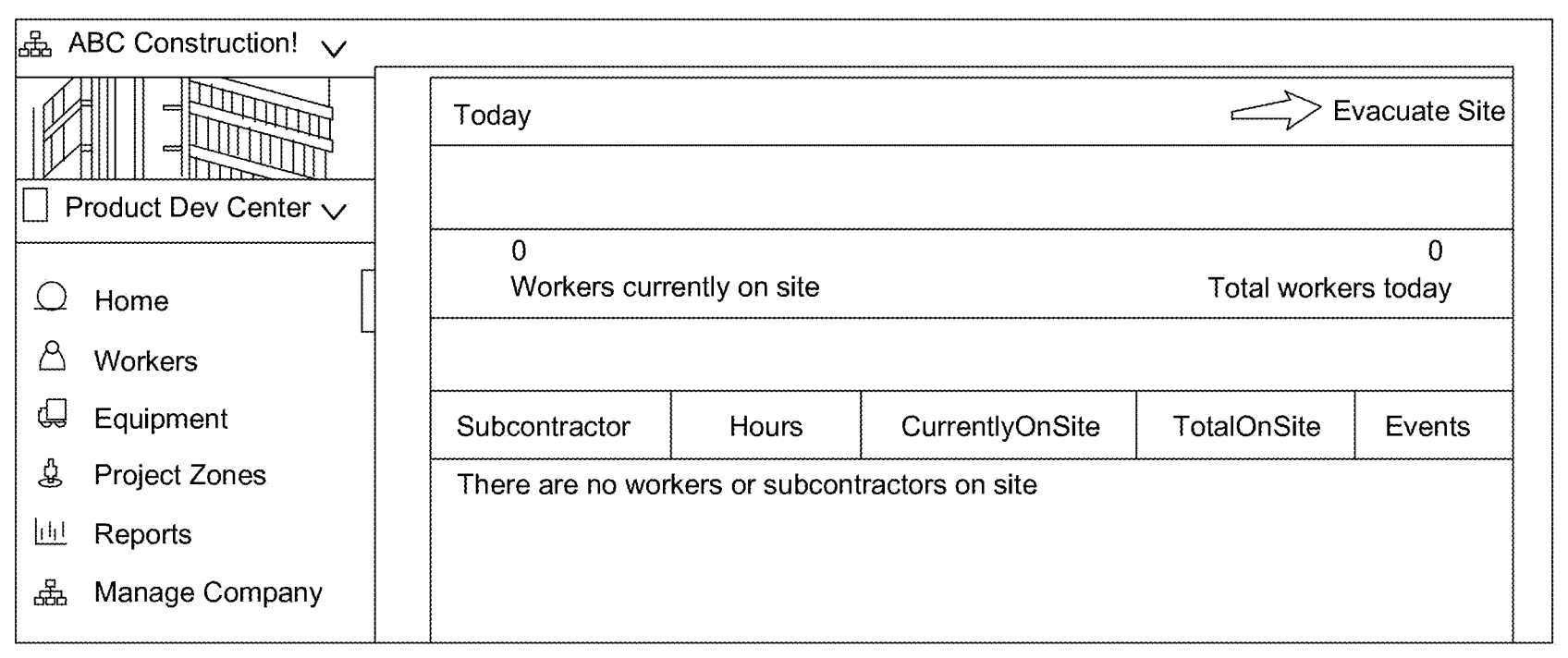

FIG. 30 shows an exemplary interface that permits a user to evacuate a worksite. The user may select a user interface control to evacuate a worksite in the event of a dangerous condition. In such an embodiment, when the user selects the user interface control to evacuate the worksite, a signal may be sent over a wireless mesh network to at least one evacuation device, as described herein associated with the worksite. In doing so, the at least one evacuation device may begin alerting the worksite of the evacuation event. In this interface, after selecting to evacuate the worksite, the user may be prompted to confirm evacuation before the evacuation event indication is sent to the at least one evacuation alert devices.

Figure 31:
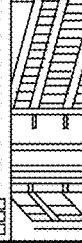

FIG. 31 shows an exemplary interface that permits a user to monitor the status of an evacuation. The interface may display, for example, a time at which the evacuation was started as well as the user that started the evacuation. The interface may also display a list of workers that were on the worksite when the evacuation began. The workers may have the ability to acknowledge the evacuation, for example with the wearable devices as described herein. For example, during an evacuation, a worker may press a button on a wearable device assigned to the worker in order to acknowledge the evacuation alert. The interface may allow a user to view all workers on a worksite being evacuated, and be capable of determining workers who have acknowledged the evacuation alert as well as workers who have not acknowledged the evacuation alert. The interface may also allow the user to see locations of the workers on the worksite.

Figure 32:
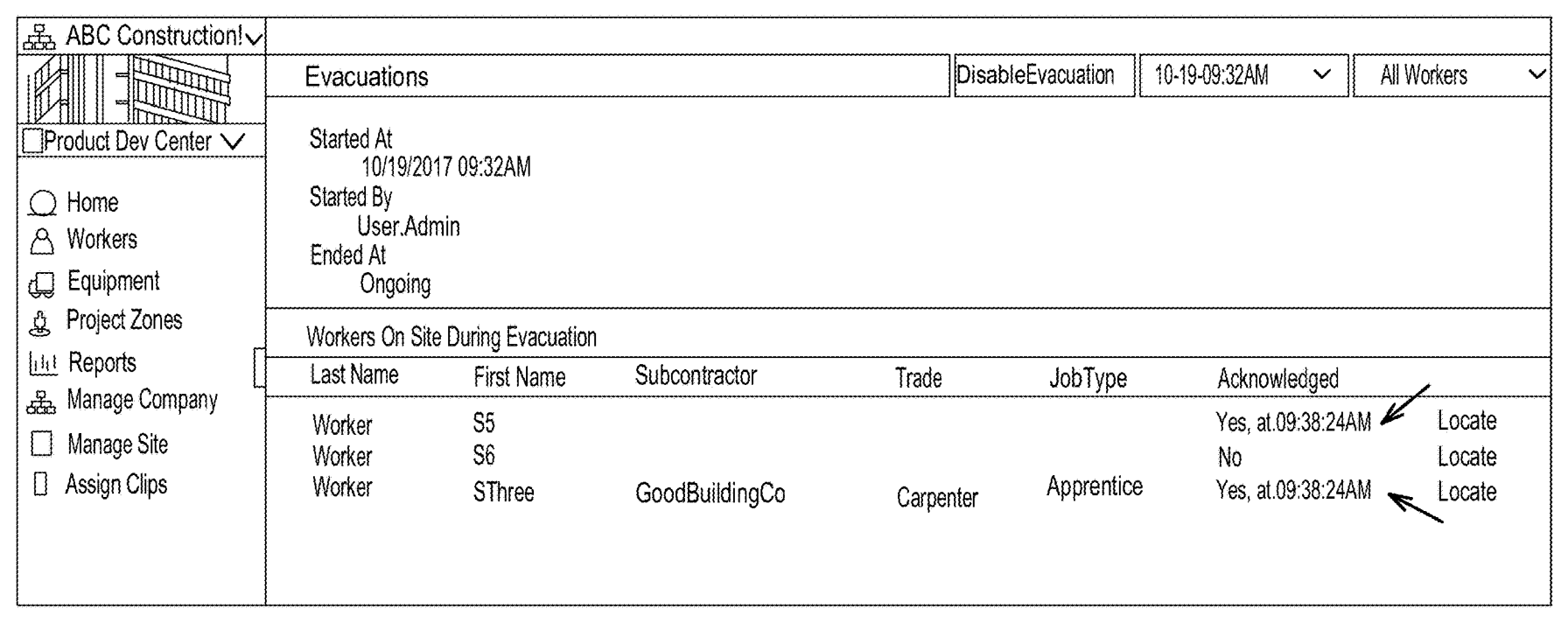

FIG. 32 shows an exemplary interface that permits a user to see which workers have acknowledged an evacuation on a worksite. As discussed, workers may be able to acknowledge the evacuation, for example, by pressing a button on a wearable device assigned to each worker. The interface may display a list of workers on the worksite that is being evacuated, and whether or not they have acknowledged the evacuation. If a worker has acknowledged the evacuation, the interface may display the time at which the worker acknowledged the evacuation. The user may also be able to track the locations of the workers on the worksite, and view the locations of workers who have acknowledged the evacuation alert and workers who have not acknowledged the evacuation alert.

Figure 33:
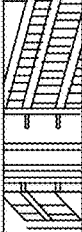

FIG. 33 shows an exemplary interface that permits a user to deactivate the evacuation. If the user deactivates the evacuation, the at least one evacuation alert devices may stop alerting the worksite of the evacuation event. In some embodiments, after the option to deactivate the evacuation is chosen, the interface may prompt the user to confirm that they wish to deactivate the evacuation.

FIG. 34 shows an exemplary interface that permits a user to view a summary of the evacuation. The interface may display the time at which the evacuation began and the time at which the evacuation ended. The interface may also display a list of the workers who were on the worksite during the evacuation, and display whether or not the workers acknowledged the evacuation. The interface may allow the user to filter the list of workers by whether or not they acknowledged the evacuation. The user may also be able to view all prior evacuations.

Low-Energy Wireless Applications Using Networked Wearable Sensors

In some aspects, one or more sensors are used for interfacing with low-energy wireless applications or devices. For example, a sensor, e.g., sensor 300, sensor 1100, wearable sensor 2650, or another suitable sensor, in communication with a network, e.g., mesh network 312, mesh network 900, mesh network 1000, or another suitable network, may be used for a low-energy wireless application or device, e.g., BLUETOOTH, BLUETOOTH LOW ENERGY, or another suitable application or device. BLUETOOTH LOW ENERGY is a wireless personal area network technology aimed at applications or devices in the healthcare, fitness, beacons, security, and home entertainment industries. BLUETOOTH LOW ENERGY provides considerably reduced power consumption and cost while maintaining a similar communication range as BLUETOOTH. Popular mobile operating systems can natively support this technology. BLUETOOTH LOW ENERGY and BLUETOOTH are registered marks owned by the Bluetooth Special Interest Group. While the below described embodiments reference BLUETOOTH-related applications or devices, the embodiments are equally suitable and applicable to other wireless or low-energy wireless applications or devices.

Conventionally, a BLUETOOTH device may be used with a mobile phone or another hand-held device with a suitable screen. For example, a heart rate monitoring device may connect to the mobile phone via BLUETOOTH, and the mobile phone's display may be used to monitor the heart rate of a subject wearing the heart rate monitor device. However, there are some environments (e.g., construction sites) where using a mobile phone is not allowed or discouraged due to safety or security concerns. In some embodiments, as described herein, such BLUETOOTH devices are instead interfaced with a sensor, such as a wearable sensor, thereby eliminating the need for the BLUETOOTH device to connect with a mobile phone for its operation. The sensor may be in communication with a network, such as a mesh network, and may transmit data received from the BLUETOOTH device to the mesh network, which may in turn forward the data to an appropriate recipient, such as a server, a computer, a hand held device, or another recipient. Because the below described embodiments eliminate the need for the mobile phone's display and associated screen time and/or focused usage in order to utilize the BLUETOOTH device, the embodiments are a suitable way to incorporate BLUETOOTH devices or applications in environments where using the mobile phone is not appropriate or allowed.

Figure 35:
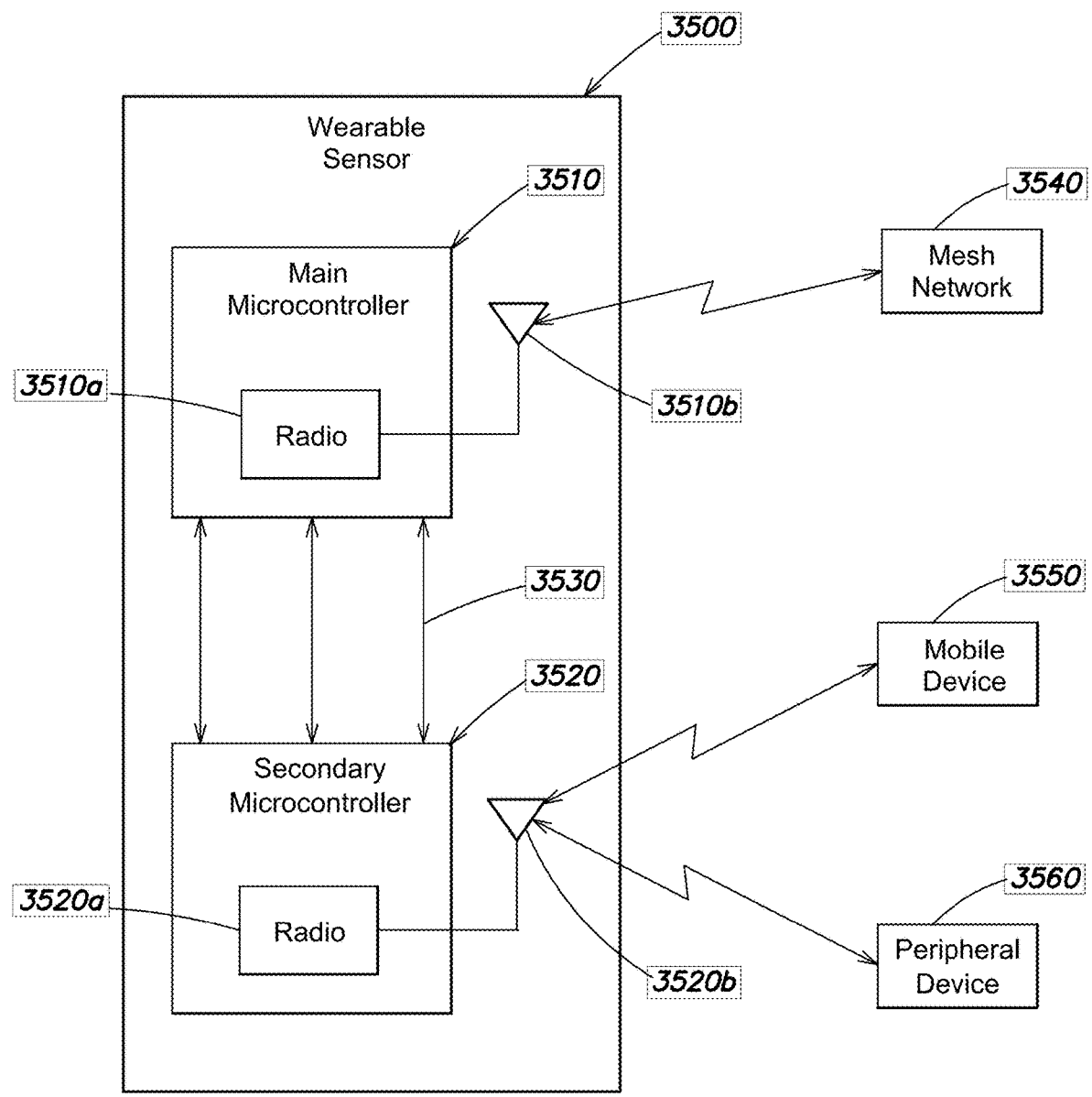
FIG. 35 shows a block diagram of an embodiment of a wearable sensor according to various aspects of the embodiments described herein.

FIG. 35 shows a block diagram of an embodiment of wearable sensor 3500 according to various aspects of the embodiments described herein. Wearable sensor 3500 may include main microcontroller 3510, corresponding to a first wireless network interface, and secondary microcontroller 3520, corresponding to a second wireless network interface (e.g., BLUETOOTH LOW ENERGY), in communication via lines 3530. Wearable sensor 3500 may be in communication with one or more of mesh network 3540 (including one or more communication nodes), mobile device 3550, and/or peripheral device 3560. Mesh network 3540 may include a wireless mesh network, a low-power wireless network, or another suitable network. In some embodiments, the low-power wireless network may include a wireless telecommunications network, e.g., a low-power wireless mesh network, to allow for communication at low bitrates between battery-powered devices.

In some embodiments, main microcontroller 3510 includes radio 3510a and antenna 3510b. Main microcontroller 3510 may communicate with radio 3510a in order to operate antenna 3510b, which may allow wearable sensor 3500 to communicate with mesh network 3540. In some embodiments, secondary microcontroller 3520 includes radio 3520a and antenna 3520b. Secondary microcontroller 3520 may communicate with radio 3520a in order to operate antenna 3520b, which may allow wearable sensor 3500 to communicate with mobile device 3550 and/or peripheral device 3560. In some embodiments, main microcontroller 3510 and secondary microcontroller 3520 may transfer data to each other via lines 3530. In some embodiments, main microcontroller 3510. secondary microcontroller 3520, and lines 3530 may be included in a single integrated microcontroller. For example, the integrated microcontroller may include one or more radios operating in the 900 MHz band and/or the 2.4 GHz band.

For example, wearable sensor 3500 may receive, from mesh network 3540, an indicator to transmit an identification message to mobile device 3550. In particular, main microcontroller 3510 may use radio 3510a and antenna 3510b (e.g., the first wireless network interface) to receive the indicator from mesh network 3540. Main microcontroller 3510 may communicate via lines 3530 the indicator to secondary microcontroller 3520, which in turn may use radio 3520a and antenna 3520b (e.g., the second wireless network interface) to transmit an identification message to mobile device 3550.

In another example, wearable sensor 3500 may receive, from peripheral device 3560, a status message or an advertisement message or another suitable message including information to be transmitted to mesh network 3540. In particular, secondary microcontroller 3520 may use radio 3520a and antenna 3520b (e.g., the second wireless network interface) to receive the message from peripheral device 3560. Secondary microcontroller 3520 may communicate via lines 3530 the message to main microcontroller 3510, which in turn may use radio 3510a and antenna 3510b (e.g., the first wireless network interface) to transmit the message to mesh network 3540.

Figure 36:
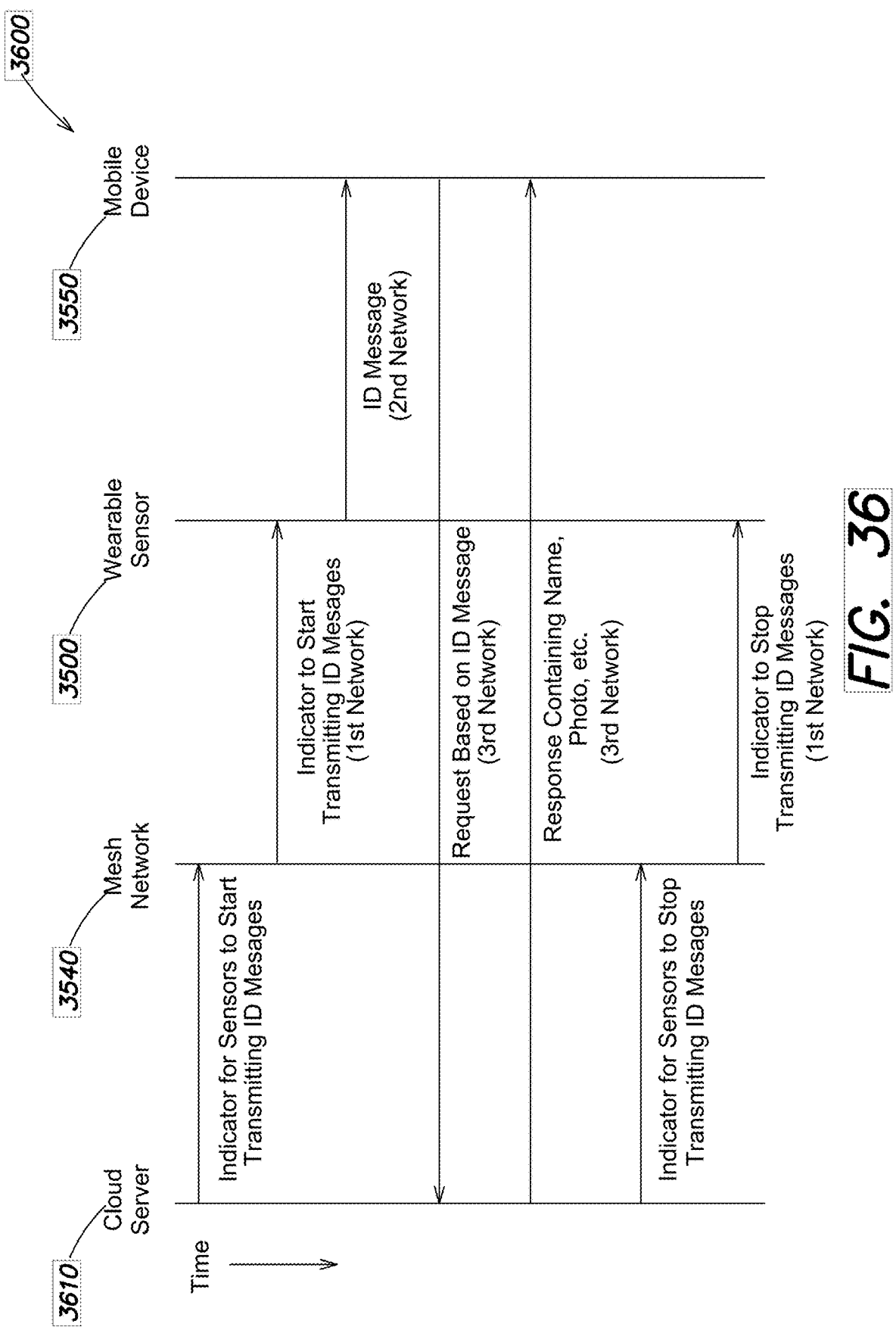
FIG. 36 shows an exemplary system in which a wearable sensor may be used according to various aspects of the embodiments described herein.

FIG. 36 shows exemplary system 3600 in which a wearable sensor, e.g., wearable sensor 3500, may be used according to various aspects of the embodiments described herein. In system 3600, a first wireless network may include mesh network 3540, a second wireless network may include a BLUETOOTH- or a BLUETOOTH LOW ENERGY-based network, and/or a third wireless network may include a cellular or WIFI network. In some embodiments, a customer for system 3600 may require a foreman walking around a construction site to be able to identify workers that the foreman encounters. Each worker may carry a sensor or device, e.g., wearable sensor 3500, which may be in communication with an external network, e.g., mesh network 3540. As described above, wearable sensor 3500 may include a main microcontroller and a secondary microcontroller that are in communication with each other. Further, the main microcontroller may include a radio and an antenna for establishing communications with the external network, and the secondary microcontroller may include a radio and an antenna establishing communications with a mobile device.

In some embodiments, the foreman may carry a mobile device, e.g., mobile device 3550, running a software application for identifying workers at the construction site. The foreman may open the software application and navigate to a certain page, e.g., an audit page, that indicates that the foreman would like to confirm the identity of one or more workers. When the audit page is opened, the mobile device may send a notification to a server, e.g., Cloud server 3610, that it is searching for related devices, e.g., wearable sensor 3500. The mobile device may communicate with Cloud server 3610 via the third wireless network, but is not so limited. Cloud server 3610 may receive the notification and send an indicator to transmit an identification message to wearable sensor 3500 via the first wireless network, but is not so limited. Therefore each instance of wearable sensor 3500 connected to mesh network 3540 may receive the indicator and initiate transmitting an identification message for the respective instance. The identification message for each instance of wearable sensor 3500 may include a unique identifier, e.g., serial number, firmware version, manufacturer identifier, or another suitable identifier, for the respective instance. In some embodiments, wearable sensor 3500 periodically transmits the identification message until Cloud server 3610 sends an indicator to stop transmitting the identification message to wearable sensor 3500 via the first wireless network. Therefore each instance of wearable sensor 3500 connected to mesh network 3540 may receive the indicator and stop transmitting an identification message for the respective instance.

In some embodiments, the worker carrying wearable sensor 3500 may be temporarily or permanently assigned the wearable sensor. For example, wearable sensor 3500 may be associated with the worker in a remote database directly accessible to Cloud server 3610. In another example, wearable sensor 3500 may be associated with the worker in a local database accessible to Cloud server 3610 via mesh network 3540. In yet another example, wearable sensor 3500 may be assigned to a worker daily or weekly (or on another suitable interval) using a check-in system including a reader that scans an identifier associated with the wearable sensor and creates a record of an association between the scanned wearable sensor and the worker.

In some embodiments, the foreman may walk around the worksite with the audit page open on the mobile device. As the foreman reaches within proximity of an instance of wearable sensor 3500, e.g., within 50 feet, 30 feet, 20 feet, or another suitable distance, mobile device 3550 may receive from the wearable sensor 3500 the identification message, including the unique identifier, corresponding to the respective instance. Mobile device 3550 may receive the identification message via the second wireless network different from the first wireless network, but is not so limited. For example, mobile device 3550 may receive the identification message via a BLUETOOTH LOW ENERGY connection between mobile device 3550 and wearable sensor 3500. Mobile device 3550 may in turn transmit a query, based on the received identification message, to Cloud server 3610 to confirm the identity of the worker carrying wearable sensor 3500. Mobile device 3550 may transmit the query to Cloud server 3610 via the third wireless network, but is not so limited. Cloud server 3610 may receive the query and respond with a message confirming the identity of the worker, an error message, or another suitable response. For example, Cloud server 3610 may further query a local or remote database for information regarding the worker. In some embodiments, the software application running on mobile device 3550 may generate the query to confirm the identity of the worker and generate for display a user interface to show the response received from Cloud server 3610.

In some embodiments, wearable sensor 3500 may determine the location of the wearable sensor based on detection of one or more of the communication nodes in mesh network 3540. For example, the determination of the location may be determined responsive to detected signal strength of one or more of the communication nodes in mesh network 3540. In some embodiments, a location granularity of the determined location of wearable sensor 3500 may be 30 feet, 10 feet, or another suitable distance, depending on external factors such as signal strength, interference, etc.

In some embodiments, during the above described operation of wearable sensor 3500, main microcontroller 3510 of wearable sensor 3500 may receive the indicator to transmit an identification message from mesh network 3540. Main microcontroller 3510 of wearable sensor 3500 may communicate relevant information to secondary microcontroller 3520, such as identification information for wearable sensor 3500 (e.g., such as serial number, firmware version, etc.), mode control for BLUETOOTH LOW ENERGY or another low-energy wireless application (such as start/stop identification advertising, start/stop listening for advertisements, advertisement data from detected devices, etc.), and other suitable information.

In some embodiments, mesh network 3540 is connected to Cloud server 3610 via one or more cellular uplinks. In some embodiments, Cloud server 3610 is connected to multiple portions of mesh network 3540, each with their own cellular uplinks, and the Cloud server coordinates the multiple portions to act as a single mesh network. In some embodiments, communication nodes of mesh network 3540 and/or wearable sensor 3500 include one or more transmitters that are adapted to transmit information using multiple communication channels. In some embodiments, each transmitter may have specific time slots in which to transmit information. In some embodiments, time slots may be dynamically assigned for each of the transmitters.

Figure 37:
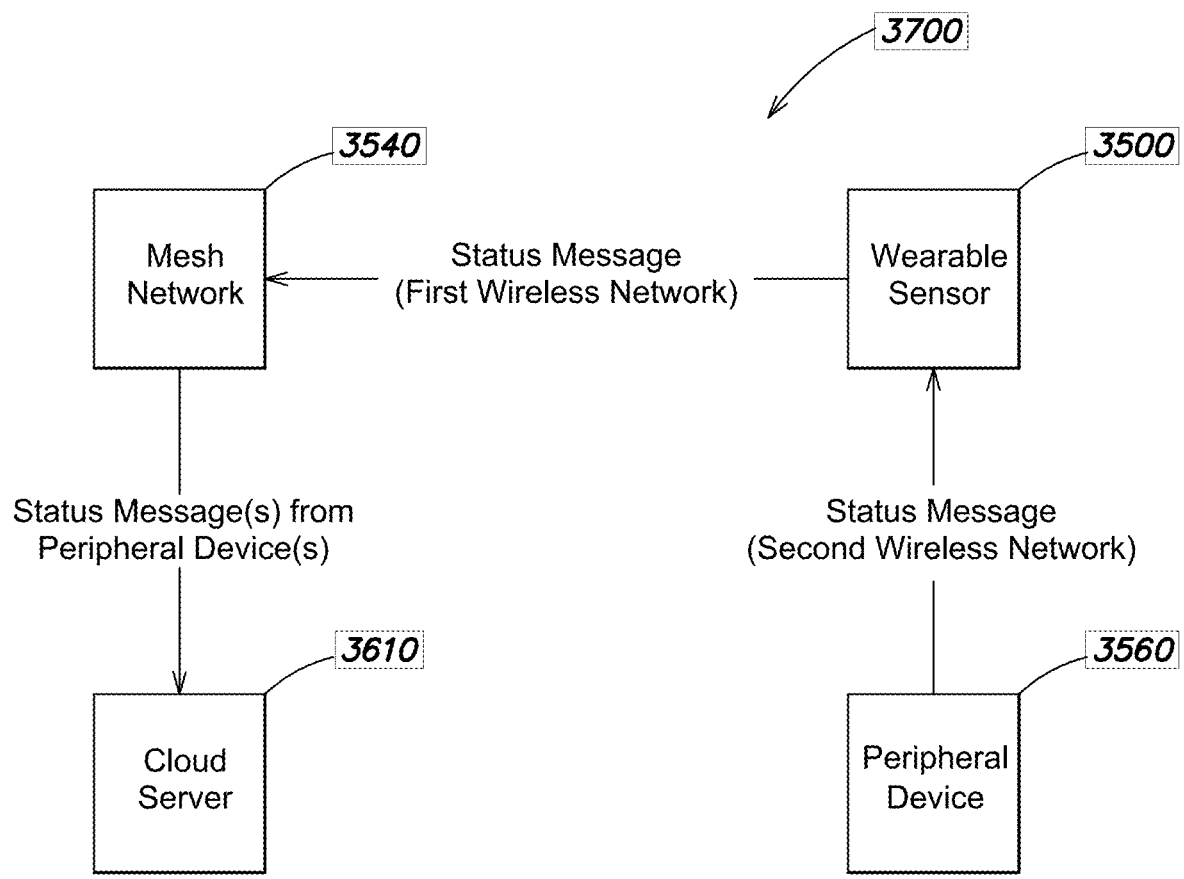
FIG. 37 shows another exemplary system in which a wearable sensor may be used according to various aspects of the embodiments described herein.

FIG. 37 shows exemplary system 3700 in which a wearable sensor, e.g., wearable sensor 3500, may be used according to various aspects of the embodiments described herein. In some embodiments, a worker at a construction site may wear a peripheral device 3560, e.g., an off-the-shelf heart rate monitoring device. Peripheral device 3560 may be paired, e.g., through a BLUETOOTH LOW ENERGY connection, to the worker's wearable sensor, e.g., wearable sensor 3500. Wearable sensor 3500 may receive information and/or data measured by peripheral device 3560 and send the data via mesh network 3540 to a cloud-based system, e.g., Cloud server 3610. In this way, the monitoring is built into system 3700 using wearable sensor 3500, mesh network 3540, and/or Cloud server 3610. Particularly, the worker's wearable sensor 3500 may assist in monitoring the worker's health status via peripheral device 3560 without the worker having to carry or use a mobile device, such as a mobile phone. In some embodiments, peripheral device 3560 may be an off-the-shelf monitoring device that can be configured to connect with wearable sensor 3500. In some embodiments, peripheral device 3560 may be a custom monitoring device that is designed to work in conjunction with wearable sensor 3500.

In some embodiments, a worker at a construction site may carry wearable sensor 3500 and wear peripheral device 3560, such as a heart rate monitoring device. Peripheral device 3560 may transmit an advertisement message. Based on receiving the advertisement message, wearable sensor 3500 may establish a wireless connection between wearable sensor 3500 and peripheral device 3560, e.g., a BLUETOOTH LOW ENERGY connection. Peripheral device 3560 may transmit a status message, such as information and/or data measured by peripheral device 3560, to wearable sensor 3500. Peripheral device 3560 may transmit the message via a wireless network different from mesh network 3540, e.g., a BLUETOOTH LOW ENERGY connection between peripheral device 3560 and wearable sensor 3500. Wearable sensor 3500 may in turn transmit at least a portion of the message and/or information relating to the message to Cloud server 3610 via mesh network 3540. Cloud server 3610 may receive the portion of the message and/or information relating to the message and store it in a local or remote database. In some embodiments, Cloud server 3610 may further relay information related to the message to a foreman or other supervisor at the construction site, e.g., to their mobile device, for reference and/or notification in case of any anomalies detected in the message. For example, if the Cloud server 3610 receives information that the worker's heart rate is extremely elevated, Cloud server 3610 may send a text message to the foreman's mobile phone with an alert that the worker needs medical attention.

In some embodiments, during the above described operation of peripheral device 3560, peripheral device 3560 may receive a status request from wearable sensor 3500 via a wireless network different from mesh network 3540, e.g., a BLUETOOTH LOW ENERGY connection between peripheral device 3560 and wearable sensor 3500. Peripheral device 3560 may transmit the status message to wearable sensor 3500 via the wireless network in response to receiving the status request from wearable sensor 3500. In some embodiments, peripheral device 3560 may receive the status request from wearable sensor 3500 when peripheral device 3560 and wearable sensor 3500 are within proximity of each other, e.g., within 50 feet, 30 feet, 20 feet, or another suitable distance.

In some embodiments, wearable sensor 3500 may determine the location of the wearable sensor based on detection of one or more of the communication nodes in mesh network 3540. For example, the determination of the location may be determined responsive to detected signal strength of one or more of the communication nodes in mesh network 3540. In some embodiments, a location granularity of the determined location of wearable sensor 3500 may be 30 feet, 10 feet, or another suitable distance, depending on external factors such as signal strength, interference, etc. In some embodiments, a location of peripheral device 3560 may be determined at least based in part on a location of wearable sensor 3500 when it is within proximity of peripheral device 3560.

In some embodiments, the worker carrying wearable sensor 3500 and/or wearing peripheral device 3560 may be temporarily or permanently assigned the wearable sensor and/or peripheral sensor. For example, wearable sensor 3500 and/or peripheral device 3560 may be associated with the worker in a remote database directly accessible to Cloud server 3610. In another example, wearable sensor 3500 and/or peripheral device 3560 may be associated with the worker in a local database accessible to Cloud server 3610 via mesh network 3540. In yet another example, wearable sensor 3500 and/or peripheral device 3560 may be assigned to a worker daily or weekly (or on another suitable interval) using a check-in system including a reader that scans an identifier associated with the wearable sensor and/or peripheral sensor and creates a record of an association between the scanned sensor and the worker.

In some embodiments, peripheral device 3560 may include a health-related sensor such as a heart rate monitoring device, a thermometer, a hydration sensor, a hazardous exposure sensor (e.g., radiation, ultraviolet, gas, sound), a smart personal protective equipment (PPE) that detects proper use or repetitive strain, and/or another suitable peripheral sensor.

In some embodiments, peripheral device 3560 may be disposed on a piece of equipment and may include an equipment-related device, e.g., a wireless beacon. Additionally or alternatively, peripheral device 3560 may be disposed on, near, or inside of a tool, toolbox, piece of equipment, building material, or packaging. Additionally or alternatively, peripheral device 3560 may be disposed on or near a point-of-interest. For example, one or more BLUETOOTH- or BLUETOOTH LOW ENERGY-enabled beacons may be placed on various pieces of equipment throughout a construction site. The beacons may comply with iBeacon™ or Eddystone™ protocol standards, or another suitable protocol standard. When a worker is within proximity of a piece of equipment (and its peripheral device 3560), the worker's wearable sensor 3500 may receive data from peripheral device 3560 and transmit the data to mesh network 3540 for relay to a cloud-based system, e.g., Cloud server 3610. For example, wearable sensor 3500 may receive an advertisement message from peripheral device 3560. The advertisement message may contain a unique identifier for peripheral device 3560. Based on the advertisement message, wearable sensor 3500 may determine an identity message for peripheral device 3560 and transmit the identity message to mesh network 3540, e.g., for relay to Cloud server 3610. The format of the identity message for the wireless beacon may conform to iBeacon™ or Eddystone™ protocol standards, or another suitable protocol standard. In some embodiments, wearable sensor 3500 may request additional data from peripheral device 3560 based on receiving the advertisement message. Peripheral device 3560 may transmit manufacturer identifier, serial number, device name, model number, version number, and/or battery level based on receiving the additional data request from wearable sensor 3500.

In some embodiments, a location of the piece of the equipment may be determined and stored in Cloud server 3610. The location of peripheral device 3560 may be determined from the communication between wearable sensor 3500 and peripheral device 3560. For example, because the location (e.g., latitude, longitude, and/or altitude) of wearable sensor 3500 may be known, the location of peripheral device 3560 may be calculated based on proximity to wearable sensor 3500. In another example, the location of peripheral device 3560 may be calculated when multiple wearable sensors 3500 are within proximity of peripheral device 3560. In some embodiments, the collected information may be used to locate missing pieces of equipment. For example, when Cloud server 3610 receives data from peripheral device 3560 attached to a missing piece of equipment, Cloud server 3610 may send an alert to wearable sensor 3500 to secure the piece of equipment or turn it in to a supervisor.

The above described embodiment may be advantageous in situations where mobile devices, such as mobile phones, may be inappropriate or disallowed. For example, many construction companies are instituting a rule disallowing non-supervisory workers from carrying mobile phones on construction sites. However, a BLUETOOTH-enabled tool tag (e.g., BOSCH TrackTag) works by connecting to a mobile phone. By allowing the worker's wearable sensor to communicate with the tool tag, such products may still be used in a construction site or other suitable environments. BOSCH and TrackTag are registered marks owned by Robert Bosch GmbH, Germany.

In some embodiments, one or more wireless beacons (e.g., peripheral devices 3560) may be placed on a collection of tools as well as on the toolbox that the tools belong in. When a worker with a wearable sensor (e.g., wearable sensor 3500) walks past the toolbox, the wearable sensor may receive a signal from the toolbox's beacon as well as one or more tools within the toolbox. This information can be sent to the server, which can then perform an inventory function by identifying tools which did not check in at the same time and therefore nearby the toolbox. For example, typical large "jobbox" type toolboxes are often stationary and may contain many tools. The inventory function may be useful at the end of the work day, for example, to determine that all tools had been returned prior to closing a construction site.

In some embodiments, one or more peripheral devices 3560 disposed around a construction site, e.g., on walls, pieces of equipment, or other suitable point-of-interest locations, to track location of workers. When a particular peripheral device 3560 is within proximity of a worker's wearable sensor 3500, peripheral device 3560 may transmit data regarding its location to Cloud server 3610 via wearable sensor 3500. Cloud server 3610 may track a location of the worker via wearable sensor 3500 as it comes in and out of proximity of peripheral devices 3560 disposed around the construction site.

In some embodiments, peripheral device 3560 may include an environment-related sensor. For example, peripheral device 3560 may include a sensor detecting a measure of concrete dryness at a construction site. One or more wearable sensors at the construction site may relay information to Cloud server 3610 whenever a worker carrying a wearable sensor, e.g., wearable sensor 3500, passes by peripheral device 3560 and comes within proximity to establish a connection between peripheral device 3560 and wearable sensor 3500. Additionally or alternatively, a supervisory worker who has access to a mobile phone, such as a foreman, may approach peripheral device 3560 at regular intervals to connect the mobile phone to peripheral device 3560, e.g., via BLUETOOTH, and obtain the relevant information for relaying to Cloud server 3610.

In some embodiments, a foreman carrying a mobile device, such as a mobile phone, may walk around a construction site where workers carry wearable sensors, such as wearable sensor 3500. The mobile device, e.g., mobile device 3550, may run a software application that can send instructions on upgrading software or firmware of wearable sensor 3500 via BLUETOOTH, BLUETOOTH LOW ENERGY, or another suitable connection established between mobile device 3550 and wearable sensor 3500. The foreman may navigate to an upgrade page within the software application and receive an alert when wearable sensor 3500 within proximity of mobile device 3550 has been upgraded with new software or firmware. The foreman may use the upgrade page to ensure that all wearable sensors being carried by workers receive the upgrade as the foreman walks around the construction site.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the embodi-

What is claimed is:

1. A system, comprising:
a plurality of communication nodes configured in a wireless mesh network or a low-power wireless network;
a sensor, assigned to a monitored subject, comprising:
a first wireless network interface, for a first wireless network, adapted to communicate with the wireless mesh network or the low-power wireless network; and
a second wireless network interface, for a second wireless network, adapted to communicate with a mobile device; and
one or more processors adapted to:
receive, via the first wireless network, an indicator to transmit an identification message to the mobile device; and
based on receiving the indicator, transmit, via the second wireless network, the identification message to the mobile device, wherein the mobile device is adapted to receive the identification message and to transmit a query, in response to and based on the identification message, to a cloud server via a third wireless network and to receive data for the monitored subject from the cloud server via the third wireless network in response to the query.

2. The system of claim 1, wherein transmitting the query to the cloud server comprises transmitting, via the third wireless network, the query to a managing computing system on the cloud server.

3. The system of claim 2, wherein the managing computing system is adapted to:
transmit, to the sensor, via the first wireless network, the indicator to transmit the identification message to the mobile device;
receive, from the mobile device, via the third wireless network, the request based on the identification message; and
based on receiving the request, transmit, to the mobile device, via the third wireless network, a response to the request based on the identification message.

4. The system of claim 2, wherein the mobile device is adapted to execute a software application to generate the request based on the identification message and displays a user interface including the response to the request based on the identification message.

5. The system of claim 2, wherein the request based on the identification message includes a request to identify a worker associated with the identification message, and wherein the response to the request based on the identification message includes an identification of a worker associated with the identification message.

6. The system of claim 1, wherein the identification message includes a unique identifier, wherein the unique identifier includes a manufacturer identifier, a firmware version, and/or a serial number.

7. The system according to claim 1, wherein the plurality of communication nodes and the sensor include one or more transmitters that are adapted to transmit information using a plurality of communication channels, wherein each transmitter has specific time slots in which to transmit information, wherein the system is adapted to dynamically assign time slots for each of the transmitters.

8. The system according to claim 1, wherein the sensor is adapted to determine the location of the sensor based on detection of one or more of the plurality of communication nodes in the wireless mesh network or the low-power wireless network, wherein the determination of the location is determined responsive to detected signal strength of the one or more of the plurality of communication nodes in the wireless mesh network or the low-power wireless network.

9. A system comprising:
a plurality of communication nodes configured in a wireless mesh network or a low-power wireless network;
a sensor, assigned to a monitored subject, comprising:
a first wireless network interface, for a first wireless network, adapted to communicate with the wireless mesh network or the low-power wireless network;
a second wireless network interface, for a second wireless network, adapted to communicate with a peripheral device; and
one or more processors adapted to:
receive, via the second wireless network, an advertisement message from the peripheral device;
based on receiving the advertisement message, transmit, via the first wireless network, a status message or an identity message for the peripheral device to the wireless mesh network or the low-power wireless network; and
transmit at least a portion of the status message or identity message or information relating to the status message or identity message for relay to a cloud server.

10. The system of claim 9, wherein the peripheral device comprises a wireless beacon, wherein the one or more processors are adapted to:
based on the advertisement message, determine the identity message for the wireless beacon.

11. The system of claim 9, wherein the peripheral device is adapted to:
periodically transmit, to the sensor, via the second wireless network, the advertisement message containing a unique identifier.

12. The system of claim 9, wherein the sensor is configured to request additional data from the peripheral device based on receiving the advertisement message via the second wireless interface.

13. The system of claim 9, wherein the peripheral device is configured to transmit manufacturer identifier, serial number, device name, model number, version number, and/or battery level via the second wireless network based on receiving the additional data request from the sensor.

14. The system of claim 9, wherein the peripheral device is disposed on, near, or inside of a tool, toolbox, piece of equipment, building material, or packaging, or the peripheral device is disposed on or near a point-of-interest.

15. The system of claim 9, wherein the one or more processors are adapted to:
based on the advertisement message, establish a wireless connection between the sensor and the peripheral device via the second wireless network; and
receive, via the second wireless network, the status message from the peripheral device.

16. The system of claim 15, wherein the peripheral device is adapted to:
receive, via the second wireless network, a status request from the sensor; and
based on receiving the status request, transmit, via the second wireless network, the status message to the sensor.

17. The system of claim 9, wherein the peripheral device is disposed on or near a person, and wherein the peripheral device comprises a health-related sensor, wherein the health-related sensor comprises a heart rate monitor, a thermometer, a hydration sensor, a hazardous exposure sensor, and/or a smart personal protective equipment (PPE) that detects proper use or repetitive strain.

18. The system of claim 9, wherein the sensor transmits a request for status to the peripheral device when the sensor is within proximity of the peripheral device, wherein a location of the peripheral device is determined at least based in part on a location of the sensor when within proximity of the peripheral device.

19. The system according to claim 9, wherein the sensor is adapted to determine the location of the sensor based on detection of one or more of the plurality of communication nodes in the wireless mesh network or the low-power wireless network, wherein the determination of the location is determined responsive to detected signal strength of the one or more of the plurality of communication nodes in the wireless mesh network or the low-power wireless network.

20. A sensor, comprising:
an element that is adapted to attach the sensor to a monitored subject;
a first wireless network interface, for a first wireless network, adapted to communicate with a wireless mesh network or a low-power wireless network;
a second wireless network interface, for a second wireless network, adapted to communicate with a mobile device and a peripheral device; and
one or more processors adapted to:
receive, via the first wireless network, an indicator to transmit an identification message to the mobile device;
based on receiving the indicator, transmit, via the second wireless network, the identification message to the mobile device;
receive, via the second wireless network, an advertisement message from the peripheral device;
based on receiving the advertisement message, transmit, via the first wireless network, a status message for the peripheral device to the wireless mesh network or the low-power wireless network; and
transmit at least a portion of the status message or information relating to the status message to a cloud server.

* * * * *